US012542314B2

(12) United States Patent
Onuki

(10) Patent No.: US 12,542,314 B2
(45) Date of Patent: Feb. 3, 2026

(54) TEMPERATURE RAISING DEVICE, METHOD OF CONTROLLING TEMPERATURE RAISING DEVICE, AND STORAGE MEDIUM

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 785 days.

(21) Appl. No.: 17/894,188

(22) Filed: Aug. 24, 2022

(65) Prior Publication Data

US 2023/0064293 A1 Mar. 2, 2023

(30) Foreign Application Priority Data

Sep. 1, 2021 (JP) .................................. 2021-142579

(51) Int. Cl.
*H01M 10/657* (2014.01)
*B60K 6/28* (2007.10)
(Continued)

(52) U.S. Cl.
CPC ............. *H01M 10/657* (2015.04); *B60K 6/28* (2013.01); *B60L 58/27* (2019.02);
(Continued)

(58) Field of Classification Search
CPC ............. H01M 10/657; H01M 10/615; H01M 10/625; H01M 2220/20; H01M 10/637;
(Continued)

(56) References Cited

U.S. PATENT DOCUMENTS 9,019,000 B2* 4/2015 Umetani ............... H03K 17/162
327/384
12,074,305 B2* 8/2024 Onuki ................. H01M 10/615
(Continued)

FOREIGN PATENT DOCUMENTS

CN 110336099 10/2019
CN 111371143 7/2020
(Continued)

OTHER PUBLICATIONS

Japanese Office Action for Japanese Patent Application No. 2021-142579 mailed Nov. 19, 2024.
(Continued)

*Primary Examiner* — M Baye Diao
(74) *Attorney, Agent, or Firm* — Amin, Turocy & Watson, LLP

(57) ABSTRACT

A temperature raising device includes an alternating current (AC) generation circuit including a first capacitor having a first end connected to a positive electrode side of a power storage having an inductance component, a second capacitor having a first end connected to a negative electrode side of the power storage, a parallel switch unit configured to connect the first capacitor and the second capacitor to the power storage in parallel, and a series switch unit configured to connect the first capacitor and the second capacitor to the power storage in series, and a controller configured to alternately switch the state between a first state in which the parallel switch unit is in a conductive state and the series switch unit is in a non-conductive state and a second state in which the parallel switch unit is in the non-conductive state and the series switch unit is in the conductive state.

15 Claims, 25 Drawing Sheets

(51) Int. Cl.
*B60L 58/27* (2019.01)
*H01M 10/615* (2014.01)
*H01M 10/625* (2014.01)

(52) U.S. Cl.
CPC ....... *H01M 10/615* (2015.04); *H01M 10/625* (2015.04); *H01M 2220/20* (2013.01)

(58) Field of Classification Search
CPC .. B60K 6/28; B60K 6/48; B60L 58/27; B60L 2210/30; B60L 2240/545; B60W 2510/246; B60W 2510/305; B60W 2710/246; B60W 2710/305; B60W 10/24; B60W 10/30; B60W 20/50; B60W 2552/15; H02J 2310/48; H02J 7/0063; H02J 7/007194; Y02E 60/10
USPC ........................................................ 320/166
See application file for complete search history.

(56) References Cited

U.S. PATENT DOCUMENTS

| | | | |
|---|---|---|---|
| 12,384,277 B2 * | 8/2025 | Onuki | H01M 10/625 |
| 2008/0198630 A1 * | 8/2008 | Hiller | H02M 7/25 363/13 |
| 2012/0326531 A1 * | 12/2012 | Kawamoto | H02J 7/0031 307/130 |
| 2013/0108896 A1 * | 5/2013 | Daniel | H01M 10/647 429/50 |
| 2014/0009984 A1 * | 1/2014 | Takizawa | H02M 7/00 363/65 |
| 2017/0005511 A1 | 1/2017 | Li et al. | |
| 2021/0218085 A1 | 7/2021 | Ge et al. | |
| 2021/0221254 A1 * | 7/2021 | Abe | B60L 58/26 |

FOREIGN PATENT DOCUMENTS

| | | |
|---|---|---|
| CN | 113119805 | 7/2021 |
| JP | 2000-228231 | 8/2000 |
| JP | 2003-339167 | 11/2003 |
| JP | 2009-142069 | 6/2009 |
| JP | 2010-035279 | 2/2010 |
| JP | 2010-182511 | 8/2010 |
| JP | 2011-146183 | 7/2011 |
| JP | 2013-077452 | 4/2013 |
| JP | 5293820 | 9/2013 |

OTHER PUBLICATIONS

Chinese Office Action for Chinese Patent Application No. 202211013189.9 mailed Nov. 19, 2025.

* cited by examiner

FIG. 23
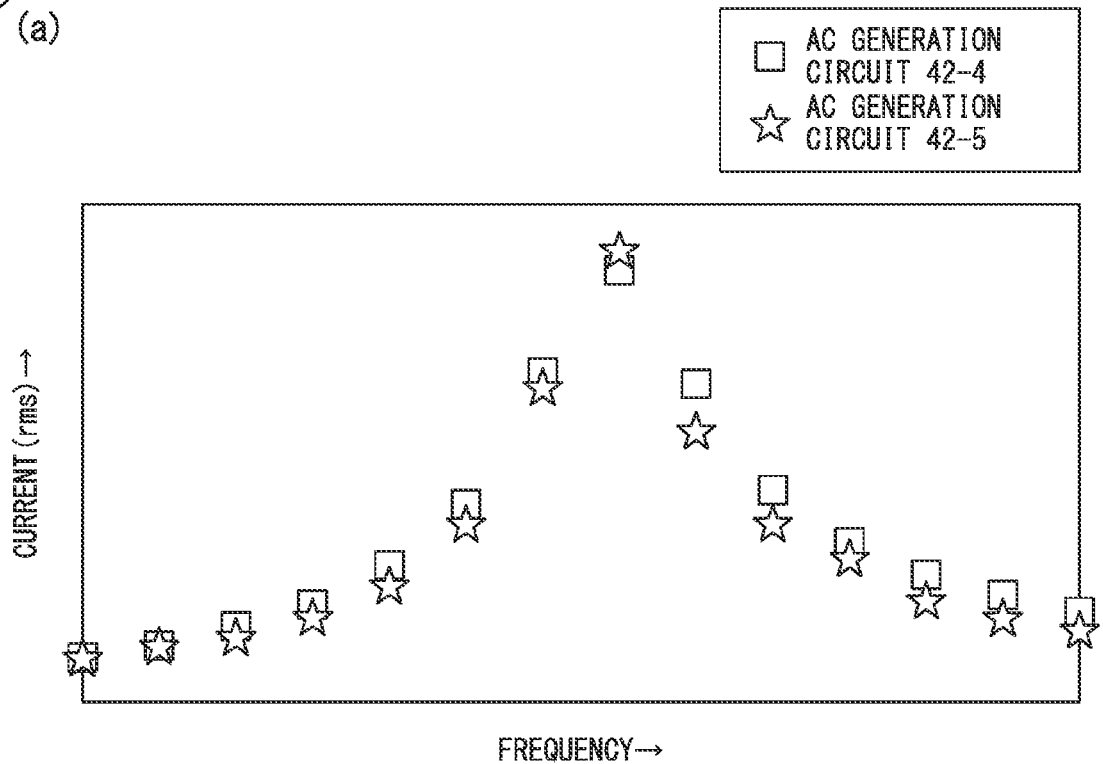
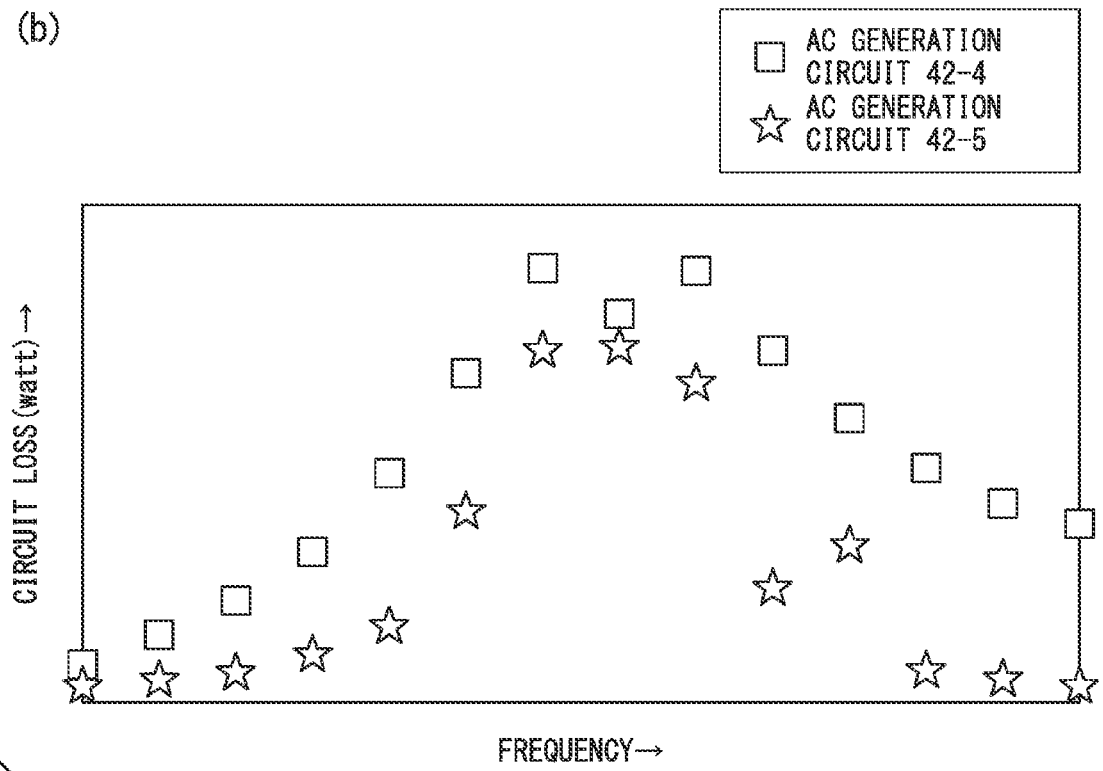

TEMPERATURE RAISING DEVICE, METHOD OF CONTROLLING TEMPERATURE RAISING DEVICE, AND STORAGE MEDIUM

CROSS-REFERENCE TO RELATED APPLICATION

Priority is claimed on Japanese Patent Application No. 2021-142579, filed Sep. 1, 2021, the content of which is incorporated herein by reference.

BACKGROUND OF THE INVENTION

Field of the Invention

The present invention relates to a temperature raising device, a method of controlling the temperature raising device, and a storage medium.

Description of Related Art

Efforts are underway to reduce adverse effects on the global environment (for example, reduction of $NO_x$ and $SO_x$ and reduction of $CO_2$). Thus, in recent years, from the viewpoint of improving the global environment, for reduction of $CO_2$, there is growing interest in at least electric vehicles allowed to travel with electric motors driven by power supplied by batteries (secondary batteries) such as, for example, a hybrid electric vehicle (HEV) and a plug-in hybrid vehicle (PHEV). The use of a lithium-ion secondary batteries is being considered as a battery for in-vehicle use. In these electric vehicles, it is important to bring out the full the performance of the secondary battery. It is known that the charging/discharging performance of a secondary battery deteriorates when the temperature at the time of use drops below an appropriate range. It is possible to limit the deterioration of the charging/discharging performance of the secondary battery by raising the temperature to a suitable temperature at the time of use.

In relation to this, for example, Japanese Patent No. 5293820 discloses technology related to a temperature raising device for raising the temperature of a secondary battery. In the temperature raising device disclosed in Japanese Patent No. 5293820, the temperature of the secondary battery is raised by positively generating a ripple current of a prescribed frequency of a frequency range in which an absolute value of impedance is relatively decreased in the secondary battery on the basis of frequency characteristics of impedance of the secondary battery.

SUMMARY OF THE INVENTION

However, in the conventional technology, it may not be possible to raise the temperature of the secondary battery efficiently.

The present invention has been made on the basis of the above recognition of the problems and an objective of the present invention is to provide a temperature raising device, a method of controlling the temperature raising device, and a storage medium capable of improving the energy efficiency by raising the temperature of a secondary battery more efficiently.

A temperature raising device, a method of controlling the temperature raising device, and a storage medium according to the present invention adopt the following configurations.

(1): According to an aspect of the present invention, there is provided a temperature raising device including an alternating current (AC) generation circuit configured to generate an AC current based on electric power stored in a power storage having an inductance component, wherein the AC generation circuit includes a first capacitor having a first end connected to a positive electrode side of the power storage; a second capacitor having a first end connected to a negative electrode side of the power storage; a parallel switch unit configured to connect the first capacitor and the second capacitor to the power storage in parallel by connecting a second end of the first capacitor and the first end of the second capacitor and connecting the first end of the first capacitor and a second end of the second capacitor; and a series switch unit configured to connect the first capacitor and the second capacitor to the power storage in series by connecting the second end of the first capacitor and the second end of the second capacitor; and a controller configured to alternately switch the state between a first state in which the parallel switch unit is in a conductive state and the series switch unit is in a non-conductive state and a second state in which the parallel switch unit is in the non-conductive state and the series switch unit is in the conductive state, wherein the controller changes the state of the parallel switch unit from the non-conductive state to the conductive state after the state of the series switch unit is changed from the conductive state to the non-conductive state when the state of the parallel switch unit is changed from the non-conductive state to the conductive state, and wherein the controller changes the state of the series switch unit from the non-conductive state to the conductive state after the state of the parallel switch unit is changed from the conductive state to the non-conductive state when the state of the series switch unit is changed from the non-conductive state to the conductive state.

(2): In the above-described aspect (1), each of the parallel switch unit and the series switch unit includes at least one semiconductor switch unit having a semiconductor switch element in which an ON state and an OFF state are controlled by the controller and a diode connected to each other in parallel.

(3): In the above-described aspect (2), one or both of the parallel switch unit and the series switch unit include two semiconductor switch units connected in series and directions of diodes of the two semiconductor switch units are opposite to each other.

(4): In the above-described aspect (2), the parallel switch unit and the series switch unit include a first semiconductor switch unit and a second semiconductor switch unit that are the semiconductor switch units connected in series and the directions of diodes of the first semiconductor switch unit and the second semiconductor switch unit are opposite to each other.

(5): In the above-described aspect (4), when the state is changed from a state in which the first capacitor and the second capacitor are connected to the power storage in parallel to a state in which the first capacitor and the second capacitor are connected to the power storage in series by setting the parallel switch unit in the conductive state, the controller switches the state to a state in which the first capacitor and the second capacitor are connected to the power storage in series in a state in which one of the first semiconductor switch unit and the second semiconductor switch unit provided in the parallel switch unit is in the conductive state after one of the first semiconductor switch unit and the second semiconductor switch unit provided in the series switch unit is allowed to be in the conductive state such that a current flowing through the parallel switch unit can return, and, when the state is changed from a state in which the first capacitor and the second capacitor are connected to the power storage in series to a state in which the first capacitor and the second capacitor are connected to the power storage in parallel by setting the series switch unit in the conductive state, the controller switches the state to a state in which the first capacitor and the second capacitor are connected to the power storage in parallel in a state in which one of the first semiconductor switch unit and the second semiconductor switch unit provided in the series switch unit is in the conductive state after one of the first semiconductor switch unit and the second semiconductor switch unit provided in the parallel switch unit is allowed to be in the conductive state such that a current flowing through the series switch unit can return.

(6): In the above-described aspect (1), the controller controls the conductive state and the non-conductive state of each of the parallel switch unit and the series switch unit on the basis of a voltage value of the first capacitor or a voltage value of the second capacitor.

(7): In the above-described aspect (1), the controller controls the conductive state and the non-conductive state of each of the parallel switch unit and the series switch unit on the basis of voltage values of a positive electrode and a negative electrode of the power storage.

(8): In the above-described aspect (1), the controller controls the conductive state and the non-conductive state of each of the parallel switch unit and the series switch unit on the basis of a voltage value between both ends of the parallel switch unit or the series switch unit in the non-conductive state.

(9): In the above-described aspect (1), the controller controls the conductive state and the non-conductive state of each of the parallel switch unit and the series switch unit on the basis of a current value of the AC current flowing through the parallel switch unit or the series switch unit.

(10): In the above-described aspect (1), the controller controls the conductive state and the non-conductive state of each of the parallel switch unit and the series switch unit at a prescribed timing based on the AC current.

(11): In the above-described aspect (10), the prescribed timing is decided on the basis of an interval or a duty ratio of the AC current.

(12): According to an aspect of the present invention, there is provided a method of controlling a temperature raising device including an alternating current (AC) generation circuit configured to generate an AC current based on electric power stored in a power storage having an inductance component, wherein the AC generation circuit includes a first capacitor having a first end connected to a positive electrode side of the power storage; a second capacitor having a first end connected to a negative electrode side of the power storage; a parallel switch unit configured to connect the first capacitor and the second capacitor to the power storage in parallel by connecting a second end of the first capacitor and the first end of the second capacitor and connecting the first end of the first capacitor and a second end of the second capacitor; and a series switch unit configured to connect the first capacitor and the second capacitor to the power storage in series by connecting the second end of the first capacitor and the second end of the second capacitor, and a controller configured to alternately switch the state between a first state in which the parallel switch unit is in a conductive state and the series switch unit is in a non-conductive state and a second state in which the parallel switch unit is in the non-conductive state and the series switch unit is in the conductive state, the method including: changing, by a computer of the controller, the state of the parallel switch unit from the non-conductive state to the conductive state after the state of the series switch unit is changed from the conductive state to the non-conductive state when the state of the parallel switch unit is changed from the non-conductive state to the conductive state, and changing, by the computer of the controller, the state of the series switch unit from the non-conductive state to the conductive state after the state of the parallel switch unit is changed from the conductive state to the non-conductive state when the state of the series switch unit is changed from the non-conductive state to the conductive state.

(13): According to an aspect of the present invention, there is provided a method of controlling a temperature raising device including an alternating current (AC) generation circuit configured to generate an AC current based on electric power stored in a power storage having an inductance component, wherein the AC generation circuit includes a first capacitor having a first end connected to a positive electrode side of the power storage; a second capacitor having a first end connected to a negative electrode side of the power storage; a parallel switch unit configured to connect the first capacitor and the second capacitor to the power storage in parallel by connecting a second end of the first capacitor and the first end of the second capacitor and connecting the first end of the first capacitor and a second end of the second capacitor; and a series switch unit configured to connect the first capacitor and the second capacitor to the power storage in series by connecting the second end of the first capacitor and the second end of the second capacitor, and a controller configured to alternately switch the state between a first state in which the parallel switch unit is in a conductive state and the series switch unit is in a non-conductive state and a second state in which the parallel switch unit is in the non-conductive state and the series switch unit is in the conductive state, wherein each of the parallel switch unit and the series switch unit includes at least one semiconductor switch unit having a semiconductor switch element in which an ON state and an OFF state are controlled by the controller and a diode connected to each other in parallel, and wherein the parallel switch unit and the series switch unit include a first semiconductor switch unit and a second semiconductor switch unit that are the semiconductor switch units connected in series and directions of diodes of the first semiconductor switch unit and the second semiconductor switch unit are opposite to each other, the method including: changing, by a computer of the controller, the state of the parallel switch unit from the non-conductive state to the conductive state after the state of the series switch unit is changed from the conductive state to the non-conductive state when the state of the parallel switch unit is changed from the non-conductive state to the conductive state; changing, by the computer of the controller, the state of the series switch unit from the non-conductive state to the conductive state after the state of the parallel switch unit is changed from the conductive state to the non-conductive state when the state of the series switch unit is changed from the non-conductive state to the conductive state; when the state is changed from a state in which the first capacitor and the second capacitor are connected to the power storage in parallel to a state in which the first capacitor and the second capacitor are connected to the power storage in series by setting the parallel switch unit in the conductive state, switching, by the computer of the controller, the state to a state in which the first capacitor and the second capacitor are connected to the power storage in series in a state in which one of the first semiconductor switch unit and the second semiconductor switch unit provided in the parallel switch unit is in the conductive state after one of the first semiconductor switch unit and the second semiconductor switch unit provided in the series switch unit is allowed to be in the conductive state such that a current flowing through the parallel switch unit can return; and when the state is changed from a state in which the first capacitor and the second capacitor are connected to the power storage in series to a state in which the first capacitor and the second capacitor are connected to the power storage in parallel by setting the series switch unit in the conductive state, switching, by the computer of the controller, the state to a state in which the first capacitor and the second capacitor are connected to the power storage in parallel in a state in which one of the first semiconductor switch unit and the second semiconductor switch unit provided in the series switch unit is in the conductive state after one of the first semiconductor switch unit and the second semiconductor switch unit provided in the parallel switch unit is allowed to be in the conductive state such that a current flowing through the series switch unit can return.

(14): According to an aspect of the present invention, there is provided a non-transitory computer-readable storage medium storing a program for controlling a temperature raising device including an alternating current (AC) generation circuit configured to generate an AC current based on electric power stored in a power storage having an inductance component, wherein the AC generation circuit includes a first capacitor having a first end connected to a positive electrode side of the power storage; a second capacitor having a first end connected to a negative electrode side of the power storage; a parallel switch unit configured to connect the first capacitor and the second capacitor to the power storage in parallel by connecting a second end of the first capacitor and the first end of the second capacitor and connecting the first end of the first capacitor and a second end of the second capacitor; and a series switch unit configured to connect the first capacitor and the second capacitor to the power storage in series by connecting the second end of the first capacitor and the second end of the second capacitor, and a controller configured to alternately switch the state between a first state in which the parallel switch unit is in a conductive state and the series switch unit is in a non-conductive state and a second state in which the parallel switch unit is in the non-conductive state and the series switch unit is in the conductive state, the program causing a computer of the controller to: change the state of the parallel switch unit from the non-conductive state to the conductive state after the state of the series switch unit is changed from the conductive state to the non-conductive state when the state of the parallel switch unit is changed from the non-conductive state to the conductive state, and change the state of the series switch unit from the non-conductive state to the conductive state after the state of the parallel switch unit is changed from the conductive state to the non-conductive state when the state of the series switch unit is changed from the non-conductive state to the conductive state.

(15): According to an aspect of the present invention, there is provided a non-transitory computer-readable storage medium storing a program for controlling a temperature raising device including an alternating current (AC) generation circuit configured to generate an AC current based on electric power stored in a power storage having an inductance component, wherein the AC generation circuit includes a first capacitor having a first end connected to a positive electrode side of the power storage; a second capacitor having a first end connected to a negative electrode side of the power storage; a parallel switch unit configured to connect the first capacitor and the second capacitor to the power storage in parallel by connecting a second end of the first capacitor and the first end of the second capacitor and connecting the first end of the first capacitor and a second end of the second capacitor; and a series switch unit configured to connect the first capacitor and the second capacitor to the power storage in series by connecting the second end of the first capacitor and the second end of the second capacitor, and a controller configured to alternately switch the state between a first state in which the parallel switch unit is in a conductive state and the series switch unit is in a non-conductive state and a second state in which the parallel switch unit is in the non-conductive state and the series switch unit is in the conductive state, wherein each of the parallel switch unit and the series switch unit includes at least one semiconductor switch unit having a semiconductor switch element in which an ON state and an OFF state are controlled by the controller and a diode connected to each other in parallel, and wherein the parallel switch unit and the series switch unit include a first semiconductor switch unit and a second semiconductor switch unit that are the semiconductor switch units connected in series and directions of diodes of the first semiconductor switch unit and the second semiconductor switch unit are opposite to each other, the program causing a computer of the controller to: change the state of the parallel switch unit from the non-conductive state to the conductive state after the state of the series switch unit is changed from the conductive state to the non-conductive state when the state of the parallel switch unit is changed from the non-conductive state to the conductive state; change the state of the series switch unit from the non-conductive state to the conductive state after the state of the parallel switch unit is changed from the conductive state to the non-conductive state when the state of the series switch unit is changed from the non-conductive state to the conductive state; when the state is changed from a state in which the first capacitor and the second capacitor are connected to the power storage in parallel to a state in which the first capacitor and the second capacitor are connected to the power storage in series by setting the parallel switch unit in the conductive state, switch the state to a state in which the first capacitor and the second capacitor are connected to the power storage in series in a state in which one of the first semiconductor switch unit and the second semiconductor switch unit provided in the parallel switch unit is in the conductive state after one of the first semiconductor switch unit and the second semiconductor switch unit provided in the series switch unit is allowed to be in the conductive state such that a current flowing through the parallel switch unit can return; and when the state is changed from a state in which the first capacitor and the second capacitor are connected to the power storage in series to a state in which the first capacitor and the second capacitor are connected to the power storage in parallel by setting the series switch unit in the conductive state, switch the state to a state in which the first capacitor and the second capacitor are connected to the power storage in parallel in a state in which one of the first semiconductor switch unit and the second semiconductor switch unit provided in the series switch unit is in the conductive state after one of the first semiconductor switch unit and the second semiconductor switch unit provided in the parallel switch unit is allowed to be in the conductive state such that a current flowing through the series switch unit can return.

According to the above-described aspects (1) to (15), it is possible to improve the energy efficiency by raising the temperature of a secondary battery more efficiently.

BRIEF DESCRIPTION OF THE DRAWINGS

FIG. 23 is a diagram for comparing characteristics of an amplitude of the AC current generated by the AC generation circuit and the loss.

DETAILED DESCRIPTION OF THE INVENTION

Hereinafter, embodiments of a temperature raising device, a method of controlling the temperature raising device, and a storage medium of the present invention will be described with reference to the drawings. As used throughout this disclosure, the singular forms "a," "an," and "the" include plural reference unless the context clearly dictates otherwise.

[Configuration of Vehicle]

Figure 1:
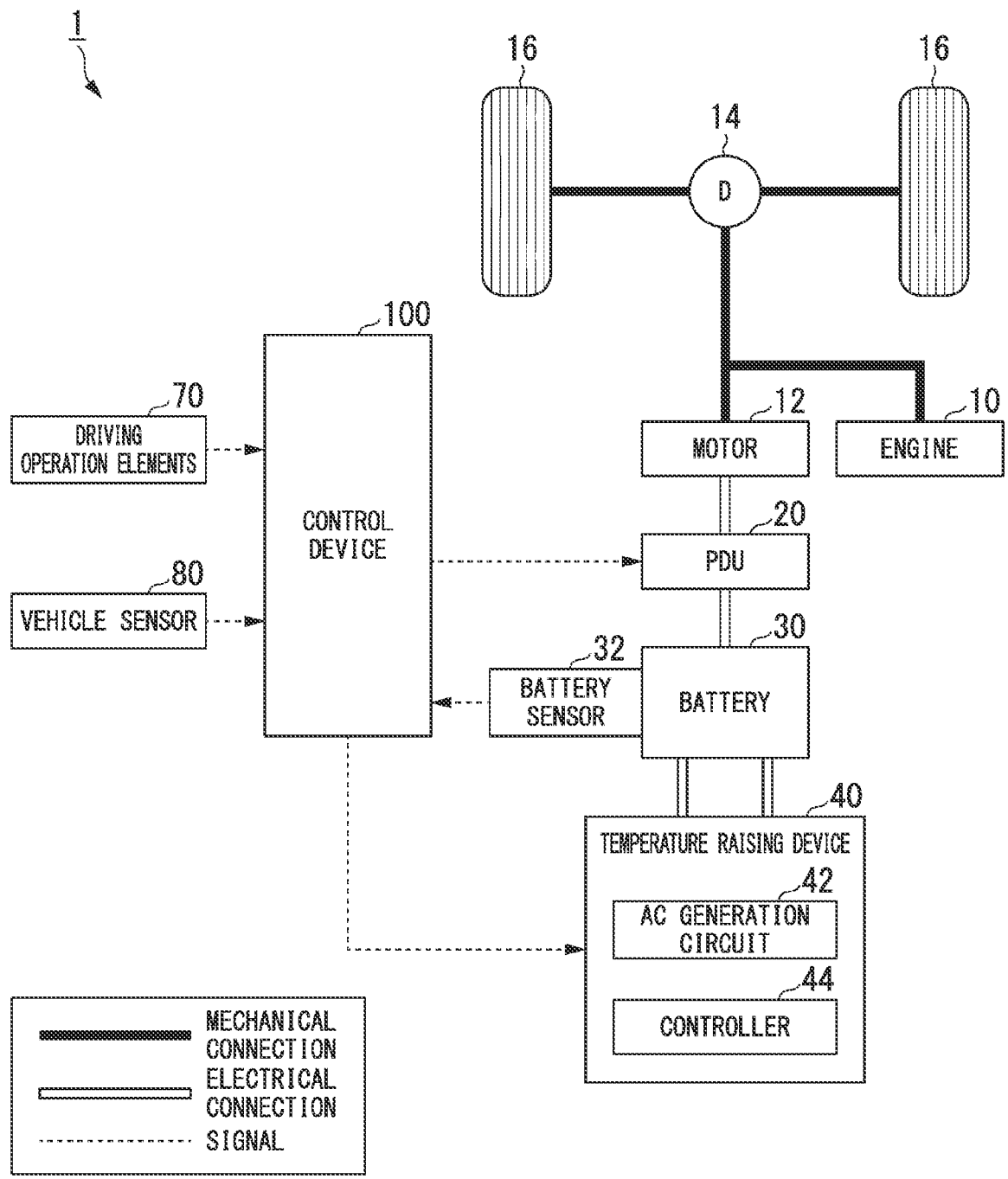
FIG. 1 is a diagram showing an example of a configuration of a vehicle in which a temperature raising device according to an embodiment is adopted.

FIG. 1 is a diagram showing an example of a configuration of a vehicle in which a temperature raising device according to an embodiment is adopted. A vehicle 1 is a hybrid electric vehicle (HEV) (hereinafter simply referred to as a "vehicle") that travels by combining driving of an electric motor driven with power supplied from a traveling battery (a secondary battery) or driving of an internal combustion engine that uses fuel as an energy source, such as, for example, a diesel engine or a gasoline engine. Vehicles to which the present invention is applied may be, for example, general vehicles such as four-wheeled vehicles, saddle-riding type two-wheeled vehicles, three-wheeled vehicles (including two front wheel and one rear wheel vehicles in addition to one front wheel and two rear wheel vehicles), and a vehicle that travels using an electric motor driven by power supplied from a traveling battery such as an assisted bicycle. The vehicle 1 may be, for example, an electric vehicle (EV) that travels according to driving of only an electric motor.

The vehicle 1 includes, for example, an engine 10, a motor 12, a speed reducer 14, drive wheels 16, a power drive unit (PDU) 20, a battery 30, a battery sensor 32, a temperature raising device 40, driving operation elements 70, a vehicle sensor 80, and a control device 100.

The engine 10 is an internal combustion engine that outputs motive power by burning fuel, for example, such as light oil or gasoline, stored in a fuel tank (not shown) of the vehicle 1 and operating (rotating) the engine 10. The engine 10 is a reciprocating engine including, for example, a cylinder and a piston, an intake valve, an exhaust valve, a fuel injection device, an ignition plug, a conrod, a crankshaft, and the like. The engine 10 may be a rotary engine. The rotational power of the engine 10 is transferred to the speed reducer 14.

The motor 12 is an electrical rotating machine for traveling of the vehicle 1. The motor 12 is, for example, a three-phase AC motor. The rotor of the motor 12 is connected to the speed reducer 14. The motor 12 is driven (rotated) by electric power supplied from the battery 30 via the PDU 20. The rotational power of the motor 12 is transferred to the speed reducer 14. The motor 12 may operate as a regenerative brake using kinetic energy of the vehicle 1 during deceleration to generate electric power. The motor 12 may include an electric motor for power generation. The electric motor for power generation uses, for example, the rotational power output by the engine 10 to generate electric power.

The speed reducer 14 is, for example, a differential gear. The speed reducer 14 allows a driving force of the shaft to which the engine 10 and the motor 12 are connected, i.e., the rotational power of the engine 10 and the motor 12, to be transferred to the axle to which the drive wheels 16 are connected. The speed reducer 14 may include, for example, a so-called transmission mechanism in which a plurality of gears or shafts are combined to change the rotational speed of the engine 10 or the motor 12 in accordance with a gear ratio and allow the rotational speed to be transferred to the axle. The speed reducer 14 may also include, for example, a clutch mechanism that directly connects or separates the rotational power of the engine 10 or the motor 12 to or from the axle.

The PDU 20 is, for example, an inverter, a direct current (DC)-DC converter, or an AC-DC converter. The PDU 20 converts the DC power supplied from the battery 30 into three-phase AC power for driving the motor 12 and outputs the AC power to the motor 12. The PDU 20 may include, for example, a voltage control unit (VCU) that boosts the DC power supplied from the battery 30. The PDU 20 converts the three-phase AC power generated by the motor 12 operating as a regenerative brake into DC power and outputs the DC power to the battery 30. The voltage of the PDU 20 may be boosted or lowered in accordance with the power output destination and the boosted or lowered voltage may be output. Although the components of the PDU 20 are shown as a single unitary configuration in FIG. 1, this is only an example and the components provided in the PDU 20 may be decentralized and arranged in the vehicle 1.

The battery 30 is a battery for traveling of the vehicle 1. The battery 30 is, for example, a battery including a secondary battery capable of iteratively being charged and discharged as a power storage unit such as a lithium-ion battery. The battery 30 may have a configuration that can be easily attached to and detached from the vehicle 1, such as a cassette type battery pack, or may have a stationary configuration that is not easily attached to and detached from the vehicle 1. The secondary battery provided in the battery 30 is, for example, a lithium-ion battery. Although, for example, a capacitor such as an electric double layer capacitor, a composite battery in which a secondary battery and a capacitor are combined, and the like as well as a lead storage battery, a nickel-hydrogen battery, a sodium ion battery, and the like can be considered for the secondary battery provided in the battery 30, the secondary battery may have any configuration. The battery 30 stores (is charged with) electric power introduced from an external charger (not shown) of the vehicle 1 and is discharged to supply the stored power such that the vehicle 1 is allowed to travel. The battery 30 stores (is charged with) the electric power generated by the motor 12 operated as a regenerative brake supplied via the PDU 20 and is discharged to supply the stored electric power for traveling (for example, accelerating) of the vehicle 1. The battery 30 has at least an inductance component.

Figure 2:
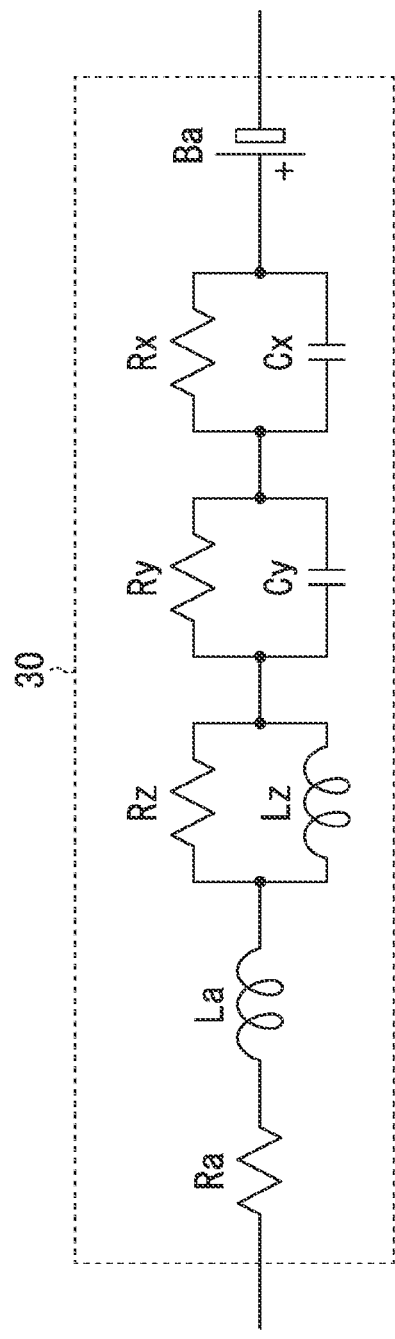
FIG. 2 is an example of an equivalent circuit of a battery provided in the vehicle.

FIG. 2 is an example of an equivalent circuit of the battery 30 provided in the vehicle 1. In the battery 30, for example, a parallel circuit of resistance Rx and capacitance Cx, a parallel circuit of resistance Ry and capacitance Cy, a parallel circuit of resistance Rz and inductance Lz, inductance La, and resistance Ra are connected to a positive electrode side of a power storage unit Ba in series. The battery 30 is an example of a "power storage" in the claims and the inductance La connected to the power storage unit Ba provided in the battery 30 is an example of an "inductance component" in the claims.

A battery sensor 32 is connected to the battery 30. The battery sensor 32 detects physical quantities such as a voltage, a current, and the temperature of the battery 30. The battery sensor 32 includes, for example, a voltage sensor, a current sensor, and a temperature sensor. The battery sensor 32 detects the voltage of the battery 30 using the voltage sensor, detects the current of the battery 30 using the current sensor, and detects the temperature of the battery 30 using the temperature sensor. The battery sensor 32 outputs information such as a detected voltage value, current value, and temperature of the battery 30 (hereinafter referred to as "battery information") to the control device 100.

The temperature raising device 40 raises the temperature of the battery 30 in accordance with control from the control device 100. The temperature raising device 40 includes, for example, an AC generation circuit 42 and a controller 44.

The AC generation circuit 42 includes, for example, a first capacitor connected to a positive electrode side of the battery 30, a second capacitor connected to a negative electrode side of the battery 30, a parallel switch unit in which the first capacitor and the second capacitor are connected to the battery 30 in parallel, and a series switch unit in which the first capacitor and the second capacitor are connected to the battery 30 in series. The AC generation circuit 42 generates an AC current using a resonance operation between the inductance La provided in the battery 30 and at least the first capacitor. More specifically, the AC generation circuit 42 generates an AC current based on electric power stored in the battery 30 according to a resonance operation in which magnetic energy stored in the inductance La provided in the battery 30 and electrostatic energy stored in at least the first capacitor are alternately exchanged. The AC generation circuit 42 raises the temperature of the battery 30 by applying the generated AC current to the battery 30 (allowing the generated AC current to flow through the battery 30).

The controller 44 switches the connection of the first capacitor and the second capacitor to the battery 30 to either the parallel connection or the serial connection by setting each of the parallel switch unit and the series switch unit provided in the AC generation circuit 42 in a conductive state or a non-conductive state. More specifically, the controller 44 alternately switches the state between a state in which the first capacitor and the second capacitor are connected to the battery 30 in parallel by setting the parallel switch unit in the conductive state and setting the series switch unit in the non-conductive state and a state in which the first capacitor and the second capacitor are connected to the battery 30 in series by setting the parallel switch unit in the non-conductive state and setting the series switch unit in the conductive state. At this time, the controller 44 provides a period during which both the parallel switch unit and the series switch unit are in the non-conductive state, i.e., a so-called dead time, and switches the connection of the first capacitor and the second capacitor to the battery 30 from a parallel connection to a series connection or vice versa.

A state in which the first capacitor and the second capacitor are connected to the battery 30 in parallel is an example of a "first state" in the claims and a state in which the first capacitor and the second capacitor are connected to the battery 30 in series is an example of a "second state" in the claims. Details of the temperature raising device 40 and the components provided in the temperature raising device 40 will be described below.

The driving operation elements 70 include, for example, an accelerator pedal, a brake pedal, a shift lever, a steering wheel, a variant steering wheel, a joystick, and other operation elements. The driving operation element 70 is equipped with a sensor that detects the presence or absence of an operation of a user (a driver) of the vehicle 1 on each operation element or an amount of operation. The driving operation element 70 outputs a detection result of the sensor to the control device 100.

The vehicle sensor 80 detects a traveling state of the vehicle 1. The vehicle sensor 80 includes, for example, a vehicle speed sensor that detects the speed of the vehicle 1 and an acceleration sensor that detects the acceleration of the vehicle 1. The vehicle sensor 80 outputs a detection result detected by each sensor to the control device 100.

The control device 100 controls an operation of the engine 10 or the motor 12 in accordance with a detection result output by each sensor provided in the driving operation element 70, i.e., an operation of the user (the driver) of the vehicle 1 on each operation element. In other words, the control device 100 controls a driving force of the motor 12. The control device 100 may include, for example, separate control devices such as an engine control unit, a motor control unit, a battery control unit, a PDU control unit, and a VCU control unit. For example, the control device 100 may be replaced with a control device such as an engine electronic control unit (ECU), a motor ECU, a battery ECU, a PDU-ECU, or a VCU-ECU.

The control device 100 controls a supply amount of AC power supplied from the battery 30 to the motor 12 and a frequency (i.e., a voltage waveform) of the AC power to be supplied when the vehicle 1 travels. At this time, the control device 100 controls the activation of the temperature raising device 40 on the basis of information of the temperature of the battery 30 included in the battery information output by the battery sensor 32. That is, the control device 100 controls the activation or stopping of the temperature raising device 40 such that the temperature of the battery 30 is increased (raised) to a temperature suitable for use to limit the deterioration of the charging/discharging performance of the battery 30. The control device 100 may be replaced with, for example, the controller 44 provided in the temperature raising device 40. That is, the control device 100 may have a configuration in which each of the parallel switch unit and the series switch unit of the AC generation circuit 42 provided in the temperature raising device 40 is directly controlled such that it is in the conductive state or the non-conductive state as the controller 44.

The control device 100 operates, for example, when a hardware processor such as a central processing unit (CPU) executes a program (software). The control device 100 may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The control device 100 may be implemented by a dedicated LSI circuit. The program may be pre-stored in a storage device (a storage device including a non-transitory storage medium) such as a hard disk drive (HDD) or a flash memory provided in the vehicle 1 or may be stored in a removable storage medium (a non-transitory storage medium) such as a DVD or a CD-ROM and installed in the HDD or the flash memory provided in the vehicle 1 when the storage medium is mounted in the drive device provided in the vehicle 1.

First Embodiment

[Configuration of AC Generation Circuit Provided in Temperature Raising Device]

Figure 3:
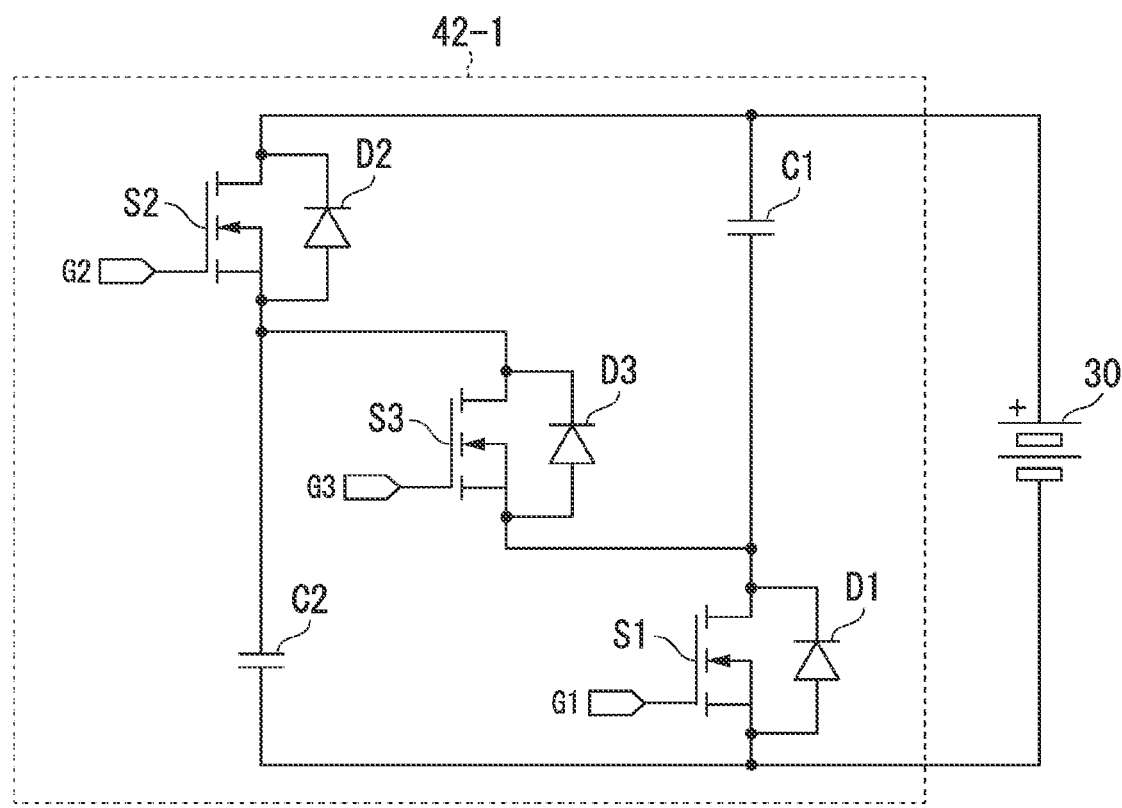
FIG. 3 is a diagram showing an example of a configuration of an AC generation circuit provided in the temperature raising device according to a first embodiment.

FIG. 3 is a diagram showing an example of a configuration of the AC generation circuit 42 (hereinafter referred to as an "AC generation circuit 42-1") provided in the temperature raising device 40 according to the first embodiment. In FIG. 3, the battery 30 related to the AC generation circuit 42-1 is also shown. However, the illustration of the inductance La provided in the battery 30 is omitted in FIG. 3. The AC generation circuit 42-1 includes, for example, a capacitor C1, a capacitor C2, a switching element S1, a switching element S2, a switching element S3, a diode D1, a diode D2, and a diode D3. The capacitor C1 and the capacitor C2 are capacitors having the same capacitance. Each of the switching element S1, the switching element S2, and the switching element S3 is a semiconductor switching element such as an N-channel type metal oxide semiconductor field effect transistor (MOSFET).

The switching element S1 and the diode D1 are connected to each other in parallel and constitute a semiconductor switch unit. In the following description, the semiconductor switch unit including the switching element S1 and the diode D1 is also referred to as a "semiconductor switch unit SW1." More specifically, in the semiconductor switch unit SW1, a drain terminal of the switching element S1 and a cathode terminal of the diode D1 are connected to each other on a first terminal side and a source terminal of the switching element S1 and an anode terminal of the diode D1 are connected to each other on a second terminal side. A gate terminal of the switching element S1 is controlled (a control voltage or a control current is applied) according to a gate signal G1 output by the controller 44. That is, the semiconductor switch unit SW1 is controlled such that it is in either an ON state or an OFF state according to the gate signal G1 output by the controller 44. In the semiconductor switch unit SW1, the diode D1 functions as a freewheeling diode for returning the current flowing through the switching element S1. Although the switching element S1 may have a parasitic diode (a so-called body diode) due to its configuration, the connected diode D1 can allow the current to return more efficiently than the parasitic diode in the semiconductor switch unit SW1.

The same is also true for the switching element S2 and the diode D2 and the switching element S3 and the diode D3. In the following description, likewise, the semiconductor switch unit including the switching element S2 and the diode D2 is also referred to as a "semiconductor switch unit SW2" and the semiconductor switch unit including the switching element S3 and the diode D3 is also referred to as a "semiconductor switch unit SW3."

In the AC generation circuit 42-1, a first end of the capacitor C1 is connected to the positive electrode side of the battery 30 and a first end of the capacitor C2 is connected to the negative electrode side of the battery 30. Further, in the AC generation circuit 42-1, a first terminal of the semiconductor switch unit SW2 is connected to the first end of the capacitor C1 and a second terminal of the semiconductor switch unit SW1 is connected to the first end of the capacitor C2. In the AC generation circuit 42-1, a first terminal of the semiconductor switch unit SW1 and a second terminal of the semiconductor switch unit SW3 are connected to a second end of the capacitor C1 and the second terminal of the semiconductor switch unit SW2 and the first terminal of the semiconductor switch unit SW3 are connected to a second end of the capacitor C2.

According to such a configuration, in the AC generation circuit 42-1, the capacitor C1 and the capacitor C2 are connected in parallel or in series between the positive electrode side and the negative electrode side of the battery 30 in accordance with the control from the controller 44. More specifically, the controller 44 outputs the gate signal G1 for setting the ON state to the switching element S1 provided in the semiconductor switch unit SW1, outputs a gate signal G2 for setting the ON state to the switching element S2 provided in the semiconductor switch unit SW2, and outputs a gate signal G3 for setting the OFF state to the switching element S3 provided in the semiconductor switch unit SW3, such that the capacitor C1 and the capacitor C2 are connected in parallel between the positive electrode side and the negative electrode side of the battery 30. On the other hand, the controller 44 outputs the gate signal G1 for setting the OFF state to the switching element S1 provided in the semiconductor switch unit SW1, outputs the gate signal G2 for setting the OFF state to the switching element S2 provided in the semiconductor switch unit SW2, and outputs the gate signal G3 for setting the ON state to the switching element S3 provided in the semiconductor switch unit SW3, such that the capacitor C1 and the capacitor C2 are connected in series between the positive electrode side and the negative electrode side of the battery 30.

In the AC generation circuit 42-1, the capacitor C1 is an example of a "first capacitor" in the claims and the capacitor C2 is an example of a "second capacitor" in the claims. In the AC generation circuit 42-1, a configuration in which the semiconductor switch unit SW1 and the semiconductor switch unit SW2 are combined is an example of a "parallel switch unit" in the claims and the semiconductor switch unit SW3 is an example of a "series switch unit" in the claims. In each semiconductor switch unit, the ON state of the switching element is an example of a "conductive state" in the claims and the OFF state of the switching element is an example of the "non-conductive state" in the claims. In the AC generation circuit 42-1, the state in which the capacitor C1 and the capacitor C2 are connected in parallel between the positive electrode side and the negative electrode side of the battery 30 is an example of a "first state" in the claims and the state in which the capacitor C1 and the capacitor C2 are connected in series between the positive electrode side and the negative electrode side of the battery 30 is an example of a "second state" in the claims.

[Operation of Temperature Raising Device]

Figure 4:
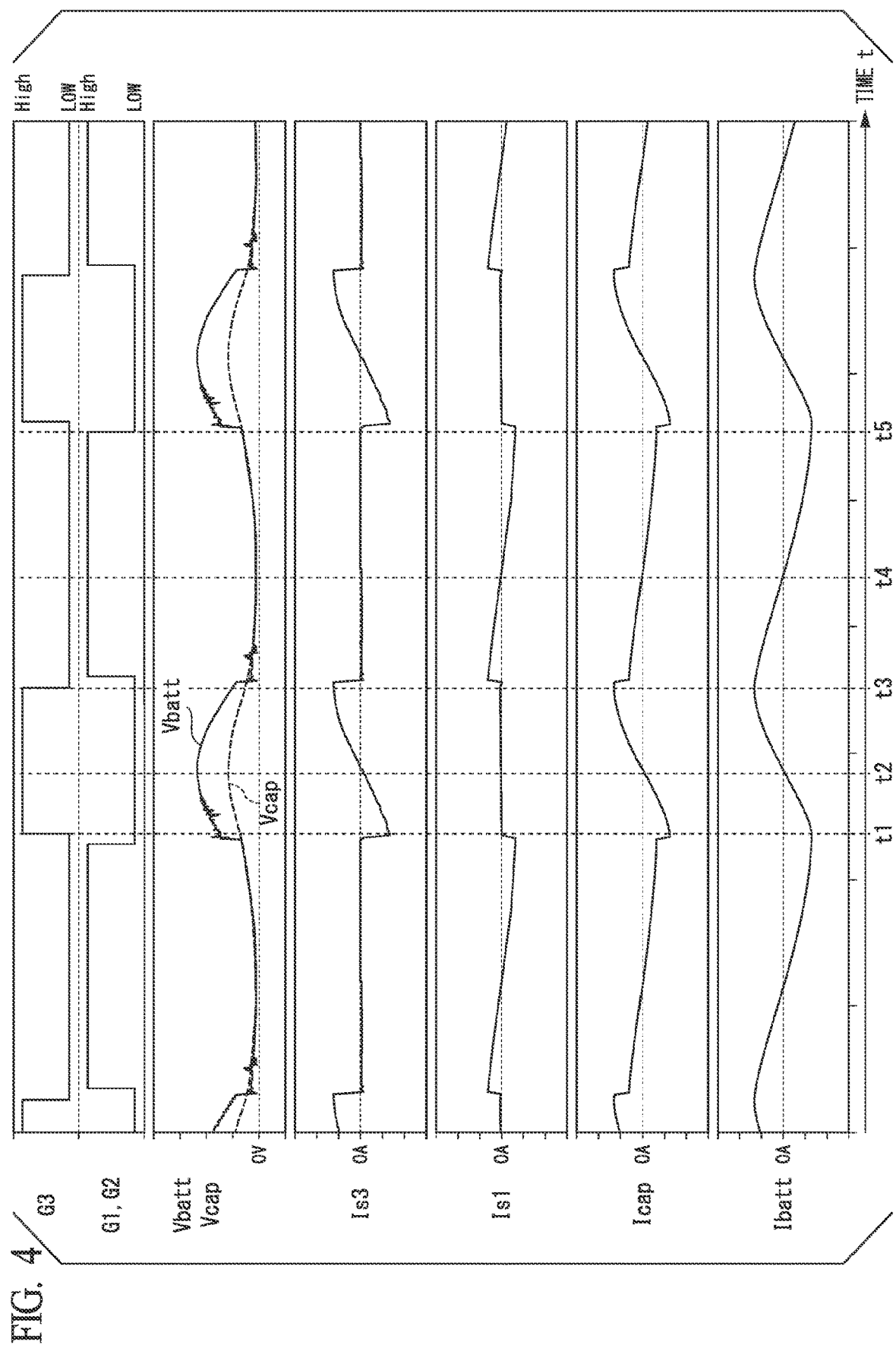
FIG. 4 is a diagram showing an example of control of a controller and an operation waveform of the AC generation circuit according to the first embodiment.
Figure 5:
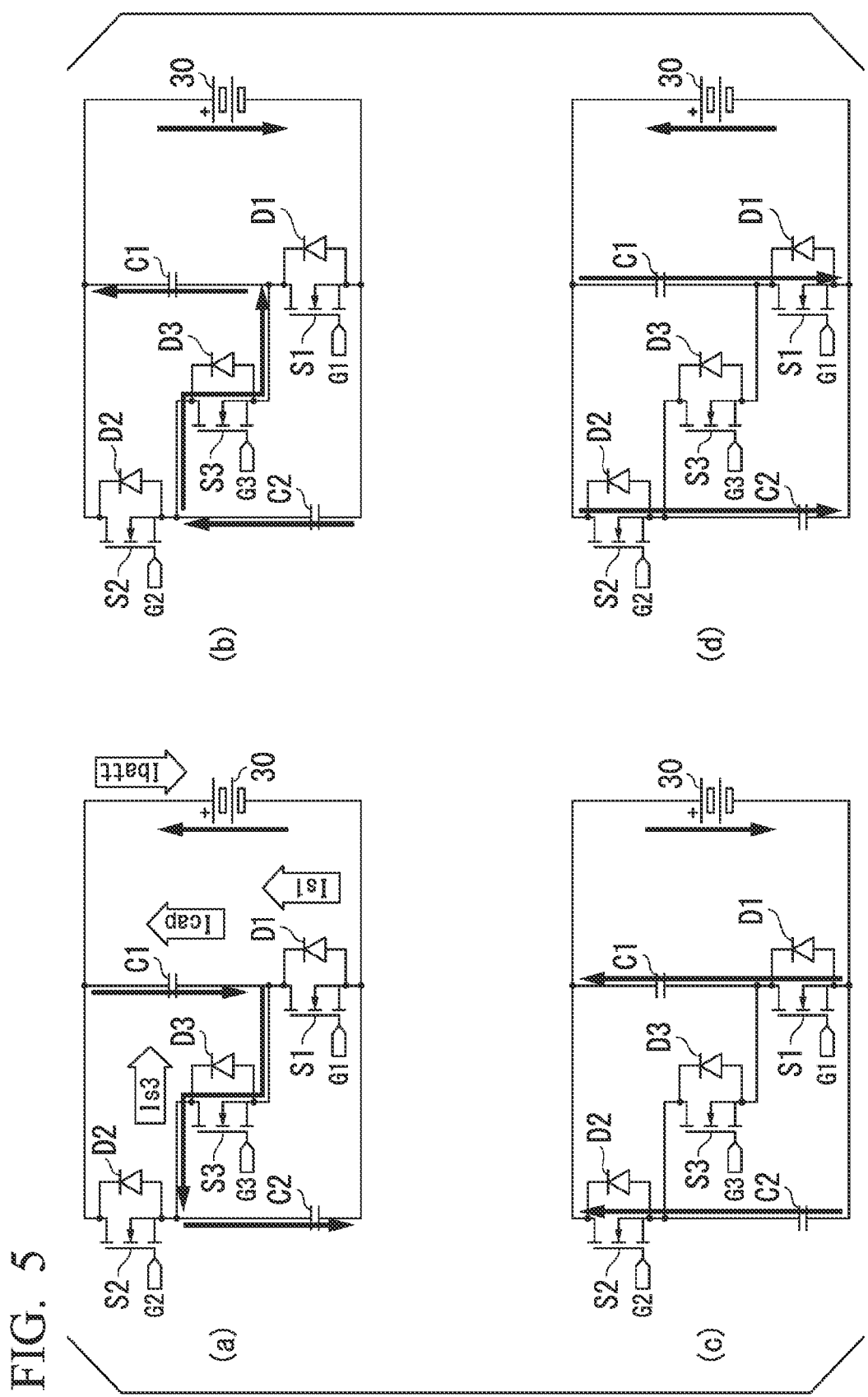
FIG. 5 is a diagram showing an example of a path of an AC current flowing into the AC generation circuit of the first embodiment.

Next, an operation of generating an AC current in the AC generation circuit 42-1, i.e., the control of each semiconductor switch unit in the controller 44 will be described. FIG. 4 is a diagram showing an example of the control of the controller 44 and the operation waveform (the simulation waveform) of the AC generation circuit 42-1 according to the first embodiment. FIG. 5 is a diagram showing an example of a path of an AC current flowing into the AC generation circuit 42-1 of the first embodiment.

In FIG. 4, each of the gate signal G1, the gate signal G2, and the gate signal G3 output by the controller 44 to each semiconductor switch unit is shown. In FIG. 4, a "High" level of each of the gate signal G1, the gate signal G2, and the gate signal G3 is the ON state of the corresponding switching element and a "Low" level thereof is the OFF state of the corresponding switching element. In the following description, setting the gate signal at the "High" level is referred to as "setting the semiconductor switch unit in the conductive state" and setting the gate signal at the "Low" level is referred to as "setting the semiconductor switch unit in the non-conductive state." As shown in FIG. 4, the controller 44 provides a period (a dead time) in which all semiconductor switch units are in the non-conductive state between a period in which the semiconductor switch unit is in the conductive state and a period in which the semiconductor switch unit is in the non-conductive state.

In FIG. 4, an example of a change in each of a voltage Vbatt between two electrodes of the battery 30 (including the inductance La) and a voltage Vcap between both ends of the capacitor C1 that change when the controller 44 controls the gate signal G1, the gate signal G2, and the gate signal G3 is shown. Further, in FIG. 4, an example of a change in each of a current Is3 flowing through the semiconductor switch unit SW3, a current Is1 flowing through the semiconductor switch unit SW1, a current Icap flowing through the capacitor C1, and a current Ibatt flowing through the battery 30 (including the inductance La) that change when the controller 44 controls the gate signal G1, the gate signal G2, and the gate signal G3 is shown.

Because the operation is periodically iterated when the temperature raising device 40 is activated by the control device 100, an operation of the AC generation circuit 42-1 from time t1 shown in FIG. 4 will be described with reference to FIG. 5 as appropriate in the following description.

In the AC generation circuit 42-1, immediately before time t1, the current Is3 and the current Icap flow from the battery 30 in a direction in which each of the capacitors C1 and C2 is charged through the path shown in (d) of FIG. 5. At time t1 when the semiconductor switch unit SW1 and the semiconductor switch unit SW2 are in the non-conductive state, the capacitor C1 and the capacitor C2 are connected to the battery 30 in series if the controller 44 sets the gate signal G3 at the "High" level and sets the semiconductor switch unit SW3 in the conductive state. Thereby, in the AC generation circuit 42-1, the current Is3 and the current Icap flow from the battery 30 in a direction in which the capacitors C1 and C2 are charged through the path shown in (a) of FIG. 5. Thereby, in the AC generation circuit 42-1, the voltage Vcap increases and the current Ibatt decreases to 0 A.

When the voltage Vcap becomes a positive peak voltage at time t2, the direction of the current Ibatt is reversed this time. Even at this time, the semiconductor switch unit SW1 and the semiconductor switch unit SW2 are still in the non-conductive state. Thus, in the AC generation circuit 42-1, each of the capacitor C1 and the capacitor C2 transitions to a discharging state and the current Is3 and the current Icap are generated in a direction in which the battery 30 is charged through the path shown in (b) of FIG. 5. Thereby, in the AC generation circuit 42-1, the current Ibatt continuously increases in the direction in which the battery 30 is charged and the voltage Vcap turns in a decreasing direction.

Subsequently, at time t3, the controller 44 first sets the gate signal G3 at the "Low" level and sets the semiconductor switch unit SW3 in the non-conductive state. Thereby, in the AC generation circuit 42-1, the path of the current Is3 is cut off and the current Is3 becomes 0 A.

Subsequently, the controller 44 sets the gate signal G1 and the gate signal G2 at the "High" level and sets the semiconductor switch unit SW1 and the semiconductor switch unit SW2 in the conductive state. Thereby, in the AC generation circuit 42-1, the capacitor C1 and the capacitor C2 are connected to the battery 30 in parallel. Thereby, in the AC generation circuit 42-1, the current (the current Is1) for charging the battery 30 by discharging each of the capacitor C1 and the capacitor C2 flows through the path shown in (c) of FIG. 5. In the AC generation circuit 42-1, the current Ibatt turns in a decreasing direction and the voltage Vcap continuously decreases.

When the current Ibatt becomes 0 A at time t4, the direction of the current Ibatt is reversed this time. Even at this time, the semiconductor switch unit SW1 and the semiconductor switch unit SW2 are still in the conductive state. Thus, in the AC generation circuit 42-1, a current (the current Icap) flows from the battery 30 in a direction in which each of the capacitor C1 and the capacitor C2 is charged through the path shown in (d) of FIG. 5. Thereby, in the AC generation circuit 42-1, the current Ibatt continuously increases in the direction in which the battery 30 is discharged and the voltage Vcap continuously increases.

Subsequently, at time t5, the controller 44 first sets the gate signal G1 and the gate signal G2 at the "Low" level and sets the semiconductor switch unit SW1 and the semiconductor switch unit SW2 in the non-conductive state. Thereby, in the AC generation circuit 42-1, the path of the current Icap becomes a path (a return path) that passes through the diode D1 provided in the semiconductor switch unit SW1 and the path of the current from the capacitor C2 becomes a path (a return path) that passes through the diode D2 provided in the semiconductor switch unit SW2. However, as in the path shown in (d) of FIG. 5, a current (the current Icap) continues to flow from the battery 30 in a direction in which each of the capacitor C1 and the capacitor C2 is charged.

Subsequently, the controller 44 sets the gate signal G3 at the "High" level and sets the semiconductor switch unit SW3 in the conductive state. In this case, the operation of the AC generation circuit 42-1 is similar to an operation at time t1 described above. Subsequently, likewise, each of the AC generation circuit 42-1 and the controller 44 periodically iterates the above-described operation.

In this way, in the temperature raising device 40, the controller 44 generates a current Ibatt (an AC current) flowing through the battery 30 according to a resonance operation between the inductance La provided in the battery 30 and at least the capacitor C1 by controlling the conductive state and the non-conductive state of each semiconductor switch unit and switching a connection of the capacitors C1 and C2 to the battery 30 to a series connection or a parallel connection. Thereby, the temperature of the battery 30 is increased due to the current Ibatt.

At a timing at which the controller 44 controls the semiconductor switch unit at this time, i.e., a timing at which the connection between the capacitor C1 and the capacitor C2 is switched, the state of another semiconductor switch unit is changed from the non-conductive state to the conductive state after the state of the semiconductor switch unit is first changed from the conductive state to the non-conductive state as described at time t3 or time t5 in FIG. 4. In other words, the controller 44 is configured to temporarily return the current flowing through the switching element provided in each semiconductor switch unit to the diode and then control each semiconductor switch unit such that a connection between the capacitor C1 and the capacitor C2 is switched.

Here, the timing when the controller 44 controls the semiconductor switch unit (for example, the timing of time t3 or time t5 shown in FIG. 4) may be determined by the controller 44 measuring (monitoring) a current value or a voltage value of a component provided in the AC generation circuit 42-1 or the battery 30 or may be determined on the basis of an operation state of the AC generation circuit 42-1. For example, when the timing is determined by monitoring the current value or the voltage value, the controller 44 may monitor the current value (the current Icap) or the voltage value (the voltage Vcap) of the capacitor C1, the current value or the voltage value of the capacitor C2, the current value (the current Ibatt) of the battery 30 or the voltage value (the voltage batt) between the positive electrode side and the negative electrode side thereof, and the current values (the current Is1 and the current Is3) of one or more semiconductor switch units (for example, the semiconductor switch unit of the conductive state) or the voltage value between both ends thereof. In this case, in the AC generation circuit 42-1, a current sensor for detecting the current and a voltage sensor for detecting the voltage are arranged at a position where the controller 44 monitors the current value and the voltage value. Thereby, the controller 44 can determine that a timing for controlling the semiconductor switch unit such as time t3 or time t5 shown in FIG. 4 has been reached. For example, when the timing is determined on the basis of the operating state of the AC generation circuit 42-1, the controller 44 determines that a prescribed timing based on the AC current is a timing for controlling the semiconductor switch unit. A prescribed timing based on the AC current is, for example, a timing of a period (for example, a prescribed period of time ago or the like) capable of being determined (decided on) from the interval or the duty ratio of the AC current such as a timing when the AC current is decreased to 0 A or a timing when the AC current is increased to 0 A. Thereby, the controller 44 can determine a timing for controlling the semiconductor switch unit, such as time t3 or time t5 shown in FIG. 4, on the basis of characteristics of the AC current that is generated and applied (flowing) to the battery 30.

As described above, in the temperature raising device 40 of the first embodiment, the AC generation circuit 42-1 can generate an AC current based on electric power stored in the battery 30 and increase the temperature of the battery 30 more efficiently using a resonance operation of alternately exchanging magnetic energy stored in the inductance La provided in the battery 30 and electrostatic energy stored in at least the capacitor C1.

By the way, it is assumed that a current may flow along an unintended path, for example, according to a condition such as a magnitude, an interval, or a duty ratio of the generated AC current, because a freewheeling diode is provided in each semiconductor switch unit in the AC generation circuit 42-1. For example, when the frequency of the AC current generated by the AC generation circuit 42-1 is higher than the resonance frequency, the amplitude of the AC current becomes narrow, such that the amplitude of the voltage between the terminals of the capacitor C1 and the capacitor C2 also becomes narrow. In this case, in the AC generation circuit 42-1, as shown in FIG. 4, the voltages (for example, the voltage Vcap) of the capacitors C1 and C2 are always positive voltage values. However, when the frequency of the AC current generated by the AC generation circuit 42-1 is brought closer to a resonance frequency, the amplitude of the AC current becomes wider and the amplitude of the voltage between the terminals of the capacitor C1 and the capacitor C2 also becomes wider. In this case, in the AC generation circuit 42-1, for example, as in a period from time t2 to time t3 shown in FIG. 4, when the capacitor C1 and the capacitor C2 are connected in series to charge the battery 30, the voltages (for example, the voltage Vcap) of the capacitor C1 and the capacitor C2 may become negative voltage values. Therefore, in the AC generation circuit 42-1, the voltages of the capacitor C1 and the capacitor C2 become negative voltage values, such that the voltage of the switching element provided in the semiconductor switch unit becomes a reverse bias and a path (an unintended path) of a current that does not involve each of the capacitor C1 and the capacitor C2 is formed. In this case, in the AC generation circuit 42-1, the energy exchanged between the inductance La and the capacitor C1 in the resonance operation is reduced and the amplitude of the AC current is narrowed. Thereby, in the AC generation circuit 42-1, the efficiency of raising the temperature of the battery 30 is lowered.

Figure 6:
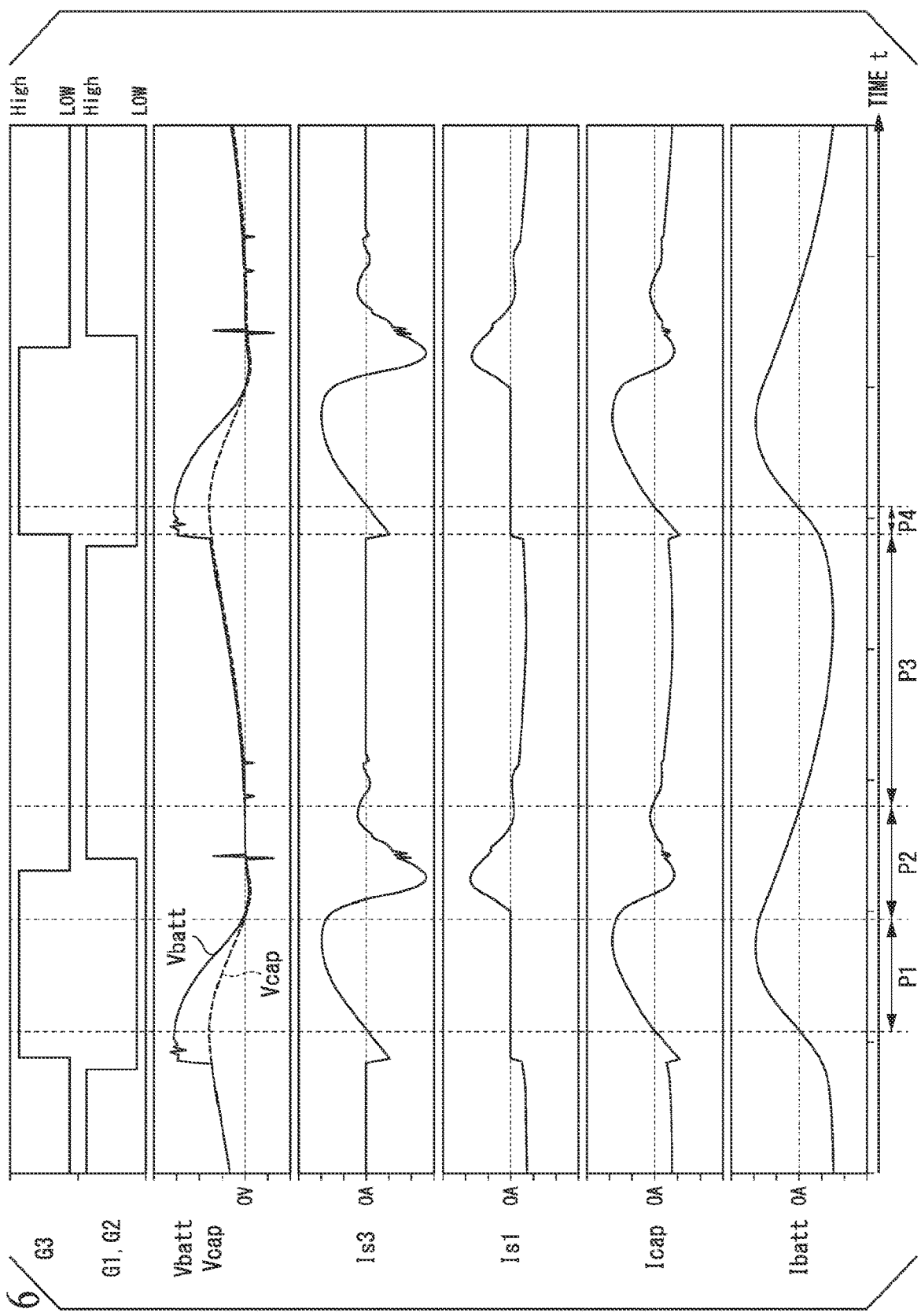
FIG. 6 is a diagram showing another example of the control of the controller and the operation waveform of the AC generation circuit according to the first embodiment.
Figure 7:
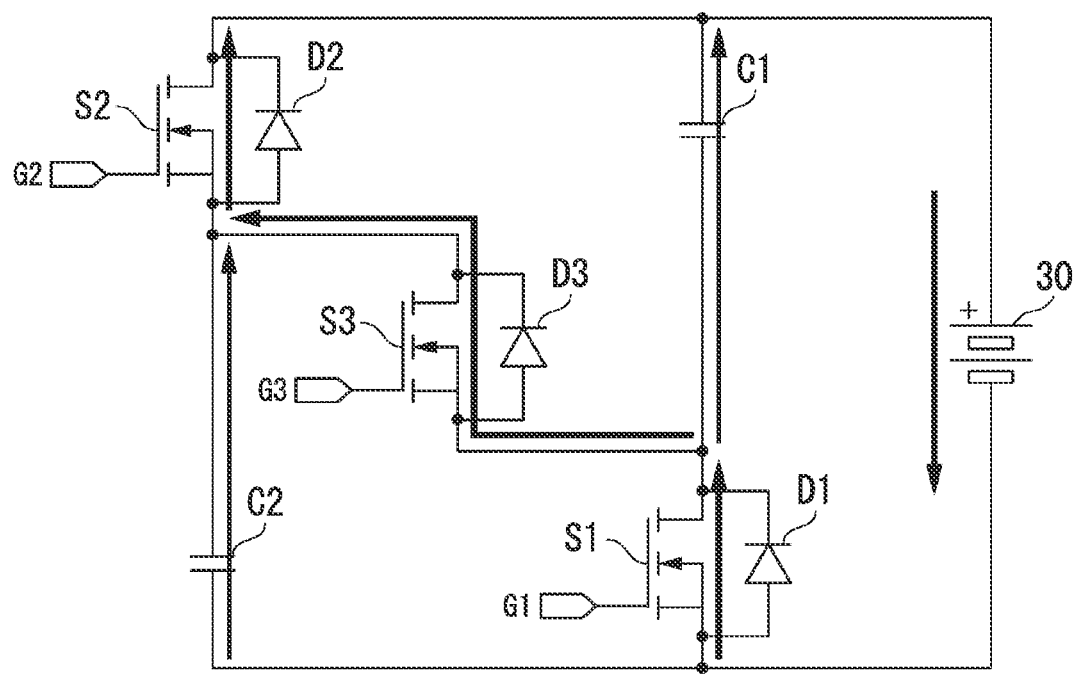
FIG. 7 is a diagram showing another example of an AC path flowing into the AC generation circuit of the first embodiment.

Here, an example of a case where a current flows through an unintended path in the AC generation circuit 42-1 will be described. FIG. 6 is a diagram showing another example of the control of the controller 44 and the operation waveform (the simulation waveform) of the AC generation circuit 42-1 according to the first embodiment. FIG. 7 is a diagram showing another example of the path of the AC current flowing into the AC generation circuit 42-1 according to the first embodiment. In FIG. 6, an example when an amplitude of the AC current is narrowed due to a current flowing through an unintended path when the capacitors C1 and C2 are connected in series and the capacitors are charged in the AC generation circuit 42-1 is shown. In the following description, attention is paid to an operation when a current flows along an unintended path and the operation of the AC generation circuit 42-1 will be described with reference to FIG. 7.

In the AC generation circuit 42-1, during a period P1 in which the capacitor C1 and the capacitor C2 are connected to the battery 30 in series, each of the capacitor C1 and the capacitor C2 is discharged, the current Is3 and the current Icap flow along a path similar to that shown in (b) of FIG. 5, the voltage Vcap decreases, and the current Ibatt increases.

Subsequently, when the voltage Vcap is changed from 0 V to a negative region, the current Is3 and the current Icap flow from the battery 30 in the direction in which the capacitor C1 and the capacitor C2 are charged. At this time, normally, the current should flow without being changed from a path similar to that shown in (b) of FIG. 5. However, the inductance La provided in the battery 30 continuously draws the current, such that an unintended current path as shown in FIG. 7 is formed. More specifically, the current flows in the order of the semiconductor switch unit SW1, the semiconductor switch unit SW3, and the semiconductor switch unit SW2, and a path of a current that does not involve each of the capacitor C1 and the capacitor C2 is formed. Thereby, in the AC generation circuit 42-1, because the semiconductor switch unit SW1 and the semiconductor switch unit SW3 are in the non-conductive state during the period P2, the current Is1, which should not flow normally (which is 0 A), increases and the current Icap for charging the capacitor C1 and the capacitor C2 is reduced as shown in FIG. 7. That is, the electrostatic energy that is exchanged with the inductance La provided in the battery 30 for performing the resonance operation is reduced. As a result, in the AC generation circuit 42-1, the decrease of the voltage Vcap is stagnant, the current Ibatt turns and flows in a decreasing direction without increasing sufficiently, and the amplitude of the AC current becomes narrow.

Subsequently, the controller 44 allows the capacitor C1 and the capacitor C2 to be connected to the battery 30 in parallel, but the current path does not change from the path shown in FIG. 7 during the period P2.

Subsequently, when the current Ibatt becomes 0 A, the direction of the current Ibatt is reversed and the capacitor C1 and the capacitor C2 are connected to the battery 30 in parallel, such that a current flows through each of the capacitor C1 and the capacitor C2 along a path similar to that shown in (d) of FIG. 5 during the period P3. Thereby, in the AC generation circuit 42-1, an amount of charge for the capacitor C1 and the capacitor C2 increases and the voltage Vcap begins to increase.

Subsequently, when the controller 44 sets the gate signal G1 and the gate signal G2 at the "Low" level and sets the semiconductor switch unit SW1 and the semiconductor switch unit SW2 in the non-conductive state, a current flows along a path similar to that shown in (a) of FIG. 5 during the period P4. Subsequently, the controller 44 sets the gate signal G3 at the "High" level and sets the semiconductor switch unit SW3 in the conductive state. At this time, the current path in the AC generation circuit 42-1 does not change, but the direction of the current Ibatt is subsequently reversed and the current path returns to the path similar to that of the period P1 (the path shown in (b) of FIG. 5). Subsequently, likewise, the above-described operation is periodically iterated.

As described above, in the temperature raising device 40 of the first embodiment, the current Ibatt (the AC current) flowing through the battery 30 is generated according to the resonance operation between the inductance La provided in the battery 30 and at least the capacitor C1. However, in the temperature raising device 40 of the first embodiment, for example, when a current flows along an unintended path due to conditions such as a magnitude, an interval, and a duty ratio of the generated AC current, the amplitude of the generated AC current may be narrowed and the efficiency of raising the temperature of the battery 30 may be lowered.

Second Embodiment

[Configuration of AC Generation Circuit Provided in Temperature Raising Device]

Figure 8:
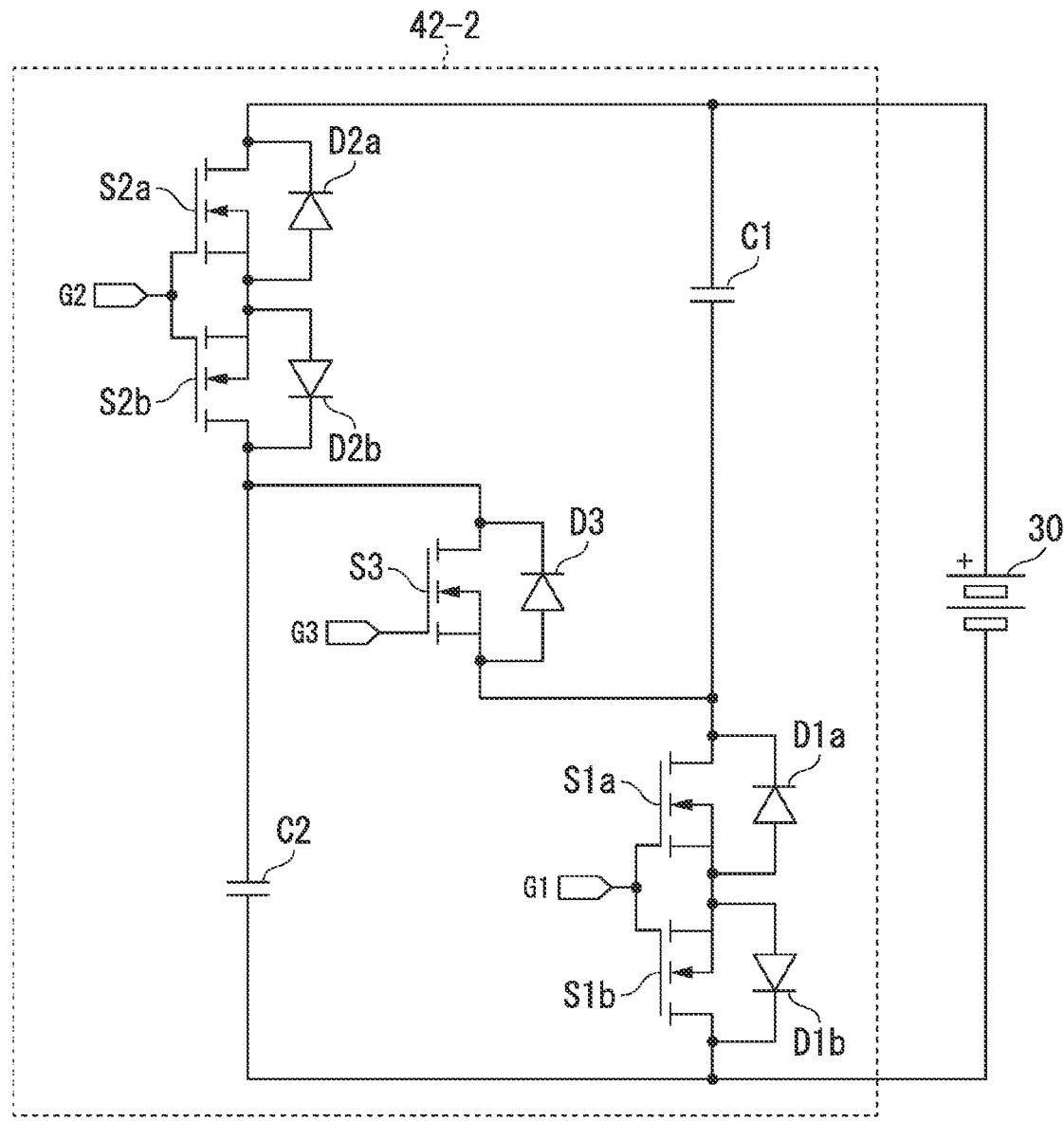
FIG. 8 is a diagram showing an example of a configuration of an AC generation circuit provided in a temperature raising device according to a second embodiment.

FIG. 8 is a diagram showing an example of a configuration of an AC generation circuit 42 (hereinafter referred to as an "AC generation circuit 42-2") provided in a temperature raising device 40 according to a second embodiment. In FIG. 8, a battery 30 related to the AC generation circuit 42-2 (here, inductance La is not shown) is also shown. The AC generation circuit 42-2 is configured to avoid the formation of an unintended path assumed in the AC generation circuit 42-1 of the first embodiment. The AC generation circuit 42-2 includes, for example, a capacitor C1, a capacitor C2, a switching element S1a, a switching element S1b, a switching element S2a, a switching element S2b, a switching element S3, a diode D1a, a diode D1b, a diode D2a, a diode D2b, and a diode D3.

The AC generation circuit 42-2 includes a bidirectional semiconductor switch unit by connecting a first semiconductor switch unit including the switching element S1a and the diode D1a and a second semiconductor switch unit including the switching element S1b and the diode D1b in series in a state in which the diodes are set in directions opposite to each other. In the following description, the semiconductor switch unit having this configuration is also referred to as a "bidirectional semiconductor switch unit SW1-2." Gate terminals of the switching element S1a and the switching element S1b are controlled such that they are turned on or off by the gate signal G1 output by the controller 44. In the bidirectional semiconductor switch unit SW1-2, the diode D1a and the diode D1b function as freewheeling diodes for returning currents in directions opposite to each other.

The semiconductor switch unit including the switching element S2a, the switching element S2b, the diode D2a, and the diode D2b is similar to the bidirectional semiconductor switch unit SW1-2. In the following description, likewise, the semiconductor switch unit having this configuration is also referred to as a "bidirectional semiconductor switch unit SW2-2."

The connection of the capacitor C1, the capacitor C2, the bidirectional semiconductor switch unit SW1-2, the bidirectional semiconductor switch unit SW2-2, and the semiconductor switch unit SW3 in the AC generation circuit 42-2 is equivalent to that in the AC generation circuit 42-1 of the first embodiment.

According to such a configuration, even in the AC generation circuit 42-2, as in the AC generation circuit 42-1, the capacitor C1 and the capacitor C2 are connected in parallel or in series between the positive electrode side and the negative electrode side of the battery 30 in accordance with control from the controller 44.

In the AC generation circuit 42-2, a configuration in which the bidirectional semiconductor switch unit SW1-2 and the bidirectional semiconductor switch unit SW2-2 are combined is an example of a "parallel switch unit" in the claims and the semiconductor switch unit SW3 is an example of a "series switch unit" in the claims.

[Operation of Temperature Raising Device]

Figure 9:
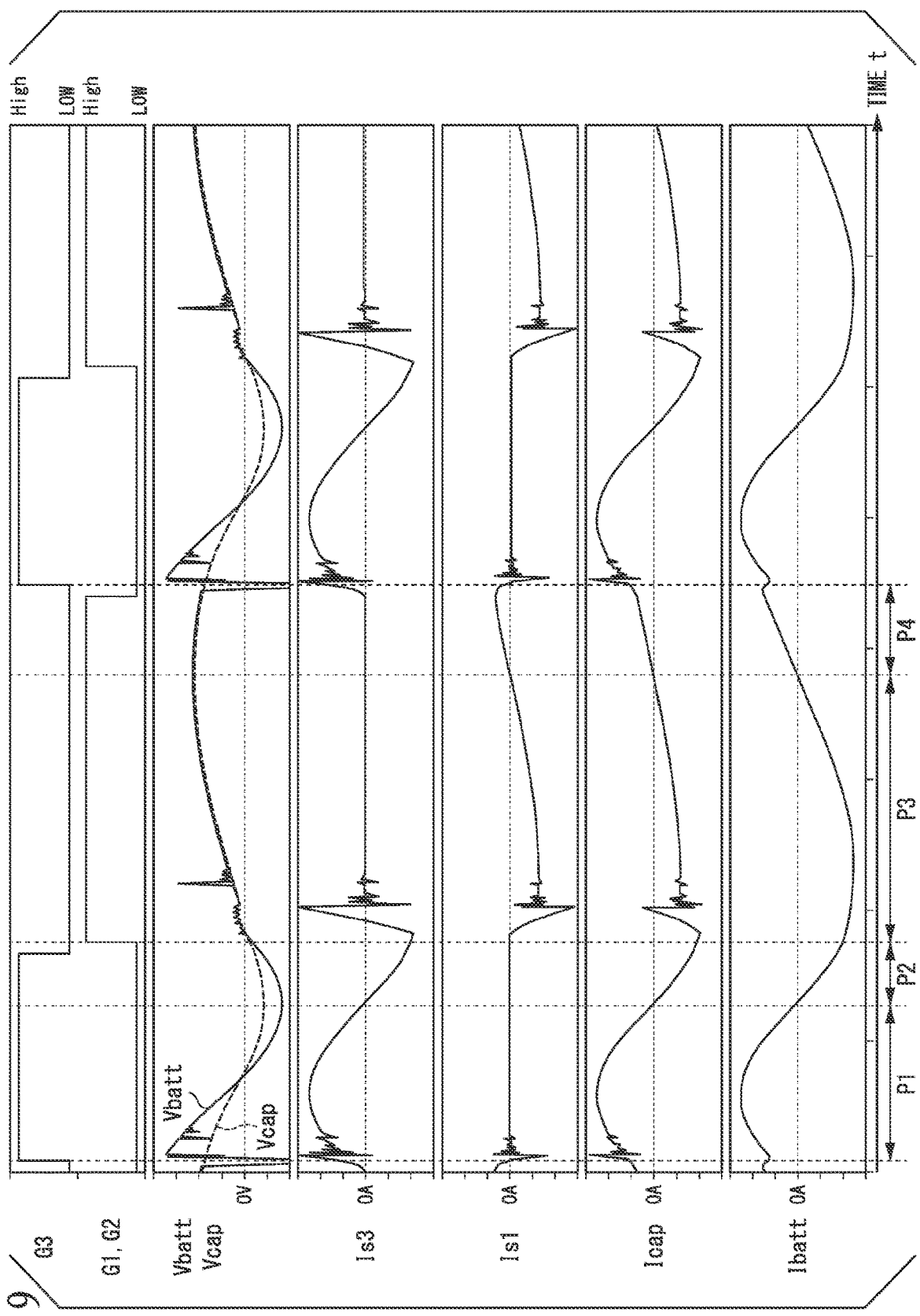
FIG. 9 is a diagram showing an example of control of a controller and an operation waveform of the AC generation circuit according to the second embodiment.
Figure 10:
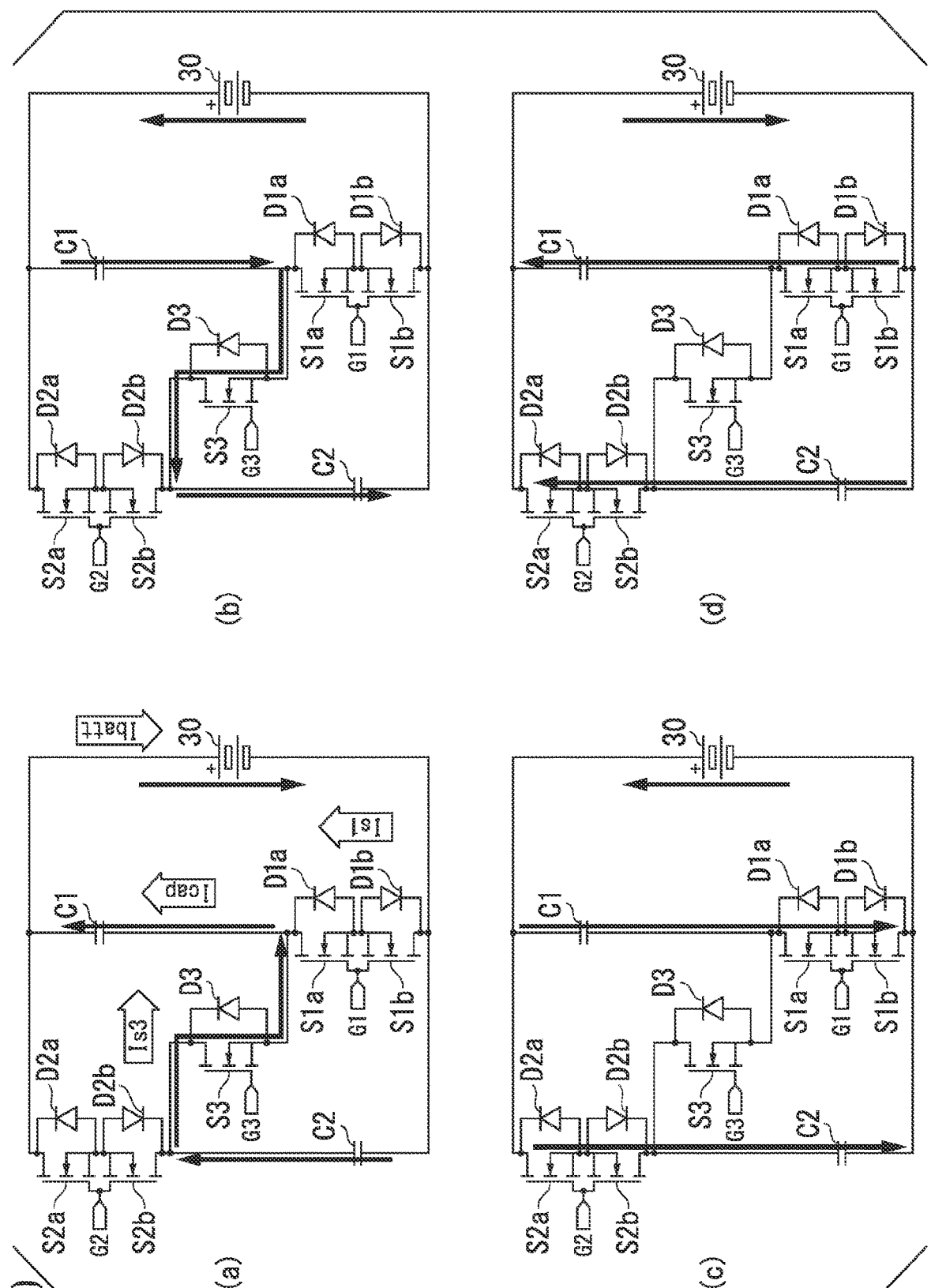
FIG. 10 is a diagram showing an example of a path of an AC current flowing into the AC generation circuit of the second embodiment.

Next, an operation of generating an AC current in the AC generation circuit 42-2 will be described. FIG. 9 is a diagram showing an example of the control of the controller 44 and the operation waveform (the simulation waveform) of the AC generation circuit 42-2 according to the second embodiment. FIG. 10 is a diagram showing an example of a path of an AC current flowing into the AC generation circuit 42-2 of the second embodiment. In the following description, the operation of the AC generation circuit 42-2 shown in FIG. 9 will be described with reference to FIG. 10 as appropriate.

The controller 44 also controls each semiconductor switch unit for the AC generation circuit 42-2 like the AC generation circuit 42-1. More specifically, the controller 44 switches a connection between the capacitor C1 and the capacitor C2 to the series connection or the parallel connection by changing the state of another semiconductor switch from the non-conductive state to the conductive state after the state of the semiconductor switch unit is first changed from the conductive state to the non-conductive state and controlling each semiconductor switch unit after a current flowing through the switching element provided in each semiconductor switch unit is temporarily returned to the diode.

Even in the AC generation circuit 42-2, during the period P1 in which the capacitor C1 and the capacitor C2 are connected to the battery 30 in series, each of the capacitor C1 and the capacitor C2 is discharged and the current Is3 and the current Icap flow in the direction in which the battery 30 is charged through the path shown in (a) of FIG. 10. Thereby, even in the AC generation circuit 42-2, the voltage Vcap decreases, and the current Ibatt is reversed after the voltage becomes a peak voltage in the direction in which the battery 30 is charged and decreases to 0 A.

Subsequently, the voltage Vcap is changed from 0 V to a negative region. However, because the bidirectional semiconductor switch unit SW1-2 and the bidirectional semiconductor switch unit SW2-2 are in a non-conductive state, the AC generation circuit 42-2 can operate in a state in which the path of an untended current as shown in FIG. 7 is not formed, for example, even if the inductance La provided in the battery 30 continuously draws a current. More specifically, the current Ibatt from the battery 30 as shown in FIG. 7 is not allowed to pass through each of the bidirectional semiconductor switch unit SW1-2 and the bidirectional semiconductor switch unit SW2-2 (more specifically, the second semiconductor switch unit) and the path of the current does not change from the path shown in (a) of FIG. 10. Thereby, in the AC generation circuit 42-2, the voltage Vcap continues to decrease without the current Is1 changing from 0 A, the electrostatic energy exchanged with the inductance La provided in the battery 30 for performing the resonance operation does not decrease, and the voltage Vcap decreases sufficiently. That is, the amplitude of the AC current can be secured widely in the AC generation circuit 42-2.

When the current Ibatt becomes 0 A, the direction of the current Ibatt is reversed this time. Even at this time, because the bidirectional semiconductor switch unit SW1-2 and the bidirectional semiconductor switch unit SW2-2 are still in the non-conductive state in the AC generation circuit 42-2, the current Is3 and the current Icap flow from the battery 30 in the direction in which the capacitor C1 and the capacitor C2 are charged through the path shown in (b) of FIG. 10 during the period P2. Thereby, in the AC generation circuit 42-2, the current Ibatt continuously increases in the direction in which the battery 30 is discharged and the voltage Vcap begins to increase.

Subsequently, the controller 44 allows the capacitor C1 and the capacitor C2 to the battery 30 to be connected in parallel, such that the current Ibatt from the battery 30 flows to each of the capacitor C1 and the capacitor C2 through the path shown in (c) of FIG. 10 during the period P3 in the AC generation circuit 42-2. In the AC generation circuit 42-2, the capacitor C1 and the capacitor C2 are continuously charged and the voltage Vcap is continuously raised.

Although a positive current is temporarily generated in the current Is3 in the initial stage of the period P3 in FIG. 9, this is due to the reverse recovery operation of the semiconductor switch unit SW3 and is settled in a short amount of time.

When the voltage Vcap becomes a positive peak voltage, the directions of the currents (the current Icap) of the capacitors C1 and C2 are reversed this time. Even at this time, because the bidirectional semiconductor switch unit SW1-2 and the bidirectional semiconductor switch unit SW2-2 are still in the conductive state, the AC generation circuit 42-2 allows the current (the current Icap) to flow from each of the capacitor C1 and the capacitor C2 in a direction in which the battery 30 is charged through the path shown in (d) of FIG. 10 during the period P4. Thereby, in the AC generation circuit 42-2, the current Ibatt continuously increases in the direction in which the battery 30 is charged and turns in a direction in which the voltage Vcap decreases.

Subsequently, the controller 44 allows the capacitor C1 and the capacitor C2 to be connected to the battery 30 in series, such that the path of the current in the AC generation circuit 42-2 returns to a path similar to that of the period P1 (a path shown in (a) of FIG. 10). Hereinafter, likewise, the above-described operation is periodically iterated.

As described above, the temperature raising device 40 of the second embodiment includes the AC generation circuit 42-2 having the bidirectional semiconductor switch unit SW1-2 and the bidirectional semiconductor switch unit SW2-2, which are two semiconductor switch units whose diodes are in directions opposite to each other and which are connected in series, and with which the semiconductor switch unit SW1 and the semiconductor switch unit SW2 provided in the AC generation circuit 42-1 of the first embodiment are replaced. Thereby, in the temperature raising device 40 of the second embodiment, when the capacitor C1 and the capacitor C2 are connected in series such that the capacitors are charged, for example, even if the inductance La provided in the battery 30 continuously draws a current and the voltage of the switching element provided in the semiconductor switch unit of the non-conductive state becomes a reverse bias, the bidirectional semiconductor switch unit SW1-2 and the bidirectional semiconductor switch unit SW2-2 are maintained in the non-conductive state. Thus, in the temperature raising device 40 of the second embodiment, the AC generation circuit 42-2 can operate without forming an unintended current path (see FIG. 7) like the AC generation circuit 42-1. Thereby, in the temperature raising device 40 of the second embodiment, the AC generation circuit 42-2 can maintain a resonance operation with the inductance La provided in the battery 30 and generate an AC current of a sufficient amplitude (an amplitude wider than that of the AC generation circuit 42-1). Thereby, in the temperature raising device 40 of the second embodiment, the temperature of the battery 30 can be increased more efficiently due to the generated AC current.

Third Embodiment

[Configuration of AC Generation Circuit Provided in Temperature Raising Device]

Figure 11:
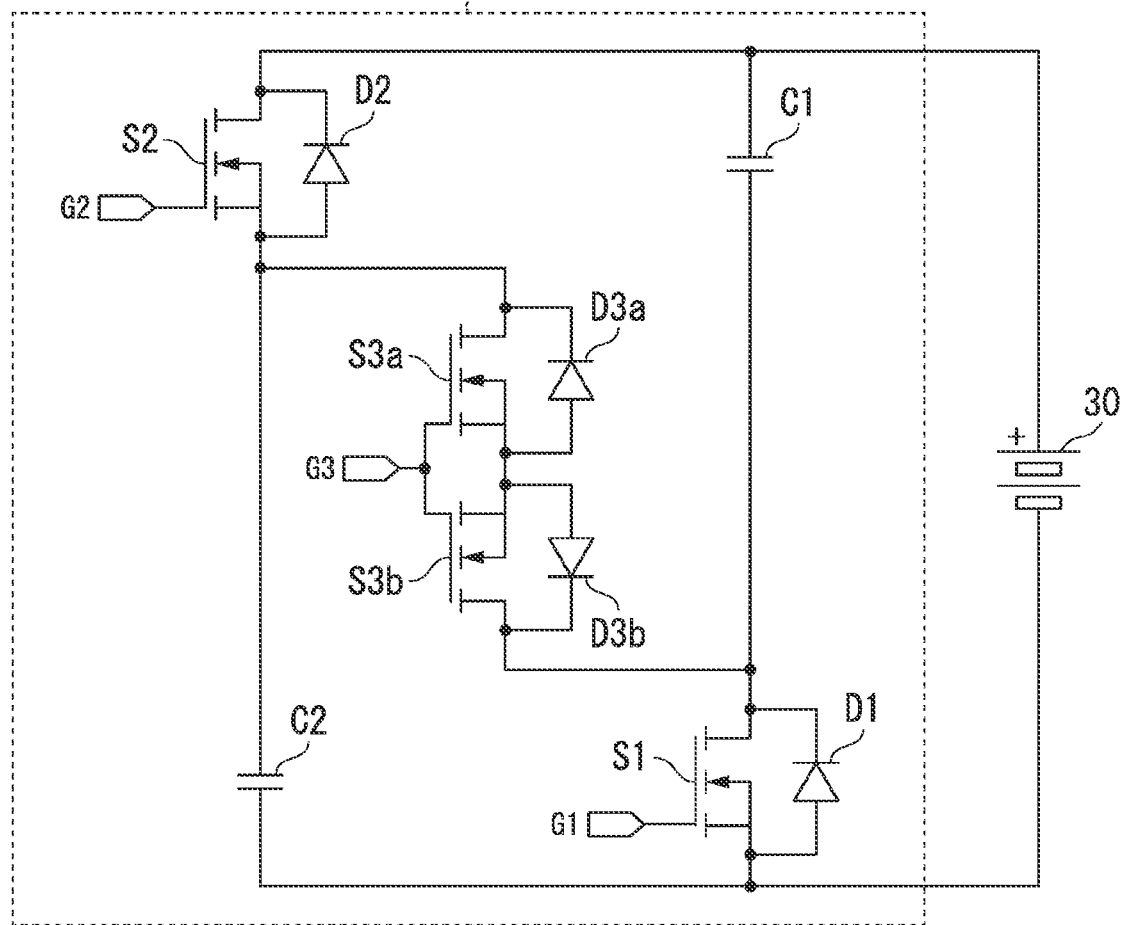
FIG. 11 is a diagram showing an example of a configuration of an AC generation circuit provided in a temperature raising device according to a third embodiment.

FIG. 11 is a diagram showing an example of a configuration of an AC generation circuit 42 (hereinafter referred to as an "AC generation circuit 42-3") provided in a temperature raising device 40 according to a third embodiment. In FIG. 11, a battery 30 related to the AC generation circuit 42-3 (here, inductance La is not shown) is also shown. Like the AC generation circuit 42-2 of the second embodiment, the AC generation circuit 42-3 also has a configuration for avoiding the formation of an unintended path assumed in the AC generation circuit 42-1 of the first embodiment. The AC generation circuit 42-3 includes, for example, a capacitor C1, a capacitor C2, a switching element S1, a switching element S2, a switching element S3a, a switching element S3b, a diode D1, a diode D2, a diode D3a, and a diode D3b.

The AC generation circuit 42-3 includes a bidirectional semiconductor switch unit (hereinafter referred to as a "bidirectional semiconductor switch unit SW3-2") similar to the bidirectional semiconductor switch unit SW1-2 and the bidirectional semiconductor switch unit SW2-2 provided in the AC generation circuit 42-2 instead of the semiconductor switch unit SW3 provided in the AC generation circuit 42-1. The AC generation circuit 42-3 includes a unidirectional semiconductor switch unit instead of a bidirectional semiconductor switch unit that is the bidirectional semiconductor switch unit SW1-2 or the bidirectional semiconductor switch unit SW2-2 provided in the AC generation circuit 42-2. Gate terminals of the switching element S3a and the switching element S3b constituting the bidirectional semiconductor switch unit SW3-2 are controlled such that they are turned on or off according to a gate signal G3 output by the controller 44. Even in the bidirectional semiconductor switch unit SW3-2, the diode D3a and the diode D3b function as freewheeling diodes for returning currents in directions opposite to each other.

The connection of the capacitor C1, the capacitor C2, the semiconductor switch unit SW1, the semiconductor switch unit SW2, and the bidirectional semiconductor switch unit SW3-2 in the AC generation circuit 42-3 is equivalent to that in the AC generation circuit 42-1 of the first embodiment.

According to such a configuration, even in the AC generation circuit 42-3, as in the AC generation circuit 42-1 and the AC generation circuit 42-2, the capacitor C1 and the capacitor C2 are connected in parallel or in series between the positive electrode side and the negative electrode side of the battery 30 in accordance with control from the controller 44.

In the AC generation circuit 42-3, a configuration in which the semiconductor switch unit SW1 and the semiconductor switch unit SW2 are combined is an example of a "parallel switch unit" in the claims and the bidirectional semiconductor switch unit SW3-2 is an example of a "series switch unit" in the claims.

[Operation of Temperature Raising Device]

Figure 12:
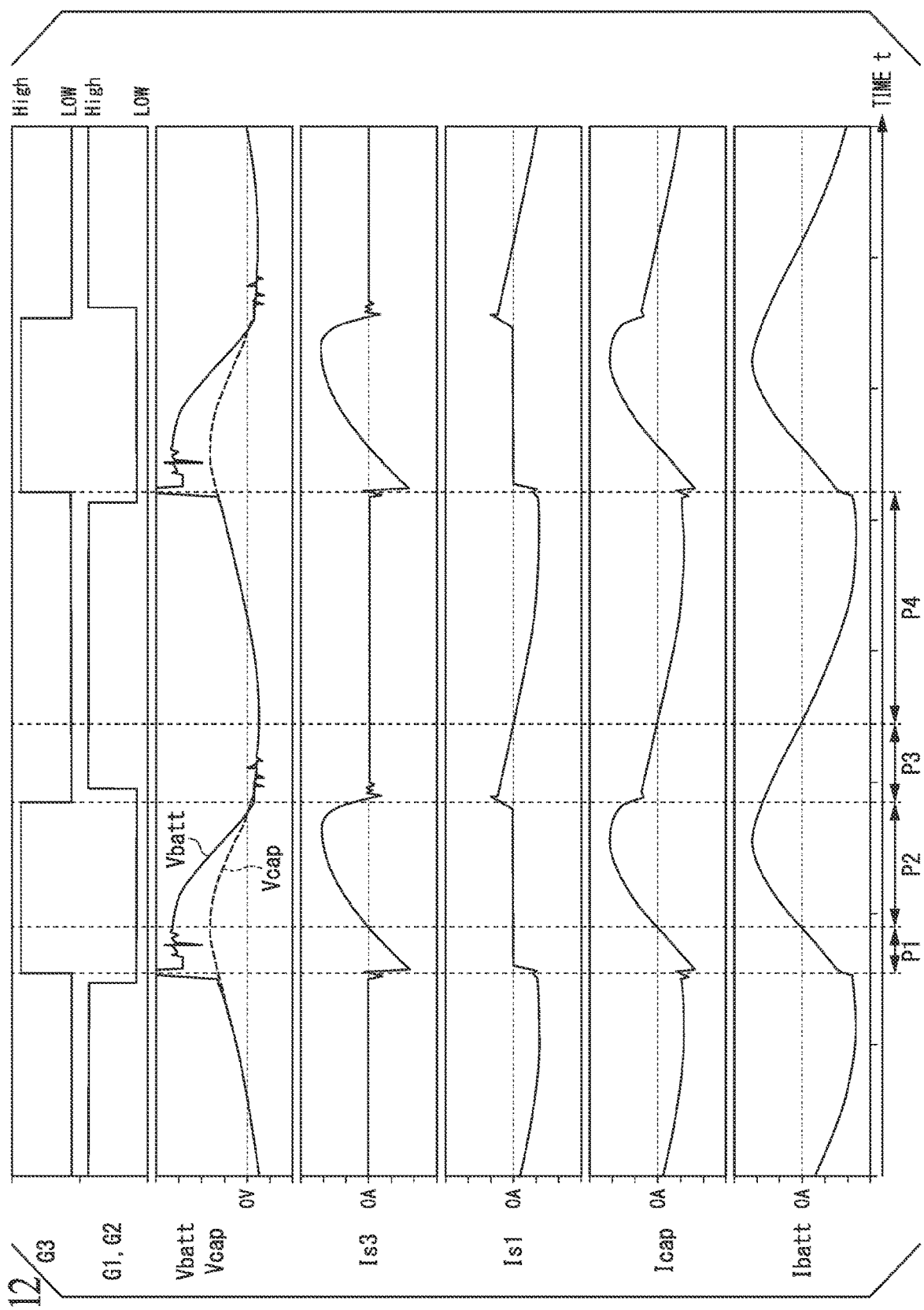
FIG. 12 is a diagram showing an example of control of a controller and an operation waveform of an AC generation circuit according to the third embodiment.
Figure 13:
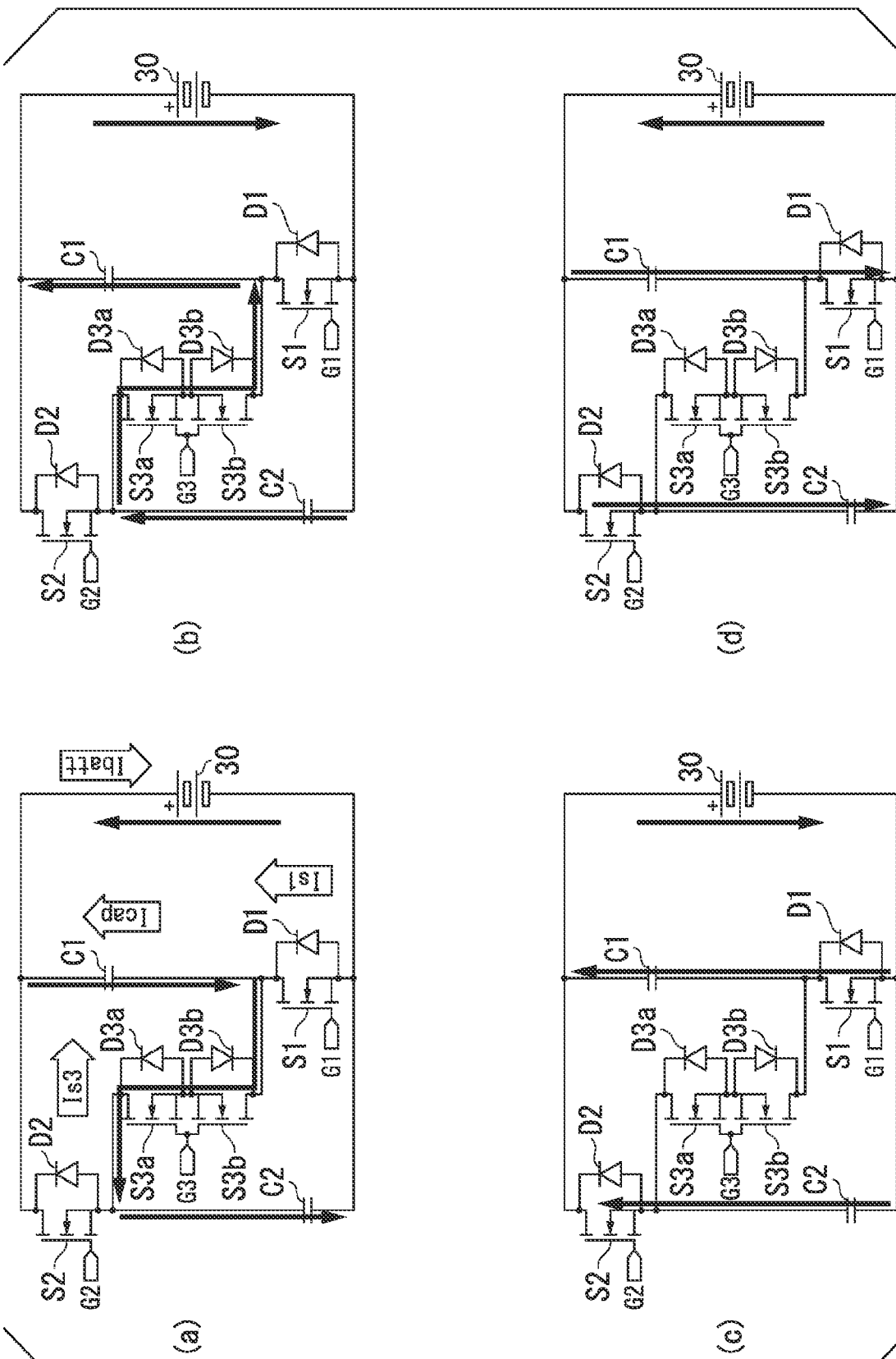
FIG. 13 is a diagram showing an example of a path of an AC current flowing into the AC generation circuit of the third embodiment.

Next, an operation of generating an AC current in the AC generation circuit 42-3 will be described. FIG. 12 is a diagram showing an example of control of the controller 44 and the operation waveform (the simulation waveform) of the AC generation circuit 42-3 according to the third embodiment. FIG. 13 is a diagram showing an example of a path of an AC current flowing into the AC generation circuit 42-3 of the third embodiment. In the following description, the operation of the AC generation circuit 42-3 shown in FIG. 12 will be described with reference to FIG. 13 as appropriate.

With respect to the AC generation circuit 42-3 like the AC generation circuit 42-1 and the AC generation circuit 42-2, the controller 44 switches a connection between the capacitor C1 and the capacitor C2 to a series connection or a parallel connection by changing the state of another semiconductor switch unit from the non-conductive state to the conductive state after the state of the semiconductor switch unit is first changed from the conductive state to the nonconductive state and a flowing current is temporarily returned.

In the AC generation circuit 42-3, during the period P1 in which the capacitor C1 and the capacitor C2 are connected to the battery 30 in series, the current Is1 and the current Icap flow from the battery 30 in a direction in which the capacitor C1 and the capacitor C2 are charged through the path shown in (a) of FIG. 13, the voltage Vcap increases, and the current Ibatt decreases to 0 A.

Subsequently, when the voltage Vcap reaches a positive peak voltage, the current Ibatt is inverted. During the period P2, a current (a current Icap) flows from each of the capacitor C1 and the capacitor C2 in a direction in which the battery 30 is charged through the path shown in (b) of FIG. 13, the current Ibatt continuously increases in a direction in which the battery 30 is charged, and the voltage Vcap turns in a decreasing direction.

Subsequently, the controller 44 allows the capacitor C1 and the capacitor C2 to be connected to the battery 30 in parallel, such that the current Ibatt from the battery 30 flows to each of the capacitor C1 and the capacitor C2 through the path shown in (c) of FIG. 13 and the voltage Vcap becomes a negative voltage value in the AC generation circuit 42-3 during the period P3. At this time, because the bidirectional semiconductor switch unit SW3-2 is in a non-conductive state, the AC generation circuit 42-3 can operate without forming a path (an unintended path) of a current that does not involve each of the capacitor C1 and the capacitor C2 as shown in FIG. 7. More specifically, when the voltage Vcap is changed from 0 V to the negative region, the potential of a second terminal side (a source terminal of the switching element S2) of the semiconductor switch unit SW2 is lower than the potential of a first terminal side (a drain terminal of the switching element S1) of the semiconductor switch unit SW1 in the AC generation circuit 42-3. However, even in this case, in the AC generation circuit 42-3, the current Icap from the semiconductor switch unit SW1 side does not pass through the bidirectional semiconductor switch unit SW3-2 (more specifically, the second semiconductor switch unit) and the current path does not change from the path shown in (c) of FIG. 13. Thereby, in the AC generation circuit 42-3, the voltage Vcap continuously decreases without the current Is3 changing from 0 A, the electrostatic energy exchanged with the inductance La provided in the battery 30 for performing the resonance operation does not decrease, the current Ibatt continuously decreases to 0 A, and the voltage Vcap continuously decreases.

When the voltage Vcap becomes a negative peak voltage, the directions of the currents (the current Icap) of the capacitors C1 and C2 are reversed. Even at this time, because the bidirectional semiconductor switch unit SW3-2 is still in the non-conductive state, the current Is1 and the current Icap flow from the battery 30 in a direction in which the capacitor C1 and the capacitor C2 are charged through the path shown in (d) of FIG. 13 during the period P4 in the AC generation circuit 42-3, the current Ibatt continuously increases in the direction in which the battery 30 is discharged, and the voltage Vcap begins to increase.

Subsequently, the controller 44 allows the capacitor C1 and the capacitor C2 to be connected to the battery 30 in series, such that the path of the current in the AC generation circuit 42-3 also returns to a path similar to that of the period P1 (the path shown in (a) of FIG. 13). Hereinafter, likewise, the above-described operation is periodically iterated.

As described above, the temperature raising device 40 of the third embodiment includes the AC generation circuit 42-3 having a bidirectional semiconductor switch unit SW3-2 with which the semiconductor switch unit SW3 provided in the AC generation circuit 42-1 according to the first embodiment is replaced. Thereby, in the temperature raising device 40 of the third embodiment, even if the voltage Vcap is changed from 0 V to a negative region when the capacitors C1 and C2 are connected in parallel and the capacitors are charged, the bidirectional semiconductor switch unit SW3-2 is maintained in the non-conductive state. That is, in the temperature raising device 40 of the third embodiment, even if the potentials of the semiconductor switch unit SW1 and the semiconductor switch unit SW2 become unbalanced due to the voltage Vcap changing from 0 V to a negative region, the bidirectional semiconductor switch unit SW3-2 is maintained in the non-conductive state. Thus, in the temperature raising device 40 of the third embodiment, the AC generation circuit 42-3 can operate without forming an unintended current path (see FIG. 7) like the AC generation circuit 42-1 and can maintain the resonance operation associated with the inductance La provided in the battery 30 and generate an AC current having a sufficient amplitude (an amplitude wider than that of the AC generation circuit 42-1). Thereby, even in the temperature raising device 40 of the third embodiment, the temperature of the battery 30 can be raised more efficiently according to the generated AC current.

Figure 14:
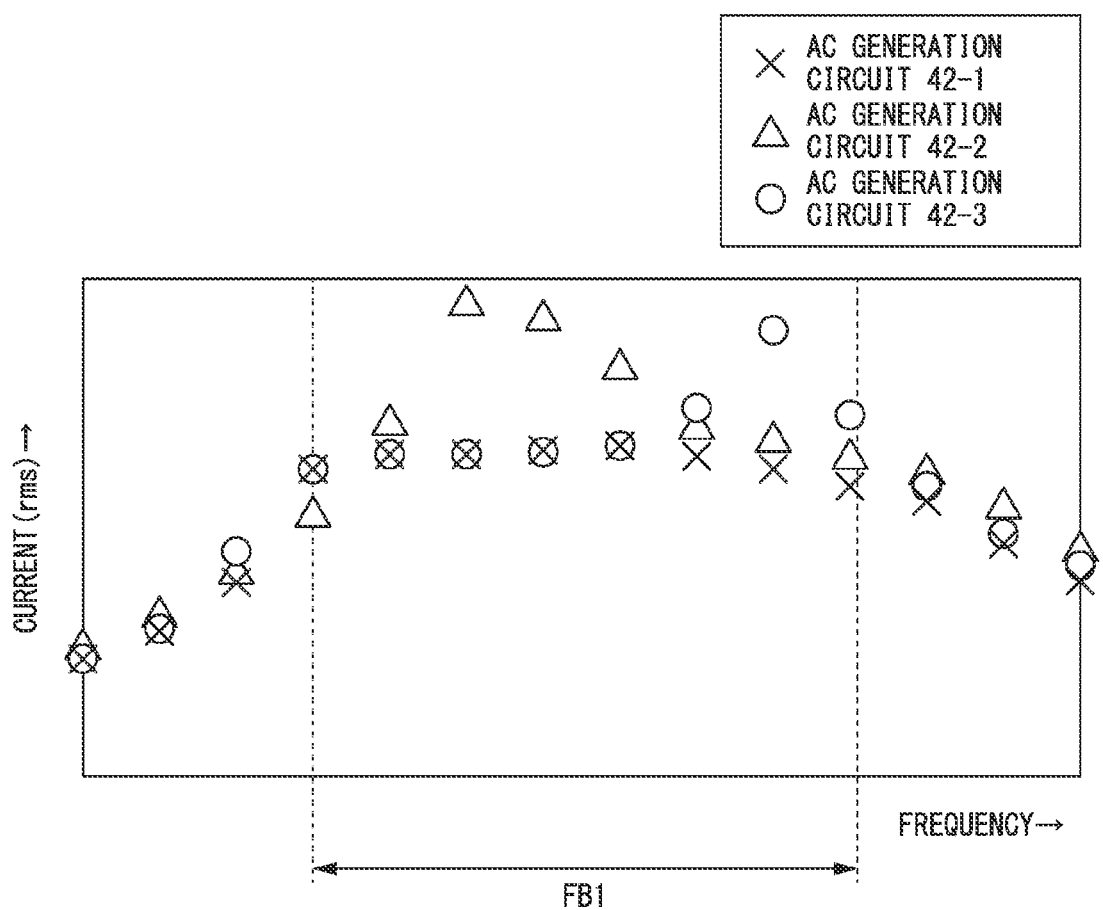
FIG. 14 is a diagram for comparing characteristics of an amplitude of an AC current generated by the AC generation circuit.

Here, characteristic differences between AC currents generated by the AC generation circuit 42-1 of the first embodiment, the AC generation circuit 42-2 of the second embodiment, and the AC generation circuit 42-3 of the third embodiment will be described. FIG. 14 is a diagram for comparing the characteristics of the amplitudes of the AC currents generated by the AC generation circuits 42 (the AC generation circuit 42-1, the AC generation circuit 42-2, and the AC generation circuit 42-3). In FIG. 14, characteristics of an effective value (an rms value) that is a current value representing the amplitude of the AC current generated by each AC generation circuit 42 when the duty ratio is the same and the frequency is changed are shown. As shown in FIG. 14, in the AC generation circuit 42-1, a current value of the generated AC current does not change in a frequency band FB1. This is because an unintended current path as shown in FIG. 7 is formed when the voltage Vcap is changed from 0 V to the negative region in the AC generation circuit 42-1 and the energy exchanged between the inductance La and the capacitor C1 decreases in the resonance operation. On the other hand, the current value of the generated AC current changes in the entire frequency band in the AC generation circuit 42-2 and the AC generation circuit 42-3 and the frequency bands of the AC generation circuit 42-2 and the AC generation circuit 42-3 are different, but the effective value thereof is greater than that of the AC generation circuit 42-1. From this, it can be seen that the AC generation circuit 42-2 and the AC generation circuit 42-3 can operate without forming an unintended current path as shown in FIG. 7 and an operation in which the energy exchanged between the inductance La and the capacitor C1 in the resonance operation does not decrease is performed.

Fourth Embodiment

[Configuration of AC Generation Circuit Provided in Temperature Raising Device]

An AC generation circuit 42-2 of the second embodiment includes the bidirectional semiconductor switch units with which the semiconductor switch unit SW1 and the semiconductor switch unit SW2 provided in the AC generation circuit 42-1 are replaced. The AC generation circuit 42-3 of the third embodiment includes the bidirectional semiconductor switch unit with which the semiconductor switch unit SW3 provided in the AC generation circuit 42-1 is replaced. However, the semiconductor switch unit that is replaced with the bidirectional semiconductor switch unit in the AC generation circuit 42 may not be any one of the semiconductor switch unit SW1, the semiconductor switch unit SW2, and the semiconductor switch unit SW3, i.e., either one of the parallel switch unit and the series switch unit, and both the parallel switch unit and the series switch unit may be replaced with the bidirectional semiconductor switch units.

Figure 15:
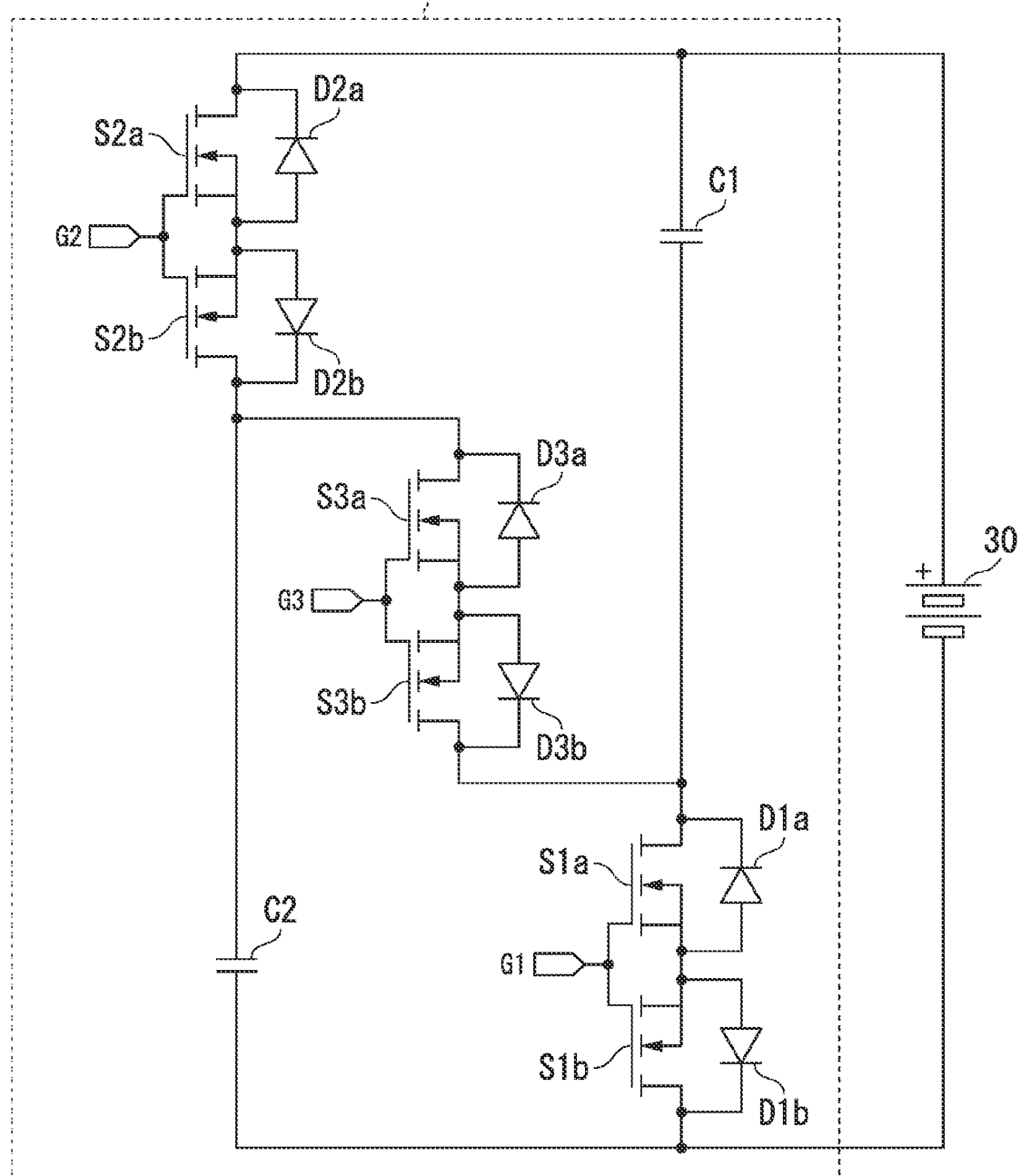
FIG. 15 is a diagram showing an example of a configuration of an AC generation circuit provided in a temperature raising device according to a fourth embodiment.

FIG. 15 is a diagram showing an example of a configuration of the AC generation circuit 42 (hereinafter referred to as an "AC generation circuit 42-4") provided in a temperature raising device 40 according to a fourth embodiment. In FIG. 15, a battery 30 related to the AC generation circuit 42-4 (here, inductance La is not shown) is also shown. Like the AC generation circuit 42-2 of the second embodiment or the AC generation circuit 42-3 of the third embodiment, the AC generation circuit 42-4 is also a configuration for avoiding the formation of an unintended path assumed in the AC generation circuit 42-1 of the first embodiment. The AC generation circuit 42-4 includes, for example, a capacitor C1, a capacitor C2, a switching element S1$a$, a switching element S1$b$, a switching element S2$a$, a switching element S2$b$, a switching element S3$a$, a switching element S3$b$, a diode D1$a$, a diode D1$b$, a diode D2$a$, a diode D2$b$, a diode D3$a$, and a diode D3$b$.

The AC generation circuit 42-4 has a configuration in which all semiconductor switch units provided in the AC generation circuit 42-1 are bidirectional semiconductor switch units provided in the AC generation circuit 42-2 or the AC generation circuit 42-3. The connection of the capacitor C1, the capacitor C2, the bidirectional semiconductor switch unit SW1-2, the bidirectional semiconductor switch unit SW2-2, and the bidirectional semiconductor switch unit SW3-2 in the AC generation circuit 42-4 is equivalent to that in the AC generation circuit 42-1 of the first embodiment.

According to such a configuration, even in the AC generation circuit 42-4, as in the AC generation circuits 42 of the first to third embodiments, the capacitor C1 and the capacitor C2 are connected in parallel or in series between a positive electrode side and a negative electrode side of the battery 30 in accordance with control from the controller 44.

In the AC generation circuit 42-4, a configuration in which the bidirectional semiconductor switch unit SW1-2 and the bidirectional semiconductor switch unit SW2-2 are combined is an example of a "parallel switch unit" in the claims and the bidirectional semiconductor switch unit SW3-2 is an example of a "series switch unit" in the claims.

[Operation of Temperature Raising Device]

Figure 16:
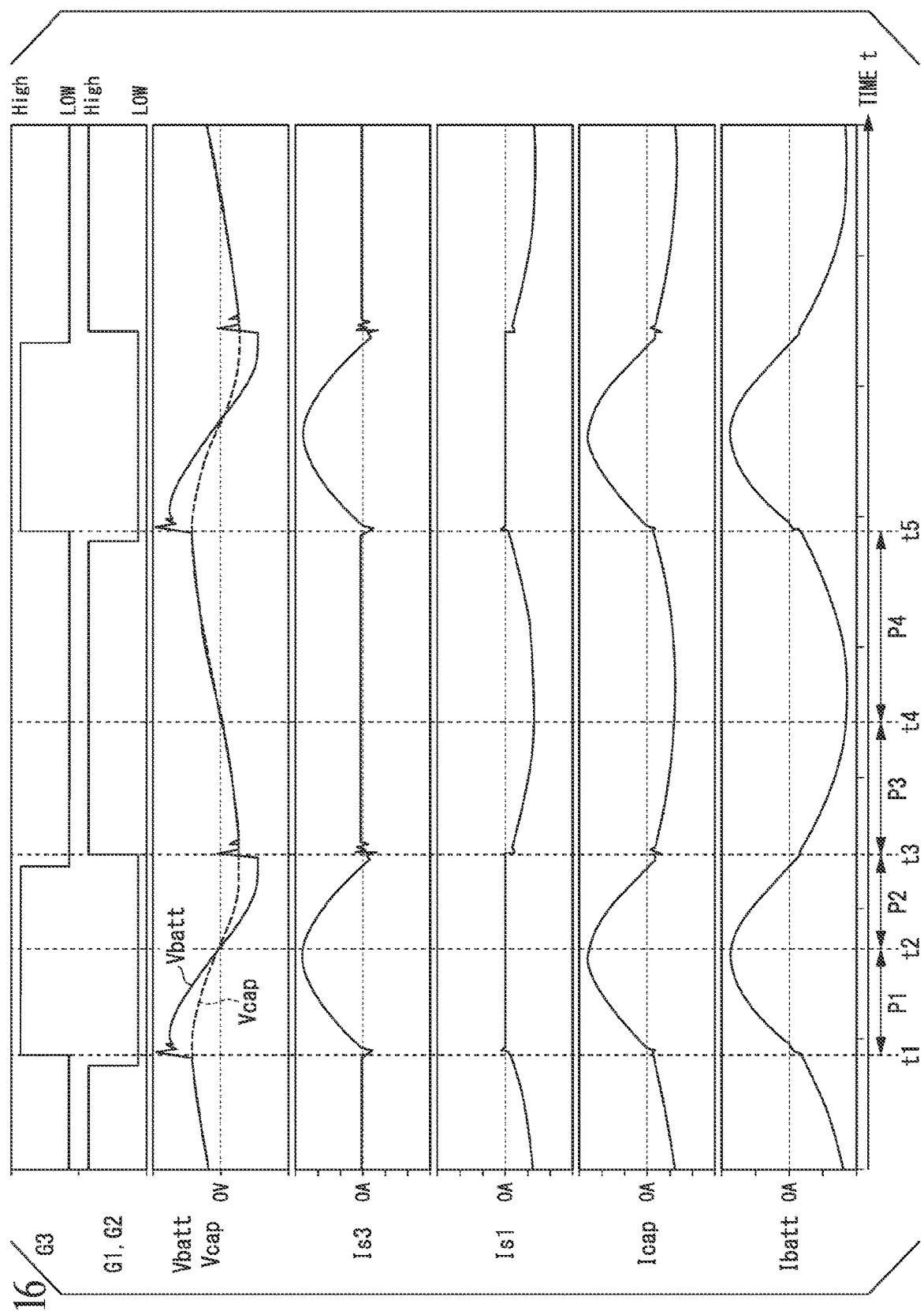
FIG. 16 is a diagram showing an example of control of a controller and an operation waveform of an AC generation circuit according to the fourth embodiment.
Figure 17:
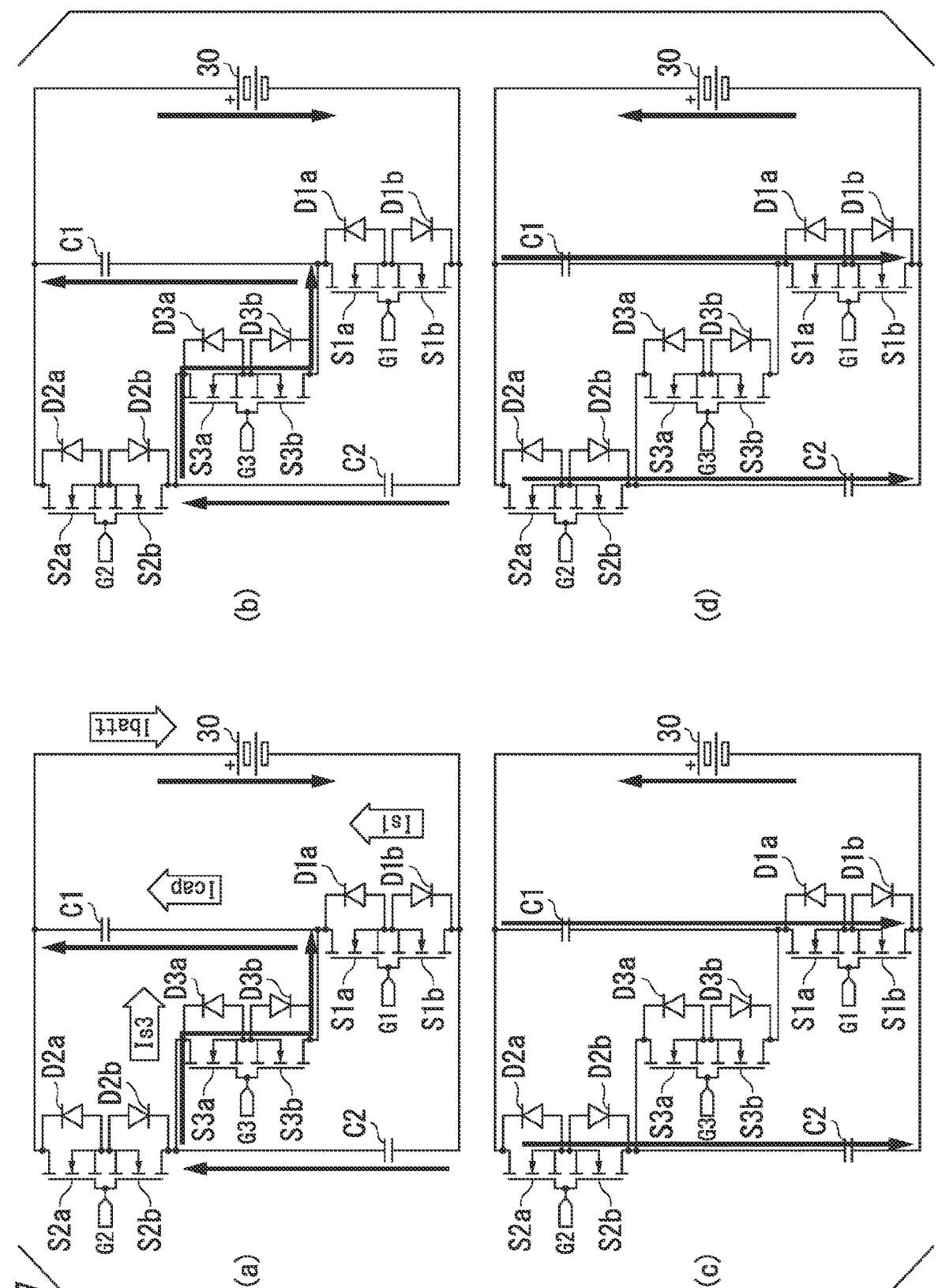
FIG. 17 is a diagram showing an example of a path of an AC current flowing into the AC generation circuit according to the fourth embodiment.

Next, an operation of generating an AC current in the AC generation circuit 42-4 will be described. FIG. 16 is a diagram showing an example of control of the controller 44 and an operation waveform (a simulation waveform) of the AC generation circuit 42-4 according to the fourth embodiment. FIG. 17 is a diagram showing an example of a path of an AC current flowing into the AC generation circuit 42-4 according to the fourth embodiment. In the following description, the operation of the AC generation circuit 42-4 shown in FIG. 16 will be described with reference to FIG. 17 as appropriate.

With respect to the AC generation circuit 42-4 like the AC generation circuits 42 of the first to third embodiments, the controller 44 switches a connection between the capacitor C1 and the capacitor C2 to a series connection or a parallel connection by changing the state of another bidirectional semiconductor switch unit from the non-conductive state to the conductive state after the state of a bidirectional semiconductor switch unit is first changed from the conductive state to the non-conductive state and a flowing current is temporarily returned. At this time, the controller 44 changes the state of the bidirectional semiconductor switch unit from the non-conductive state to the conductive state when the AC current generated by the AC generation circuit 42-4 becomes substantially 0 A. That is, the controller 44 can perform zero current switching (ZCS) control with respect to the AC generation circuit 42-4.

The controller 44 allows the capacitor C1 and the capacitor C2 to be connected to the battery 30 in series by setting the bidirectional semiconductor switch unit SW3-2 in the conductive state at time t1 when the current Ibatt has become substantially 0 A. Thereby, even in the AC generation circuit 42-4, during the period P1, each of the capacitor C1 and the capacitor C2 is discharged and the current Is3 and the current Icap flow in a direction in which the battery 30 is charged through the path shown in (a) of FIG. 17. Thereby, even in the AC generation circuit 42-4, the voltage Vcap decreases and the current Ibatt increases in the direction in which the battery 30 is charged.

Subsequently, the voltage Vcap is changed from 0 V to a negative region at time t2. However, because the bidirectional semiconductor switch unit SW1-2 and the bidirectional semiconductor switch unit SW2-2 are in the non-conductive state, the AC generation circuit 42-4 can operate without forming an unintended current path as shown in FIG. 7 and the current path does not change from the path shown in (a) of FIG. 17 as shown in (b) of FIG. 17. Thereby, even in the AC generation circuit 42-4, the voltage Vcap continuously decreases during the period P2 without the current Is1 changing from 0 A. Thereby, even in the AC generation circuit 42-4, the current Ibatt flows such that it sufficiently increases in the direction in which the battery 30 is charged and then decreases and the amplitude of the AC current can be widely secured.

Subsequently, the controller 44 sets the bidirectional semiconductor switch unit SW3-2 in the non-conductive state when the current Ibatt becomes substantially 0 A, subsequently sets the bidirectional semiconductor switch unit SW1-2 and the bidirectional semiconductor switch unit SW2-2 in the conductive state at time t3, and allows the capacitor C1 and the capacitor C2 to be connected to the battery 30 in parallel. Thereby, even in the AC generation circuit 42-4, the current Is1 and the current Icap flow from the battery 30 in the direction in which the capacitors C1 and C2 are charged through the path shown in (c) of FIG. 17 during the period P3, the current Ibatt continuously increases in the direction in which the battery 30 is charged, and the voltage Vcap begins to increase.

Subsequently, the voltage Vcap is changed from 0 V to a positive region and the voltage Vcap further increases at time t4. However, because the bidirectional semiconductor switch unit SW3-2 is in the non-conductive state in the AC generation circuit 42-4, the AC generation circuit 42-4 can operate without forming an unintended current path as shown in FIG. 7 and the current path does not change from the path shown in (c) of FIG. 17 as shown in (d) of FIG. 17. Thereby, even in the AC generation circuit 42-4, the voltage Vcap continuously increases during the period P4 without the current Is3 changing from 0 A. Thereby, even in the AC generation circuit 42-4, the current Ibatt flows such that it sufficiently increases in the direction in which the battery 30 is charged and then decreases and the amplitude of the AC current can be widely secured.

Subsequently, when the controller 44 allows the capacitor C1 and the capacitor C2 to be connected to the battery 30 in series at time t5 when the current Ibatt becomes substantially 0 A, the current path returns to a path (a path shown in (a) of FIG. 17) similar to that of the period P1 even in the AC generation circuit 42-4. Hereinafter, likewise, the above-described operation is periodically iterated.

As described above, the temperature raising device 40 of the fourth embodiment includes the AC generation circuit 42-4 having bidirectional semiconductor switch units with which all the semiconductor switch units provided in the AC generation circuit 42-1 of the first embodiment are replaced. Thereby, in the temperature raising device 40 of the fourth embodiment, when the bidirectional semiconductor switch unit SW1-2 and the bidirectional semiconductor switch unit SW2-2 are in the non-conductive state (when the capacitor C1 and the capacitor C2 are connected in series and the battery 30 is charged), the bidirectional semiconductor switch unit SW1-2 and the bidirectional semiconductor switch unit SW2-2 are maintained in the non-conductive state even if the voltage Vcap is changed from 0 V to a negative region. Further, in the temperature raising device 40 of the fourth embodiment, when the bidirectional semiconductor switch unit SW3-2 is in the non-conductive state (when the capacitor C1 and the capacitor C2 are connected in parallel and the battery 30 is charged), the bidirectional semiconductor switch unit SW3-2 is maintained in the non-conductive state even if the voltage Vcap is changed from 0 V to the positive region. That is, in the temperature raising device 40 of the fourth embodiment, in the AC generation circuit 42-4, no current flows through the bidirectional semiconductor switch unit in the non-conductive state, in other words, the current flows to only the bidirectional semiconductor in the conductive state. Thereby, in the temperature raising device 40 of the fourth embodiment, the AC generation circuit 42-4 can operate without forming an unintended current path (see FIG. 7) like the AC generation circuit 42-1 and can maintain a resonance operation associated with the inductance La provided in the battery 30 and generate an AC current having a sufficient amplitude (an amplitude wider than that of the AC generation circuit 42-1). Thereby, even in the temperature raising device 40 of the fourth embodiment, the temperature of the battery 30 can be increased more efficiently due to the generated AC current.

Figure 18:
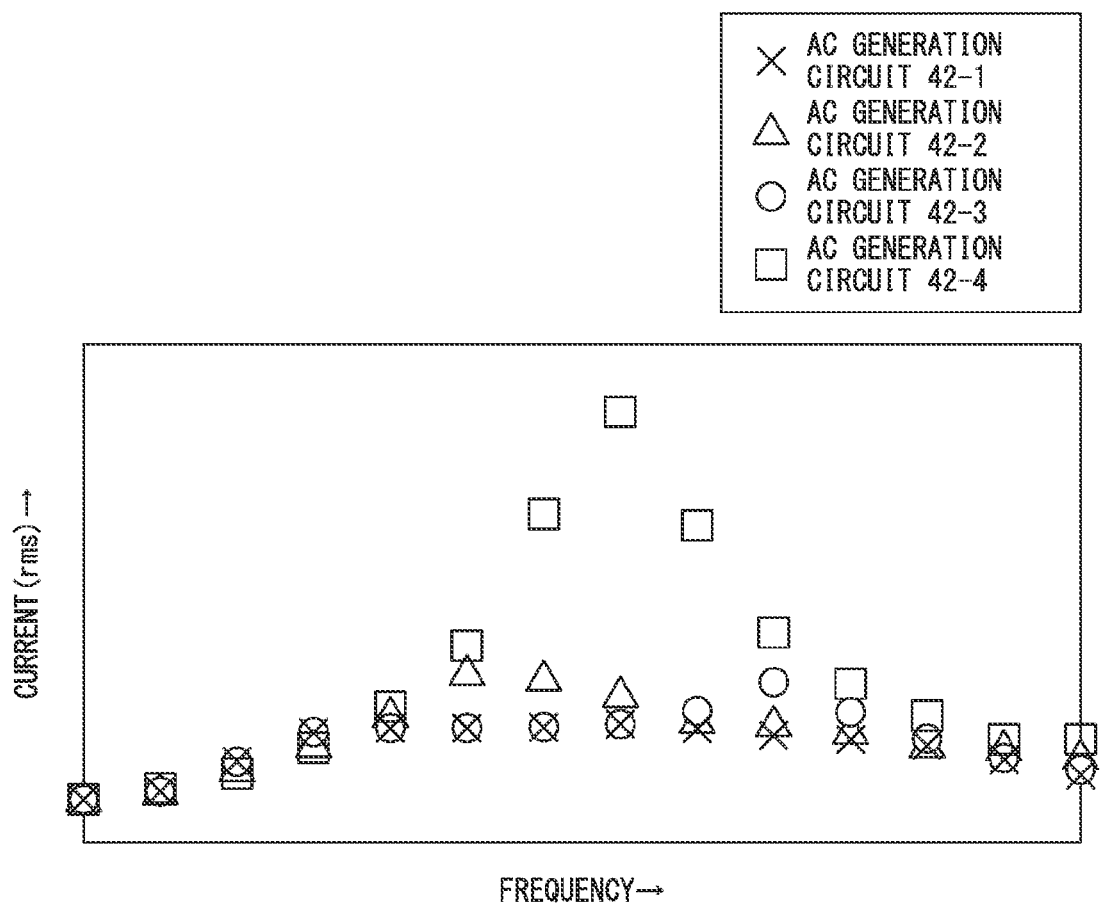
FIG. 18 is a diagram for comparing characteristics of an amplitude of an AC current generated by the AC generation circuit.

Here, characteristic differences between the AC currents generated by the AC generation circuits 42 of the first to third embodiments and the AC generation circuit 42-4 of the fourth embodiment will be described. FIG. 18 is a diagram for comparing the characteristics of the amplitudes of the AC currents generated by the AC generation circuits 42 (the AC generation circuit 42-1, the AC generation circuit 42-2, the AC generation circuit 42-3, and the AC generation circuit 42-4). Even in FIG. 18, as in FIG. 14, characteristics of an effective value (an rms value) that is a current value representing the amplitude of the AC current generated by each AC generation circuit 42 when the duty ratio is the same and the frequency is changed are shown. In FIG. 18, a state in which the characteristics of the amplitude of the AC current generated by the AC generation circuit 42 of the first to third embodiments shown in FIG. 14 overlap the characteristics of the amplitude of the AC current generated by the AC generation circuit 42-4 of the fourth embodiment is shown. As shown in FIG. 18, in the AC generation circuit 42-4, the effective value of the generated AC current is changed to a larger value (with a wider amplitude) than in the AC generation circuits 42 of the first to third embodiments. From this, it can be seen that the AC generation circuit 42-4 of the fourth embodiment can generate an AC current having a higher temperature raising effect than those of the AC generation circuits 42 of the first to third embodiments.

By the way, in the operation of the AC generation circuit 42-4 described with reference to FIGS. 16 and 17, ZCS control for changing the state of the bidirectional semiconductor switch unit from the non-conductive state to the conductive state is performed when the AC current generated by the AC generation circuit 42-4 becomes substantially 0 A. As described above, the controller 44 changes the state of the bidirectional semiconductor switch unit from the non-conductive state to the conductive state after the state of the bidirectional semiconductor switch unit is first changed from the conductive state to the non-conductive state and the flowing current is temporarily returned. Thus, it is assumed that ZCS control may be unsuitable, for example, when the amount of AC current generated by the AC generation circuit 42-4 is adjusted. For example, when the state of the bidirectional semiconductor switch unit is changed from the conductive state to the non-conductive state at a timing away from a point at which the AC current generated by the AC generation circuit 42-4 becomes substantially 0 A, the inductance La provided in the battery 30 will be cut off while the current is flowing. Therefore, in the AC generation circuit 42-4, a surge voltage is generated in the voltage Vbatt and a load such as heat is applied to the switching element provided in the bidirectional semiconductor switch unit. In this case, the loss of the generated AC current becomes large.

Figure 19:
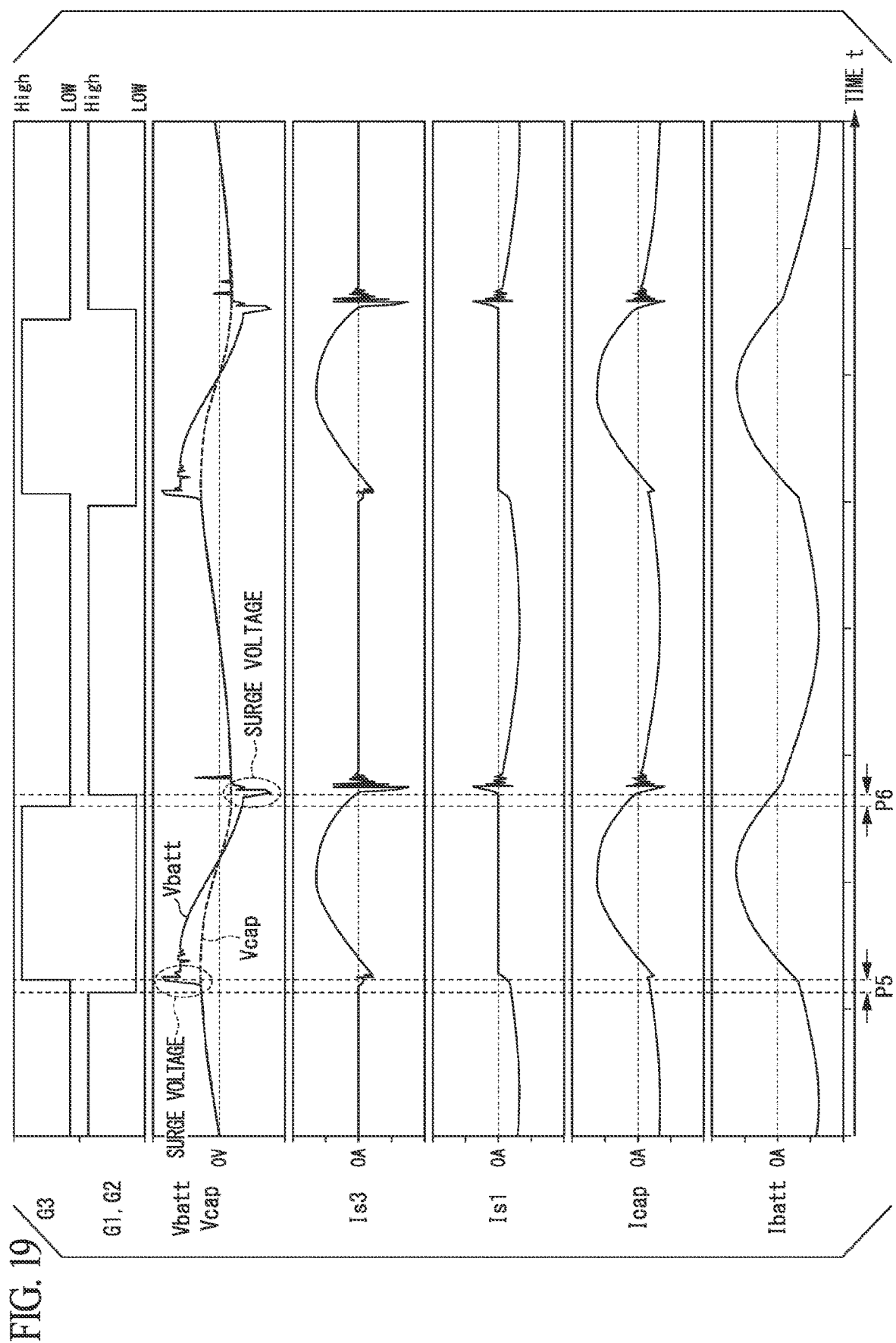
FIG. 19 is a diagram showing another example of the control of the controller and the operation waveform of the AC generation circuit according to the fourth embodiment.

Here, an example of a case where a surge voltage is generated in the AC generation circuit 42-4 will be described. FIG. 19 is a diagram showing another example of control of the controller 44 and the operation waveform (the simulation waveform) of the AC generation circuit 42-4 according to the fourth embodiment. In FIG. 19, an example of a case where a surge voltage is generated when the state of the bidirectional semiconductor switch unit is switched from the conductive state to the non-conductive state in the AC generation circuit 42-4 is shown. Even if a surge voltage is generated in the operation of the AC generation circuit 42-4 shown in FIG. 19, the current path is similar to the path shown in FIG. 17. In the following description, attention will be paid to the operation when a surge voltage is generated and the operation of the AC generation circuit 42-4 will be described with reference to FIG. 17 as appropriate.

When the controller 44 switches the states of the bidirectional semiconductor switch unit SW1-2 and the bidirectional semiconductor switch unit SW2-2 from the conductive state to the non-conductive state and switches the state of the bidirectional semiconductor switch unit SW3-2 from the non-conductive state to the conductive state, the current path is switched from the path shown in (d) of FIG. 17 to the path shown in (a) of FIG. 17. At this time, during the period P5 in which the bidirectional semiconductor switch unit SW1-2, the bidirectional semiconductor switch unit SW2-2, and the bidirectional semiconductor switch unit SW3-2 are all in the non-conductive state, a surge voltage is generated due to a current (a current before it becomes 0 A) that has passed through the bidirectional semiconductor switch unit SW1-2 and the bidirectional semiconductor switch unit SW2-2 in the path shown in (d) of FIG. 17. The surge voltage generated here is absorbed by the bidirectional semiconductor switch unit SW3-2 having the conductive state, but there is a problem that the loss may increase due to the surge voltage before being absorbed.

When the controller 44 switches the state of the bidirectional semiconductor switch unit SW3-2 from the conductive state to the non-conductive state and switches the states of the bidirectional semiconductor switch unit SW1-2 and the bidirectional semiconductor switch unit SW2-2 from the non-conductive state to the conductive state, the current path is switched from the path shown in (b) of FIG. 17 to the path shown in (c) of FIG. 17. At this time, during the period P6 in which the bidirectional semiconductor switch unit SW1-2, the bidirectional semiconductor switch unit SW2-2, and the bidirectional semiconductor switch unit SW3-2 are all in the non-conductive state, a surge voltage is generated due to a current (a current before it becomes 0 A) that has passed through the bidirectional semiconductor switch unit SW3-2 in the path shown in (b) of FIG. 17. The surge voltage generated here is absorbed by the bidirectional semiconductor switch unit SW1-2 and the bidirectional semiconductor switch unit SW2-2 having the conductive state, but there is a problem that the loss may increase due to the surge voltage before being absorbed.

As described above, in the temperature raising device 40 of the fourth embodiment, when a surge voltage has been generated at a timing when a switching operation of the bidirectional semiconductor switch unit is performed, the loss of the generated AC current may increase.

Fifth Embodiment

[Configuration of AC Generation Circuit Provided in Temperature Raising Device]

Figure 20:
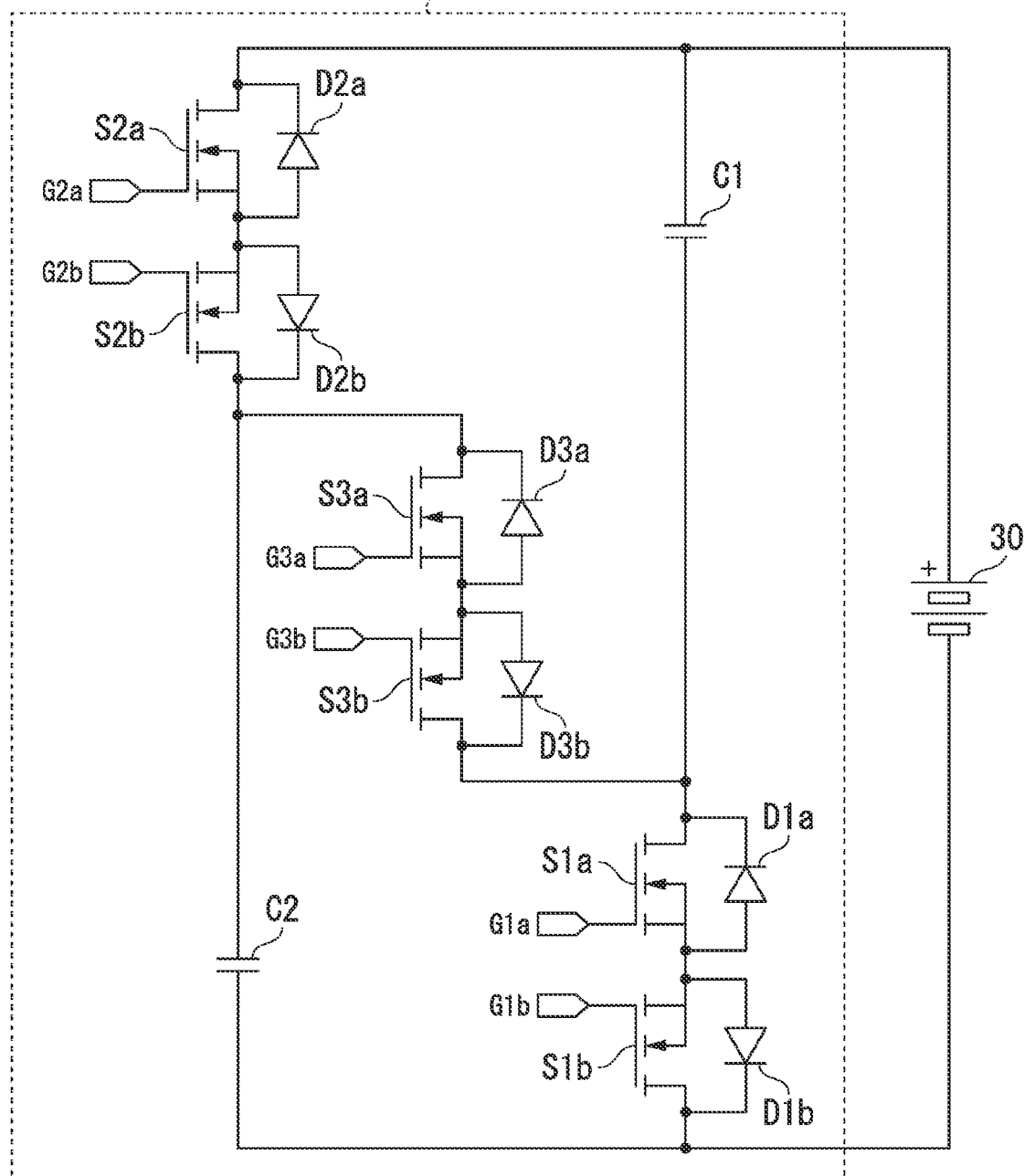
FIG. 20 is a diagram showing an example of a configuration of an AC generation circuit provided in a temperature raising device according to a fifth embodiment.

FIG. 20 is a diagram showing an example of a configuration of an AC generation circuit 42 (hereinafter referred to as an "AC generation circuit 42-5") provided in a temperature raising device 40 according to a fifth embodiment. In FIG. 20, a battery 30 related to the AC generation circuit 42-5 (here, inductance La is not shown) is also shown. The AC generation circuit 42-5 is configured to avoid the generation of a surge voltage assumed in the AC generation circuit 42-4 of the fourth embodiment. The AC generation circuit 42-5 includes, for example, a capacitor C1, a capacitor C2, a switching element S1a, a switching element S1b, a switching element S2a, a switching element S2b, a switching element S3a, a switching element S3b, a diode D1a, a diode D1b, a diode D2a, a diode D2b, a diode D3a, and a diode D3b.

The AC generation circuit 42-5 has the same components as the AC generation circuit 42-4. The connection of the capacitor C1, the capacitor C2, the bidirectional semiconductor switch unit SW1-2, the bidirectional semiconductor switch unit SW2-2, and the bidirectional semiconductor switch unit SW3-2 in the AC generation circuit 42-5 is equivalent to that in the AC generation circuit 42-4, i.e., is equivalent to that in the AC generation circuit 42-1 of the first embodiment. However, in the AC generation circuit 42-5, the controller 44 controls the ON or OFF states of the first semiconductor switch unit and the second semiconductor switch unit constituting the bidirectional semiconductor switch units at different timings.

In the following description, the first semiconductor switch unit including the switching element S1a and the diode D1a is also referred to as a "semiconductor switch unit SW1a" and the second semiconductor switch unit including the switching element S1b and the diode D1b is also referred to as a "semiconductor switch unit SW1b." Further, the first semiconductor switch unit including the switching element S2a and the diode D2a is also referred to as a "semiconductor switch unit SW2a" and the second semiconductor switch unit including the switching element S2b and the diode D2b is referred to as a "semiconductor switch unit SW2b." Further, the first semiconductor switch unit including the switching element S3a and the diode D3a is also referred to as a "semiconductor switch unit SW3a" and the second semiconductor switch unit including the switching element S3b and the diode D3b is referred to as a "semiconductor switch unit SW3b."

When the states of the bidirectional semiconductor switch unit SW1-2 and the bidirectional semiconductor switch unit SW2-2 are changed from the conductive state to the non-conductive state, the controller 44 performs a control process in which the other of the first semiconductor switch unit and the second semiconductor switch unit constituting the bidirectional semiconductor switch unit is in the non-conductive state in a state in which the conductive state of one of the first semiconductor switch unit and the second semiconductor switch unit constituting the bidirectional semiconductor switch unit is maintained such that a current flowing each bidirectional semiconductor switch unit can sufficiently return. Likewise, when the state of the bidirectional semiconductor switch unit SW3-2 is changed from the conductive state to the non-conductive state, the controller 44 performs a control process in which the other of the first semiconductor switch unit and the second semiconductor switch unit constituting the bidirectional semiconductor switch unit SW3-2 is in the non-conductive state in a state in which the conductive state of one of the first semiconductor switch unit and the second semiconductor switch unit constituting the bidirectional semiconductor switch unit SW3-2 is maintained such that a current flowing the bidirectional semiconductor switch unit SW3-2 can sufficiently return.

More specifically, when the states of the bidirectional semiconductor switch unit SW1-2 and the bidirectional semiconductor switch unit SW2-2 are changed from the conductive state to the non-conductive state, the controller 44 allows the semiconductor switch unit of a terminal side having an applied larger voltage value to be in the non-conductive state in a state in which the conductive state of the semiconductor switch unit of a terminal side having an applied smaller voltage value is maintained. Likewise, when the state of the bidirectional semiconductor switch unit SW3-2 is changed from the conductive state to the non-conductive state, the controller 44 allows the semiconductor switch unit of a terminal side having an applied larger voltage value to be in the non-conductive state in a state in which the conductive state of the semiconductor switch unit of a terminal side having an applied smaller voltage value is maintained.

For example, a case where the states of the bidirectional semiconductor switch unit SW1-2 and the bidirectional semiconductor switch unit SW2-2 are changed from the conductive state to the non-conductive state when the voltage values of the capacitors C1 and the capacitor C2 are positive voltage values is taken into account. In this case, the controller 44 changes the states of the first semiconductor switch units provided in the bidirectional semiconductor switch unit SW1-2 and the bidirectional semiconductor switch unit SW2-2 from the conductive state to the non-conductive state in a state in which the conductive states of the second semiconductor switch units provided in the bidirectional semiconductor switch unit SW1-2 and the bidirectional semiconductor switch unit SW2-2 are maintained after the state of the second semiconductor switch unit provided in the bidirectional semiconductor switch unit SW3-2 from the non-conductive state to the conductive state. For example, a case where the bidirectional semiconductor switch unit SW3-2 is changed from the conductive state to the non-conductive state when the voltage values of the capacitors C1 and C2 are negative voltage values is taken into account. In this case, the controller 44 changes the state of the second semiconductor switch unit provided in the bidirectional semiconductor switch unit SW3-2 from the conductive state to the non-conductive state in a state in which the conductive state of the first semiconductor switch unit provided in the bidirectional semiconductor switch unit SW3-2 is maintained after the first semiconductor switch units provided in the bidirectional semiconductor switch unit SW1-2 and the bidirectional semiconductor switch unit SW2-2 are changed from the non-conductive state to the conductive state.

According to such a configuration, even in the AC generation circuit 42-5, as in the AC generation circuit 42 of the first to fourth embodiments, the capacitor C1 and the capacitor C2 are connected in parallel or in series between the positive electrode side and the negative electrode side of the battery 30 in accordance with the control from the controller 44.

Even in the AC generation circuit 42-5, a configuration in which the bidirectional semiconductor switch unit SW1-2 and the bidirectional semiconductor switch unit SW2-2 are combined is an example of a "parallel switch unit" in the claims and the bidirectional semiconductor switch unit SW3-2 is an example of a "series switch unit" in the claims. In each bidirectional semiconductor switch unit, the semiconductor switch unit SW1$a$, the semiconductor switch unit SW2$a$, and the semiconductor switch unit SW3$a$ are examples of a "first semiconductor switch unit" in the claims. In each bidirectional semiconductor switch unit, the semiconductor switch unit SW1$b$, the semiconductor switch unit SW2$b$, and the semiconductor switch unit SW3$b$ are examples of a "second semiconductor switch unit" in the claims.

[Operation of Temperature Raising Device]

Figure 21:
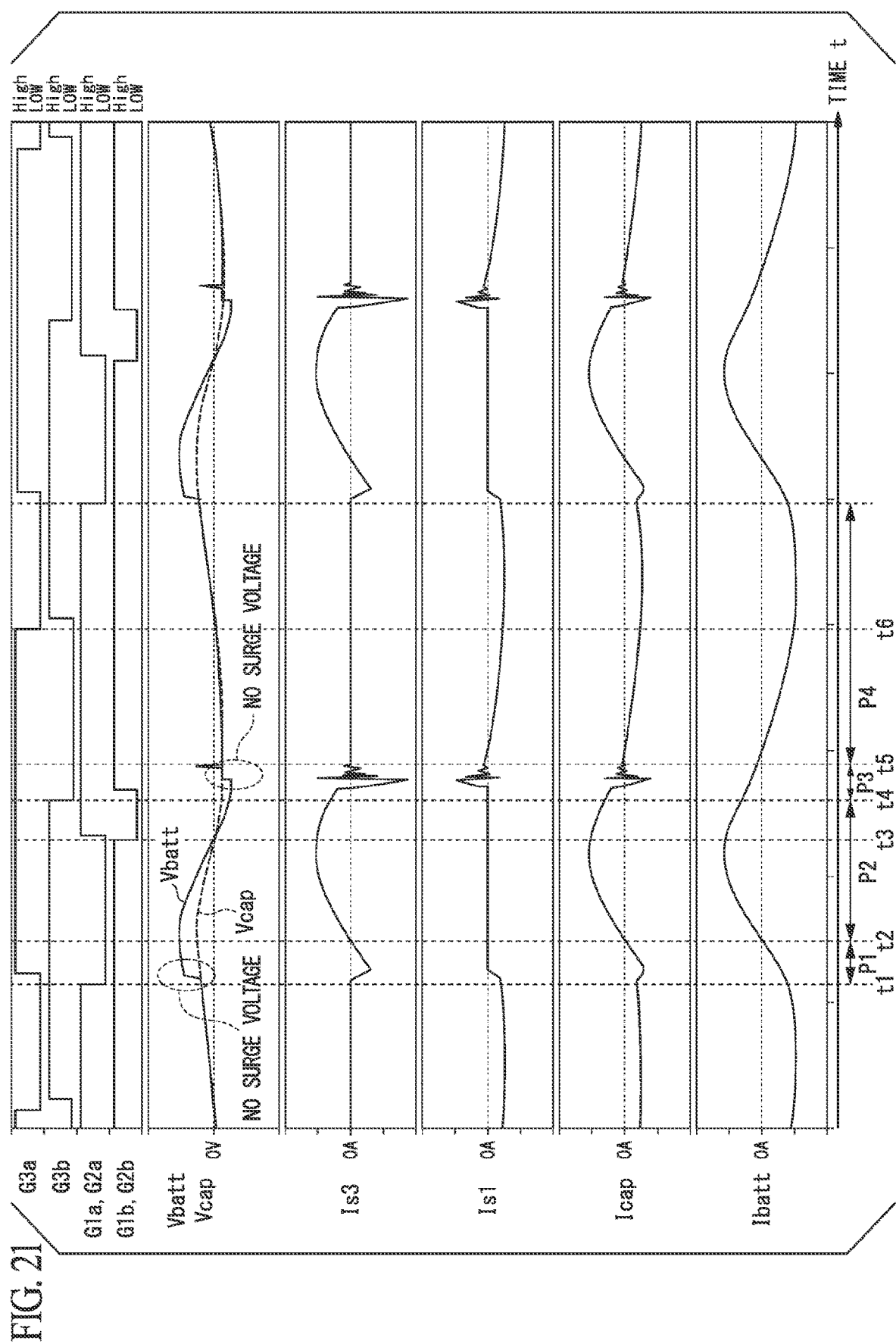
FIG. 21 is a diagram showing an example of control of a controller and an operation waveform of the AC generation circuit according to the fifth embodiment.
Figure 22:
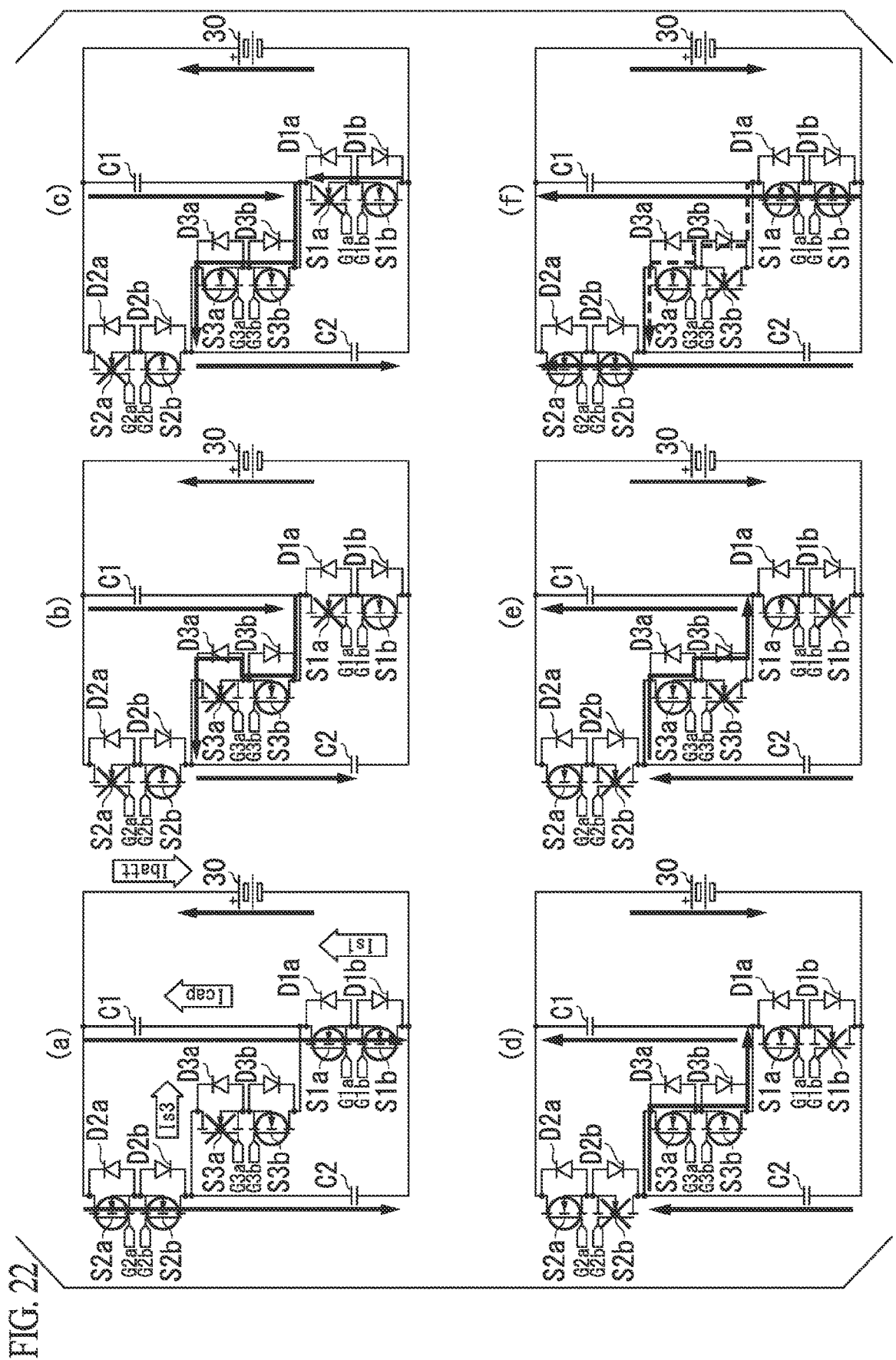
FIG. 22 is a diagram showing an example of a path of an AC current flowing into the AC generation circuit of the fifth embodiment.

Next, an operation of generating an AC current in the AC generation circuit 42-5 will be described. FIG. 21 is a diagram showing an example of control of the controller 44 and an operation waveform (a simulation waveform) of the AC generation circuit 42-5 according to the fifth embodiment. FIG. 22 is a diagram showing an example of a path of an AC current flowing into the AC generation circuit 42-5 of the fifth embodiment. In FIG. 22, an ON state of the switching element provided in each semiconductor switch unit is indicated by a "mark o" and an OFF state is indicated by a "mark x." When the temperature raising device 40 is activated by the control device 100, the operation is periodically iterated. Therefore, in the following description, an operation of the AC generation circuit 42-5 from time t1 shown in FIG. 21 will be described with reference to FIG. 22 as appropriate.

As shown in (a) of FIG. 22, it is assumed that the controller 44 sets the semiconductor switch unit SW3$a$ in the non-conductive state, sets the semiconductor switch unit SW3$b$ in the conductive state, sets the semiconductor switch unit SW1$a$ and the semiconductor switch unit SW2$a$ in the conductive state, and sets the semiconductor switch unit SW1$b$ and the semiconductor switch unit SW2$b$ in the conductive state. In this state, at time t1 before the current Ibatt flowing from the battery 30 in the direction in which the capacitor C1 and the capacitor C2 are charged becomes 0 A, the controller 44 sets the gate signal G1$a$ and the gate signal G2$a$ at the "Low" level and sets the semiconductor switch unit SW1$a$ and the semiconductor switch unit SW2$a$ in the non-conductive state. At this time, because the semiconductor switch unit SW3$b$ is in the conductive state, a current based on the current Ibatt flows along a path passing through the bidirectional semiconductor switch unit SW3-2 (more specifically, the semiconductor switch unit SW3$b$ and the diode D3$a$ provided in the semiconductor switch unit SW3$a$) as shown in (b) of FIG. 22. Further, as shown in (c) of FIG. 22, the controller 44 sets the gate signal G3$a$ at the "High" level and sets the semiconductor switch unit SW3$a$ in the conductive state. Thereby, in the AC generation circuit 42-5, no surge voltage is generated during the period P1 due to a current (a current before it becomes 0 A) based on the current Ibatt that has passed through the bidirectional semiconductor switch unit SW1-2 and the bidirectional semiconductor switch unit SW2-2 along the path shown in (a) of FIG. 22. In the AC generation circuit 42-5, the current Ibatt continuously flows in a direction in which the battery 30 is discharged and the voltage Vcap also continuously increases.

When the voltage Vcap becomes a positive peak voltage at time t2, the directions of the currents (the current Icap) of the capacitors C1 and C2 are reversed in the AC generation circuit 42-5, the capacitor C1 and the capacitor C2 are discharged, respectively, and the current Is3 and the current Icap flow in the direction in which the battery 30 is discharged in a direction opposite to that of the path shown in (c) of FIG. 22. Thereby, in the AC generation circuit 42-5, during the period P2, the voltage Vcap begins to decrease and the current Ibatt continuously increases and then begins to decrease.

The controller 44 sets the gate signal G1$b$ and the gate signal G2$b$ at the "Low" level at a prescribed timing during the period P2, for example, at time t3 when the voltage Vcap becomes 0 V and sets the semiconductor switch unit SW1$b$ and the semiconductor switch unit SW2$b$ in the non-conductive state. Further, the controller 44 sets the gate signal G1$a$ and the gate signal G2$a$ at the "High" level and sets the semiconductor switch unit SW1$a$ and the semiconductor switch unit SW2$a$ in the conductive state. Thereby, in the AC generation circuit 42-5, the currents (the current Is3 and the current Icap) when the capacitors C1 and C2 are discharged continuously flow in the direction in which the battery 30 is charged through the path shown in (d) of FIG. 22.

Subsequently, at time t4 before the current Is3 flowing through the bidirectional semiconductor switch unit SW3-2 becomes 0 A, the controller 44 sets the gate signal G3$b$ at the "Low" level and sets the semiconductor switch unit SW3$b$ in the non-conductive state. At this time, because the semiconductor switch unit SW3$a$ is in the conductive state, a current based on the current Ibatt flows continuously along a path that passes through each of the capacitor C1, the capacitor C2, the semiconductor switch unit SW3$a$, and the diode D3$b$ provided in the semiconductor switch unit SW3$b$ as shown in (e) of FIG. 22. Thereby, no surge voltage is generated during the period P3 up to time t5.

Further, as shown in (f) of FIG. 22, the controller 44 sets the gate signal G1$b$ and the gate signal G2$b$ at the "High" level and sets the semiconductor switch unit SW1$b$ and the semiconductor switch unit SW2$b$ in the conductive state. Therefore, a voltage in the reverse direction is applied to the diode D3$b$ through which a current in the forward direction is flowing. Thus, a current flowing back through the diode D3$b$ is temporarily generated in the diode D3$b$ during the reverse recovery time, but this temporary current converges immediately. In the AC generation circuit 42-5, the current Ibatt continues to decrease, the direction of the current turns in the direction in which the battery 30 is discharged, and the voltage Vcap begins to increase.

The controller 44 sets the gate signal G3a at the "Low" level and sets the semiconductor switch unit SW3a in the non-conductive state at a prescribed timing during the period P4, for example, at time t6 when the voltage Vcap becomes 0 V. Further, the controller 44 sets the gate signal G3b at the "High" level and sets the semiconductor switch unit SW3b in the conductive state. Thereby, in the AC generation circuit 42-5, the path returns to a path similar to that of the period P1 (the path shown in (a) of FIG. 22). Hereinafter, likewise, the above-described operation is periodically iterated.

As described above, in the temperature raising device 40 of the fifth embodiment, the ON or OFF states of the first semiconductor switch unit and the second semiconductor switch constituting the bidirectional semiconductor switch units provided in the AC generation circuit 42-4 of the fourth embodiment are controlled at different timings. More specifically, when the state of the bidirectional semiconductor switch unit is changed from the conductive state to the non-conductive state in the AC generation circuit 42-5, a control process in which the state of the bidirectional semiconductor switch unit is changed from the conductive state to the non-conductive state is performed after one of the first semiconductor switch unit and the second semiconductor switch unit constituting another bidirectional semiconductor switch unit is set in the conductive state in advance such that the current flowing through the bidirectional semiconductor switch unit can sufficiently return. Thereby, in the temperature raising device 40 of the fifth embodiment, even if a control process of changing the state of the bidirectional semiconductor switch unit from the conductive state to the non-conductive state is not performed in ZCS control, i.e., even if switching is performed at a timing away from a point at which the AC current is substantially 0 A, it is possible to avoid the generation of the surge voltage assumed in the voltage Vbatt. Thereby, in the temperature raising device 40 of the fifth embodiment, it is possible to limit an increase in the loss of the AC current generated by the AC generation circuit 42-5 and increase the temperature of the battery 30 more efficiently due to the generated AC current.

Here, characteristics of the AC currents generated by each of the AC generation circuit 42-4 of the fourth embodiment and the AC generation circuit 42-5 of the fifth embodiment and the loss of the generated AC current will be described. FIG. 23 is a diagram for comparing the characteristics and loss of the amplitudes of the AC currents generated by the AC generation circuits 42 (the AC generation circuit 42-4 and the AC generation circuit 42-5). In (a) of FIG. 23, the characteristics of an effective value (an rms value) that is a current value representing the amplitude of the AC current generated by each of the AC generation circuit 42-4 and the AC generation circuit 42-5 when the duty ratio is the same and the frequency is changed are shown. In (b) of FIG. 23, the magnitude of the circuit loss (Watt) when each of the AC generation circuit 42-4 and the AC generation circuit 42-5 generates an AC current is shown. As shown in (a) of FIG. 23, a change in the amplitude (the current value) of the generated AC current is substantially the same between the AC generation circuit 42-4 and the AC generation circuit 42-5. On the other hand, as shown in (b) of FIG. 23, the circuit loss of the AC generation circuit 42-5 is lower than that of the AC generation circuit 42-4 throughout the entire frequency band of the generated AC current. From this, it can be seen that the AC generation circuit 42-5 can generate an AC current having the same amplitude as that of the AC generation circuit 42-4 with small circuit loss.

In the above description of FIG. 21, a case where the controller 44 sets either a first semiconductor switch unit or a second semiconductor switch unit constituting another bidirectional semiconductor switch unit in the conductive state in advance at a timing when the voltage Vcap becomes 0 V has been described. However, a timing at which the controller 44 sets one of the semiconductor switch units in the conductive state in advance may be any timing as long as it is before the timing at which the state of the bidirectional semiconductor switch unit is changed from the conductive state to the non-conductive state. That is, if the logic when the state of the bidirectional semiconductor switch unit is changed from the conductive state to the non-conductive state is guaranteed, the controller 44 may make the determination by measuring (monitoring) a current value or a voltage value of the component provided in the AC generation circuit 42 or the battery 30, or may make the determination on the basis of an operation state of the AC generation circuit 42, as in the AC generation circuits 42 of the first to fourth embodiments.

As described above, in the temperature raising device 40 of the fifth embodiment, the semiconductor switch units constituting the bidirectional semiconductor switch unit provided in the AC generation circuit 42-5 are controlled at different timings. Thereby, in the temperature raising device 40 of the fifth embodiment, it is possible to generate an AC current having a sufficient amplitude (a wider amplitude than that of the AC generation circuit 42-1) by maintaining the resonance operation associated with the inductance La provided in the battery 30 without a problem of the formation of a path (see FIG. 7) of an unintended current as in the AC generation circuit 42-1 or the increase in the loss due to the generation of the surge voltage as in the AC generation circuit 42-4. Thereby, even in the temperature raising device 40 of the fifth embodiment, the temperature of the battery 30 can be increased more efficiently due to the generated AC current.

Figure 24:
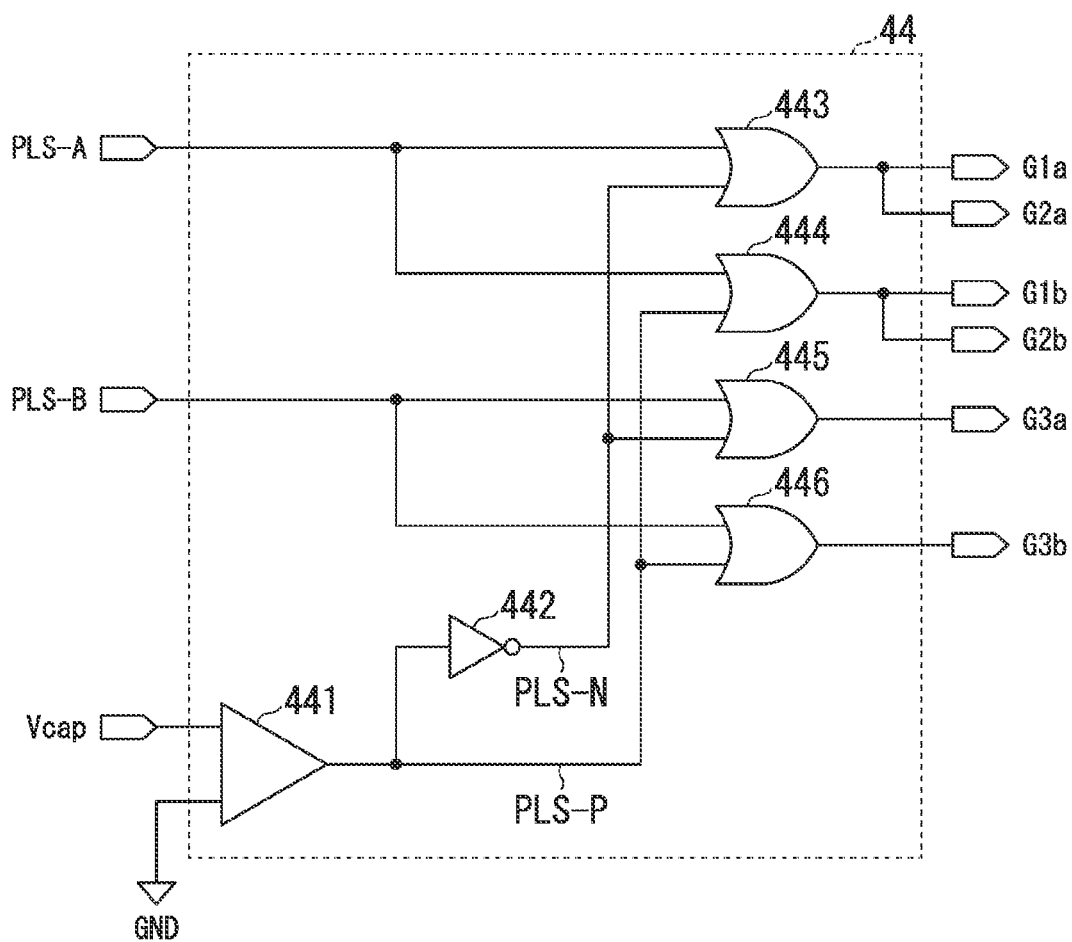
FIG. 24 is a circuit diagram showing an example of a circuit configuration of the controller.

Here, an example of a case where the controller 44 is implemented by a logic circuit will be described. FIG. 24 is a circuit diagram showing an example of a circuit configuration of the controller 44. The controller 44 includes, for example, a comparator 441, a logical negation circuit (a NOT circuit or an inverter circuit) 442, and four logical disjunction circuits (OR circuits) 443 to 446. According to this configuration, the controller 44 implements the logical operation formulas of the following Eqs. (1).

$PLS\text{-}P = Vcap == 0$ $PLS\text{-}N = \sim PLS\text{-}P$ $G1a = G2a = PLS\text{-}A \lor PLS\text{-}N$ $G1b = G2b = PLS\text{-}A \lor PLS\text{-}P$ $G3a = PLS\text{-}B \lor PLS\text{-}N$ $G3b = PLS\text{-}B \lor PLS\text{-}P$ (1)

In the above Eqs. (1), the pulse signal PLS-A is a control signal indicating that the capacitor C1 and the capacitor C2 are connected in parallel. The pulse signal PLS-B is a control signal indicating that the capacitor C1 and the capacitor C2 are connected in series. The pulse signal PLS-P is a control signal indicating that the voltage of the voltage Vcap (i.e., the capacitor C1) is a positive voltage value. The pulse signal PLS-N is a control signal indicating that the voltage of the capacitor C1 is a negative voltage value. For example, the pulse signal PLS-A and the pulse signal PLS-B may be output to the controller 44 by the control device 100 or may be generated by a pulse generator (not shown) provided in the controller 44 such as a clock generator on the basis of information of an interval (a frequency) or a duty ratio of the AC current indicated by the control device 100.

Figure 25:
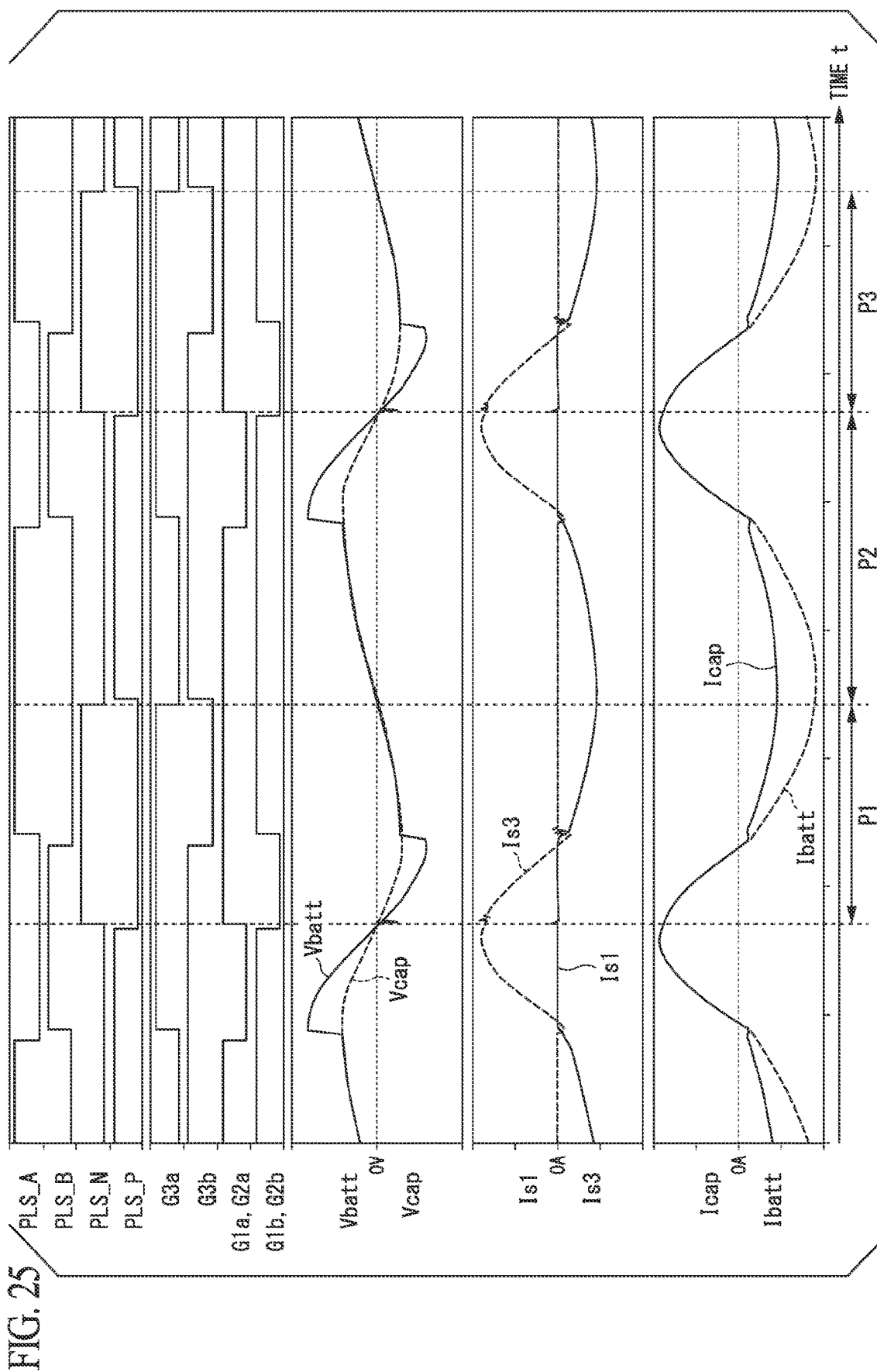
FIG. 25 is an example of a timing chart showing a timing of a gate signal generated by the controller.

FIG. 25 is an example of a timing chart showing the timing of the gate signal generated by the controller 44. In FIG. 25, timings at which the controller 44 implemented by the logic circuit shown in FIG. 24 generates a gate signal G1a, a gate signal G1b, a gate signal G2a, a gate signal G2b, a gate signal G3a, and a gate signal G3b is shown in association with the example of the operation waveform (the simulation waveform) of the AC generation circuit 42-5 shown in FIG. 21. The controller 44 outputs each gate signal at the timing as shown in FIG. 25 on the basis of the periodically variant pulse signals PLS-A and PLS-B, the pulse signal PLS-P of a result of comparing the level of the voltage Vcap with the level of the ground in the comparator 441, and the pulse signal PLS-P output by inverting the pulse signal PLS-P in the logical negation circuit 442 that have been input.

More specifically, in FIG. 25, the voltage value of the voltage Vcap is a negative voltage value during the period P1 and the period P3 and is a positive voltage value during the period P2. Thus, the comparator 441 outputs the pulse signal PLS-P of the "Low" level during the period P1 and the period P3 and outputs the pulse signal PLS-P of the "High" level during the period P2. The logical negation circuit 442 outputs the pulse signal PLS-N obtained by inverting the pulse signal PLS-P output by the comparator 441. Each of the logical disjunction circuits 443 to 446 outputs a signal obtained by carrying out an OR operation on the input pulse signals as a gate signal.

In a logic circuit configuration and an operation timing of the controller 44 described with reference to FIGS. 24 and 25, a logic circuit configuration in which the voltage value of the voltage Vcap is monitored and each gate signal is generated according to whether the voltage Vcap is a positive voltage value or a negative voltage value is shown. However, as described above, the controller 44 may generate a gate signal by monitoring the current value or the voltage value of any component provided in the AC generation circuit 42-5. In this case, it is only necessary for the logic circuit configuration and operation timings of the controller 44 to be equivalent to the logic circuit configuration shown in FIG. 24 and the timing chart shown in FIG. 25. Further, the controller 44 is not limited to that implemented by a logic circuit. That is, the operation of the controller 44 may be implemented by a hardware processor such as a CPU provided in the controller 44 (which may be the control device 100) executing the program. It is only necessary for the program in this case to be, for example, a program that implements an operation equivalent to the logical operation formulas of the above Eqs. (1).

As described above, according to the temperature raising device 40 of each embodiment, an AC current based on the electric power stored in the battery 30 is generated using a resonance operation in which the magnetic energy stored in the inductance La provided in the battery 30 and at least the electrostatic energy stored in the capacitor C1 are alternately exchanged by switching the connection of the capacitor C1 and the capacitor C2 provided in the AC generation circuit 42 to the battery 30 to a series connection or a parallel connection. Thereby, in the temperature raising device 40 of each embodiment, the temperature of the battery 30 can be increased more efficiently due to the generated AC current. Thereby, in the vehicle 1 in which the temperature raising device 40 of each embodiment is adopted, the battery 30 can be used in a state in which the temperature of the battery 30 is increased to a suitable temperature and deterioration of the charging/discharging performance of the battery 30 can be limited.

According to each embodiment described above, the temperature raising device 40 including the AC generation circuit 42 configured to generate an AC current based on electric power stored in the battery 30 having the inductance La, wherein the AC generation circuit 42 includes the capacitor C1 having a first end connected to a positive electrode side of the battery 30; the capacitor C2 having a first end connected to a negative electrode side of the battery 30; a parallel switch unit configured to connect the capacitor C1 and the capacitor C2 to the battery 30 in parallel by connecting a second end of the capacitor C1 and the first end of the capacitor C2 and connecting the first end of the capacitor C1 and a second end of the capacitor C2; and a series switch unit configured to connect the capacitor C1 and the capacitor C2 to the battery 30 in series by connecting the second end of the capacitor C1 and the second end of the capacitor C2; and the controller 44 configured to alternately switch the state between a parallel connection state in which the parallel switch unit is in a conductive state and the series switch unit is in a non-conductive state and a series connection state in which the parallel switch unit is in the non-conductive state and the series switch unit is in the conductive state, wherein the controller 44 changes the state of the parallel switch unit from the non-conductive state to the conductive state after the state of the series switch unit is changed from the conductive state to the non-conductive state when the state of the parallel switch unit is changed from the non-conductive state to the conductive state, and wherein the controller 44 changes the state of the series switch unit from the non-conductive state to the conductive state after the state of the parallel switch unit is changed from the conductive state to the non-conductive state when the state of the series switch unit is changed from the non-conductive state to the conductive state, whereby the temperature of the battery 30 for traveling mounted in the vehicle 1 can be increased more efficiently. Thereby, in the vehicle 1 in which the temperature raising device 40 of each embodiment is adopted, the battery 30 can be used in a state in which the temperature of the battery 30 is increased to a suitable temperature and deterioration of charging/discharging performance of the battery 30 can be limited. Thereby, in the vehicle 1 equipped with the temperature raising device 40 of each embodiment, it is possible to improve the marketability of the vehicle 1 such as the improvement of durability. From these facts, the vehicle 1 equipped with the temperature raising device 40 of each embodiment is expected to contribute to improving energy efficiency and reducing adverse effects on the global environment.

In each of the above-described embodiments, a configuration in which the control device 100 provided in the vehicle 1 controls the operation of the temperature raising device 40 has been described. That is, in each of the above-described embodiments, the case where the control device for controlling the operation of the temperature raising device 40 is configured within the control device 100 provided in the vehicle 1 has been described. However, the operation of the temperature raising device 40 may be controlled by the controller 44 provided in the temperature raising device 40. In this case, the controller 44 provided in the temperature raising device 40 can control the operation of the temperature raising device 40 of each embodiment described above by acquiring battery information (particularly, information about the temperature of the battery 30) directly from the battery sensor 32 connected to the battery 30 or via the control device 100 provided in the vehicle 1. In this case, it is only necessary for the configurations, operations, processes, and the like of the temperature raising device 40 and the controller 44 to be equivalent to the configurations, operations, and processes of the temperature raising device 40 and the control device 100 of each of the above-described embodiments.

The embodiment described above can be represented as follows.

A temperature raising device including:
an AC generation circuit configured to generate an AC current based on electric power stored in a power storage having an inductance component,
wherein the AC generation circuit includes
a first capacitor having a first end connected to a positive electrode side of the power storage;
a second capacitor having a first end connected to a negative electrode side of the power storage;
a parallel switch unit configured to connect the first capacitor and the second capacitor to the power storage in parallel by connecting a second end of the first capacitor and the first end of the second capacitor and connecting the first end of the first capacitor and a second end of the second capacitor; and
a series switch unit configured to connect the first capacitor and the second capacitor to the power storage in series by connecting the second end of the first capacitor and the second end of the second capacitor; and
a controller configured to alternately switch the state between a first state in which the parallel switch unit is in a conductive state and the series switch unit is in a non-conductive state and a second state in which the parallel switch unit is in the non-conductive state and the series switch unit is in the conductive state,
wherein the controller includes
a hardware processor, and
a storage device storing a program, and
wherein the hardware processor reads and executes the program stored in the storage device to:
change the state of the parallel switch unit from the non-conductive state to the conductive state after the state of the series switch unit is changed from the conductive state to the non-conductive state when the state of the parallel switch unit is changed from the non-conductive state to the conductive state, and
change the state of the series switch unit from the non-conductive state to the conductive state after the state of the parallel switch unit is changed from the conductive state to the non-conductive state when the state of the series switch unit is changed from the non-conductive state to the conductive state.

Although modes for carrying out the present invention have been described using embodiments, the present invention is not limited to the embodiments and various modifications and substitutions can also be made without departing from the scope and spirit of the present invention.

What is claimed is:
1. A temperature raising device including
an alternating current (AC) generation circuit configured to generate an AC current based on electric power stored in a power storage having an inductance component,
wherein the AC generation circuit includes
a first capacitor having a first end connected to a positive electrode side of the power storage;
a second capacitor having a first end connected to a negative electrode side of the power storage;
a parallel switch unit configured to connect the first capacitor and the second capacitor to the power storage in parallel by connecting a second end of the first capacitor and the first end of the second capacitor and connecting the first end of the first capacitor and a second end of the second capacitor; and
a series switch unit configured to connect the first capacitor and the second capacitor to the power storage in series by connecting the second end of the first capacitor and the second end of the second capacitor; and
a controller configured to alternately switch the state between a first state in which the parallel switch unit is in a conductive state and the series switch unit is in a non-conductive state and a second state in which the parallel switch unit is in the non-conductive state and the series switch unit is in the conductive state,
wherein the controller changes the state of the parallel switch unit from the non-conductive state to the conductive state after the state of the series switch unit is changed from the conductive state to the non-conductive state when the state of the parallel switch unit is changed from the non-conductive state to the conductive state, and
wherein the controller changes the state of the series switch unit from the non-conductive state to the conductive state after the state of the parallel switch unit is changed from the conductive state to the non-conductive state when the state of the series switch unit is changed from the non-conductive state to the conductive state.

2. The temperature raising device according to claim 1, wherein each of the parallel switch unit and the series switch unit includes at least one semiconductor switch unit having a semiconductor switch element in which an ON state and an OFF state are controlled by the controller and a diode connected to each other in parallel.

3. The temperature raising device according to claim 2, wherein one or both of the parallel switch unit and the series switch unit include two semiconductor switch units connected in series and directions of diodes of the two semiconductor switch units are opposite to each other.

4. The temperature raising device according to claim 2, wherein the parallel switch unit and the series switch unit include a first semiconductor switch unit and a second semiconductor switch unit that are the semiconductor switch units connected in series and directions of diodes of the first semiconductor switch unit and the second semiconductor switch unit are opposite to each other.

5. The temperature raising device according to claim 4, wherein, when the state is changed from a state in which the first capacitor and the second capacitor are connected to the power storage in parallel to a state in which the first capacitor and the second capacitor are connected to the power storage in series by setting the parallel switch unit in the conductive state, the controller switches the state to a state in which the first capacitor and the second capacitor are connected to the power storage in series in a state in which one of the first semiconductor switch unit and the second semiconductor switch unit provided in the parallel switch unit is in the conductive state after one of the first semiconductor switch unit and the second semiconductor switch unit provided in the series switch unit is allowed to be in the conductive state such that a current flowing through the parallel switch unit can return, and
wherein, when the state is changed from a state in which the first capacitor and the second capacitor are connected to the power storage in series to a state in which the first capacitor and the second capacitor are connected to the power storage in parallel by setting the series switch unit in the conductive state, the controller switches the state to a state in which the first capacitor and the second capacitor are connected to the power storage in parallel in a state in which one of the first semiconductor switch unit and the second semiconductor switch unit provided in the series switch unit is in the conductive state after one of the first semiconductor switch unit and the second semiconductor switch unit provided in the parallel switch unit is allowed to be in the conductive state such that a current flowing through the series switch unit can return.

6. The temperature raising device according to claim 1, wherein the controller controls the conductive state and the non-conductive state of each of the parallel switch unit and the series switch unit on the basis of a voltage value of the first capacitor or a voltage value of the second capacitor.

7. The temperature raising device according to claim 1, wherein the controller controls the conductive state and the non-conductive state of each of the parallel switch unit and the series switch unit on the basis of voltage values of a positive electrode and a negative electrode of the power storage.

8. The temperature raising device according to claim 1, wherein the controller controls the conductive state and the non-conductive state of each of the parallel switch unit and the series switch unit on the basis of a voltage value between both ends of the parallel switch unit or the series switch unit in the non-conductive state.

9. The temperature raising device according to claim 1, wherein the controller controls the conductive state and the non-conductive state of each of the parallel switch unit and the series switch unit on the basis of a current value of the AC current flowing through the parallel switch unit or the series switch unit.

10. The temperature raising device according to claim 1, wherein the controller controls the conductive state and the non-conductive state of each of the parallel switch unit and the series switch unit at a prescribed timing based on the AC current.

11. The temperature raising device according to claim 10, wherein the prescribed timing is decided on the basis of an interval or a duty ratio of the AC current.

12. A method of controlling a temperature raising device including
an alternating current (AC) generation circuit configured to generate an AC current based on electric power stored in a power storage having an inductance component,
wherein the AC generation circuit includes
a first capacitor having a first end connected to a positive electrode side of the power storage;
a second capacitor having a first end connected to a negative electrode side of the power storage;
a parallel switch unit configured to connect the first capacitor and the second capacitor to the power storage in parallel by connecting a second end of the first capacitor and the first end of the second capacitor and connecting the first end of the first capacitor and a second end of the second capacitor; and
a series switch unit configured to connect the first capacitor and the second capacitor to the power storage in series by connecting the second end of the first capacitor and the second end of the second capacitor, and
a controller configured to alternately switch the state between a first state in which the parallel switch unit is in a conductive state and the series switch unit is in a non-conductive state and a second state in which the parallel switch unit is in the non-conductive state and the series switch unit is in the conductive state, the method comprising:
changing, by a computer of the controller, the state of the parallel switch unit from the non-conductive state to the conductive state after the state of the series switch unit is changed from the conductive state to the non-conductive state when the state of the parallel switch unit is changed from the non-conductive state to the conductive state, and
changing, by the computer of the controller, the state of the series switch unit from the non-conductive state to the conductive state after the state of the parallel switch unit is changed from the conductive state to the non-conductive state when the state of the series switch unit is changed from the non-conductive state to the conductive state.

13. A method of controlling a temperature raising device including
an alternating current (AC) generation circuit configured to generate an AC current based on electric power stored in a power storage having an inductance component,
wherein the AC generation circuit includes
a first capacitor having a first end connected to a positive electrode side of the power storage;
a second capacitor having a first end connected to a negative electrode side of the power storage;
a parallel switch unit configured to connect the first capacitor and the second capacitor to the power storage in parallel by connecting a second end of the first capacitor and the first end of the second capacitor and connecting the first end of the first capacitor and a second end of the second capacitor; and
a series switch unit configured to connect the first capacitor and the second capacitor to the power storage in series by connecting the second end of the first capacitor and the second end of the second capacitor, and
a controller configured to alternately switch the state between a first state in which the parallel switch unit is in a conductive state and the series switch unit is in a non-conductive state and a second state in which the parallel switch unit is in the non-conductive state and the series switch unit is in the conductive state,
wherein each of the parallel switch unit and the series switch unit includes at least one semiconductor switch unit having a semiconductor switch element in which an ON state and an OFF state are controlled by the controller and a diode connected to each other in parallel, and
wherein the parallel switch unit and the series switch unit include a first semiconductor switch unit and a second semiconductor switch unit that are the semiconductor switch units connected in series and directions of diodes of the first semiconductor switch unit and the second semiconductor switch unit are opposite to each other, the method comprising:
changing, by a computer of the controller, the state of the parallel switch unit from the non-conductive state to the conductive state after the state of the series switch unit is changed from the conductive state to the non-conductive state when the state of the parallel switch unit is changed from the non-conductive state to the conductive state;

changing, by the computer of the controller, the state of the series switch unit from the non-conductive state to the conductive state after the state of the parallel switch unit is changed from the conductive state to the non-conductive state when the state of the series switch unit is changed from the non-conductive state to the conductive state;

when the state is changed from a state in which the first capacitor and the second capacitor are connected to the power storage in parallel to a state in which the first capacitor and the second capacitor are connected to the power storage in series by setting the parallel switch unit in the conductive state, switching, by the computer of the controller, the state to a state in which the first capacitor and the second capacitor are connected to the power storage in series in a state in which one of the first semiconductor switch unit and the second semiconductor switch unit provided in the parallel switch unit is in the conductive state after one of the first semiconductor switch unit and the second semiconductor switch unit provided in the series switch unit is allowed to be in the conductive state such that a current flowing through the parallel switch unit can return; and when the state is changed from a state in which the first capacitor and the second capacitor are connected to the power storage in series to a state in which the first capacitor and the second capacitor are connected to the power storage in parallel by setting the series switch unit in the conductive state, switching, by the computer of the controller, the state to a state in which the first capacitor and the second capacitor are connected to the power storage in parallel in a state in which one of the first semiconductor switch unit and the second semiconductor switch unit provided in the series switch unit is in the conductive state after one of the first semiconductor switch unit and the second semiconductor switch unit provided in the parallel switch unit is allowed to be in the conductive state such that a current flowing through the series switch unit can return.

14. A non-transitory computer-readable storage medium storing a program for controlling a temperature raising device including
an alternating current (AC) generation circuit configured to generate an AC current based on electric power stored in a power storage having an inductance component,
wherein the AC generation circuit includes
a first capacitor having a first end connected to a positive electrode side of the power storage;
a second capacitor having a first end connected to a negative electrode side of the power storage;
a parallel switch unit configured to connect the first capacitor and the second capacitor to the power storage in parallel by connecting a second end of the first capacitor and the first end of the second capacitor and connecting the first end of the first capacitor and a second end of the second capacitor; and
a series switch unit configured to connect the first capacitor and the second capacitor to the power storage in series by connecting the second end of the first capacitor and the second end of the second capacitor, and a controller configured to alternately switch the state between a first state in which the parallel switch unit is in a conductive state and the series switch unit is in a non-conductive state and a second state in which the parallel switch unit is in the non-conductive state and the series switch unit is in the conductive state, the program causing a computer of the controller to:

change the state of the parallel switch unit from the non-conductive state to the conductive state after the state of the series switch unit is changed from the conductive state to the non-conductive state when the state of the parallel switch unit is changed from the non-conductive state to the conductive state, and change the state of the series switch unit from the non-conductive state to the conductive state after the state of the parallel switch unit is changed from the conductive state to the non-conductive state when the state of the series switch unit is changed from the non-conductive state to the conductive state.

15. A non-transitory computer-readable storage medium storing a program for controlling a temperature raising device including
an alternating current (AC) generation circuit configured to generate an AC current based on electric power stored in a power storage having an inductance component,
wherein the AC generation circuit includes
a first capacitor having a first end connected to a positive electrode side of the power storage;
a second capacitor having a first end connected to a negative electrode side of the power storage;
a parallel switch unit configured to connect the first capacitor and the second capacitor to the power storage in parallel by connecting a second end of the first capacitor and the first end of the second capacitor and connecting the first end of the first capacitor and a second end of the second capacitor; and
a series switch unit configured to connect the first capacitor and the second capacitor to the power storage in series by connecting the second end of the first capacitor and the second end of the second capacitor, and
a controller configured to alternately switch the state between a first state in which the parallel switch unit is in a conductive state and the series switch unit is in a non-conductive state and a second state in which the parallel switch unit is in the non-conductive state and the series switch unit is in the conductive state,
wherein each of the parallel switch unit and the series switch unit includes at least one semiconductor switch unit having a semiconductor switch element in which an ON state and an OFF state are controlled by the controller and a diode connected to each other in parallel, and
wherein the parallel switch unit and the series switch unit include a first semiconductor switch unit and a second semiconductor switch unit that are the semiconductor switch units connected in series and directions of diodes of the first semiconductor switch unit and the second semiconductor switch unit are opposite to each other, the program causing a computer of the controller to:
change the state of the parallel switch unit from the non-conductive state to the conductive state after the state of the series switch unit is changed from the conductive state to the non-conductive state when the state of the parallel switch unit is changed from the non-conductive state to the conductive state;

change the state of the series switch unit from the non-conductive state to the conductive state after the state of the parallel switch unit is changed from the conductive state to the non-conductive state when the state of the series switch unit is changed from the non-conductive state to the conductive state;

when the state is changed from a state in which the first capacitor and the second capacitor are connected to the power storage in parallel to a state in which the first capacitor and the second capacitor are connected to the power storage in series by setting the parallel switch unit in the conductive state, switch the state to a state in which the first capacitor and the second capacitor are connected to the power storage in series in a state in which one of the first semiconductor switch unit and the second semiconductor switch unit provided in the parallel switch unit is in the conductive state after one of the first semiconductor switch unit and the second semiconductor switch unit provided in the series switch unit is allowed to be in the conductive state such that a current flowing through the parallel switch unit can return; and when the state is changed from a state in which the first capacitor and the second capacitor are connected to the power storage in series to a state in which the first capacitor and the second capacitor are connected to the power storage in parallel by setting the series switch unit in the conductive state, switch the state to a state in which the first capacitor and the second capacitor are connected to the power storage in parallel in a state in which one of the first semiconductor switch unit and the second semiconductor switch unit provided in the series switch unit is in the conductive state after one of the first semiconductor switch unit and the second semiconductor switch unit provided in the parallel switch unit is allowed to be in the conductive state such that a current flowing through the series switch unit can return.

* * * * *